(12) United States Patent
Min et al.

(10) Patent No.: US 12,140,540 B2
(45) Date of Patent: Nov. 12, 2024

(54) STIMULATED RAMAN COUPLED FLUORESCENCE SPECTROSCOPY AND MICROSCOPY SYSTEM AND METHOD

(71) Applicant: The Trustees of Columbia University in the City of New York, New York, NY (US)

(72) Inventors: Wei Min, Fort Lee, NJ (US); Lixue Shi, Zhejiang (CN); Hanqing Xiong, Hubei (CN); Lu Wei, Anhui (CN)

(73) Assignee: The Trustees of Columbia University in the City of New York, New York, NY (US)

( * ) Notice: Subject to any disclaimer, the term of this patent is extended or adjusted under 35 U.S.C. 154(b) by 552 days.

(21) Appl. No.: 17/473,259

(22) Filed: Sep. 13, 2021

(65) Prior Publication Data

US 2021/0404958 A1 Dec. 30, 2021

Related U.S. Application Data

(63) Continuation of application No. PCT/US2020/022333, filed on Mar. 12, 2020.

(60) Provisional application No. 62/817,327, filed on Mar. 12, 2019.

(51) Int. Cl.
*G01N 21/63* (2006.01)
*G01N 21/64* (2006.01)
*G01N 21/65* (2006.01)

(52) U.S. Cl.
CPC ....... *G01N 21/636* (2013.01); *G01N 21/6428* (2013.01); *G01N 21/6458* (2013.01); *G01N 21/65* (2013.01); *G01N 2021/6439* (2013.01); *G01N 2021/655* (2013.01)

(58) Field of Classification Search
CPC ............. G01N 21/636; G01N 21/6428; G01N 21/6458; G01N 21/65; G01N 2021/6439; G01N 2021/655
See application file for complete search history.

(56) References Cited

U.S. PATENT DOCUMENTS

2018/0372632 A1* 12/2018 Min ................... G01N 33/5005
2020/0277664 A1*  9/2020 Frenz ................... C12Q 1/6874

FOREIGN PATENT DOCUMENTS

WO        2013/173698 A1    11/2013

OTHER PUBLICATIONS

Wei, Lu, et al. "Super-multiplex vibrational imaging." Nature 544.7651 (2017): 465-470. (Year: 2017).*

(Continued)

*Primary Examiner* — Dominic J Bologna
(74) *Attorney, Agent, or Firm* — Amster, Rothstein & Ebenstein LLP

(57) ABSTRACT

Exemplary computer-accessible medium, systems, and methods are described herein which can provide an excited fluorescence radiation. In accordance with certain exemplary embodiments of the present disclosure, an excited fluorescence radiation can be provided using a beam of a probe so as to excite a molecule to an excited state for a fluorescence emission to effectuate the excited fluorescence radiation. The molecule can be detected based on the fluorescence emission. For example, the beam of the probe can be either the near-infrared spectrum or the visible light spectrum.

14 Claims, 24 Drawing Sheets

System 2400

(56) References Cited

OTHER PUBLICATIONS

Wright, John C. "Double resonance excitation of fluorescence in the condensed phase—An alternative to infrared, Raman, and fluorescence spectroscopy." Applied Spectroscopy 34.2 (1980): 151-157. (Year: 1980).*

Xiong, Hanqing, et al. "Stimulated Raman excited fluorescence spectroscopy and imaging." Nature photonics 13.6 (2019): 412-417. (Year: 2019).*

International Search Report and Written Opinion mailed on Jul. 30, 2020 for International Patent Application No. PCT/US2020/022333.

Lee S. H. et al., "Double Resonance Excitation of Fluorescence by Stimulated Raman Scattering," Applied Spectroscopy, vol. 37, No. 5, 1983, pp. 472-474.

Wright JC: "Double resonance excitation of fluorescence in the condensed phase-an alternative to infrared, Raman, and fluorescence spectroscopy", Applied Spectroscopy, the Society for Applied Spectroscopy. Baltimore, US, vol. 34, No. 2, 1980, pp. 151-157.

Bi Yet Al: "Near-resonance enhanced label-free stimulated Raman scattering microscopy with spatial resolution near 130?nm", Light: Science & Applications, vol. 1 • 7, No. 1, Oct. 24, 2018.

Gaubatz U et al: "Population switching between vibrational levels in molecular beams", Chemical Physics Letters, vol. 149, No. 5-6, Sep. 1988.

Sei Imeier A et al: 1"A novel spectroscopy using ultrafast two-pulse excitation of large polyatomic molecules," Chem. Phys. Lett. 58(2), 1978.

* cited by examiner

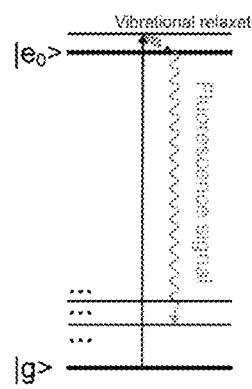 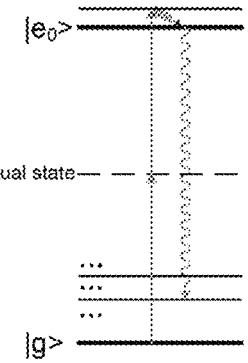 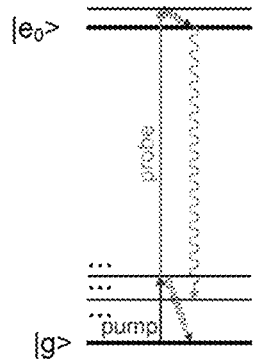 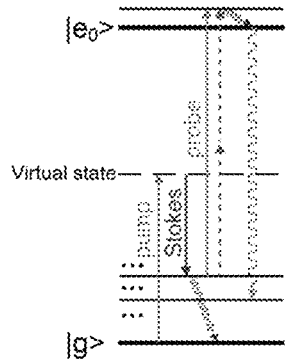
Fig. 1AFig. 1BFig. 1CFig. 1D
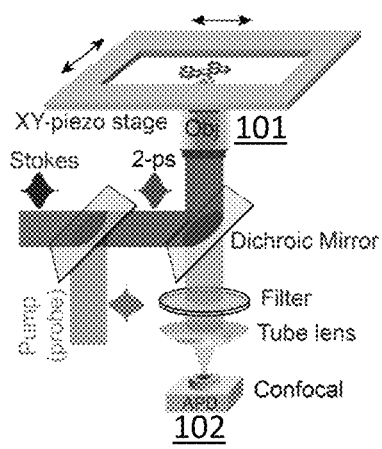 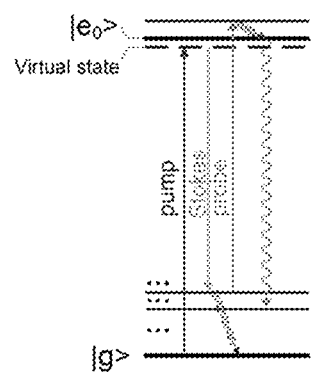 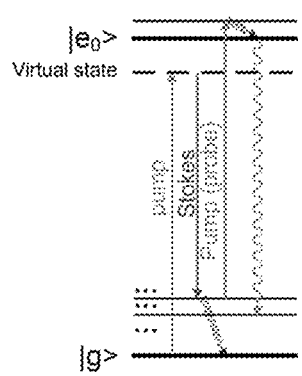
Fig. 1EFig. 1FFig. 1G

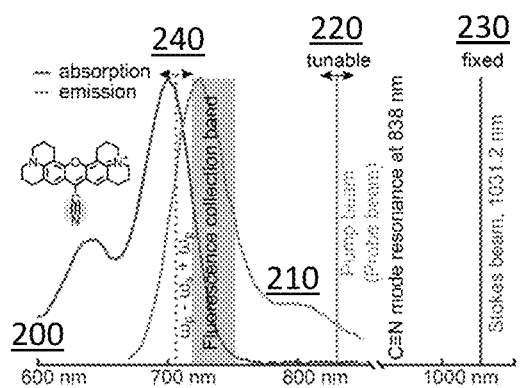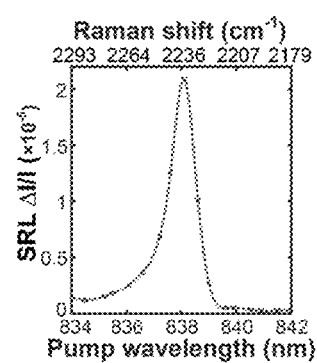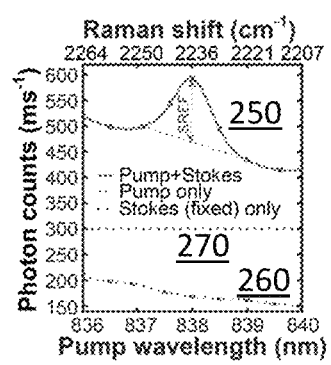
Fig. 2A  Fig. 2B  Fig. 2C
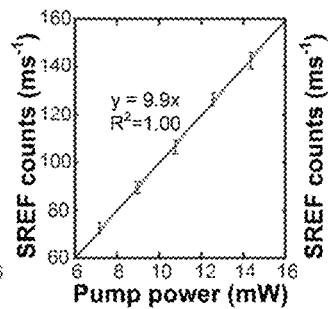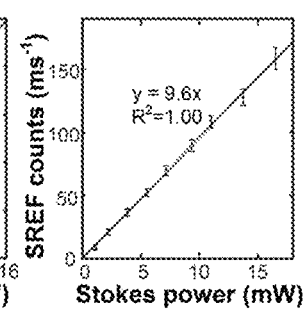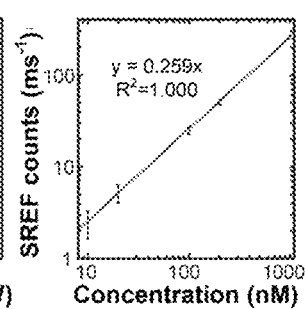
Fig. 2D  Fig. 2E  Fig. 2F  Fig. 2G Fig. 3A
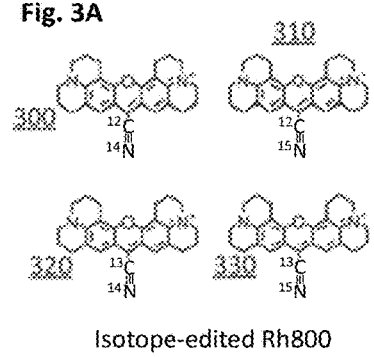
Isotope-edited Rh800
Fig. 3B
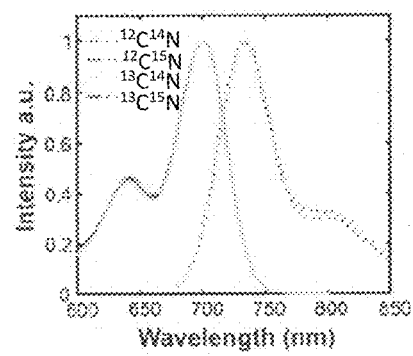
Fig. 3C
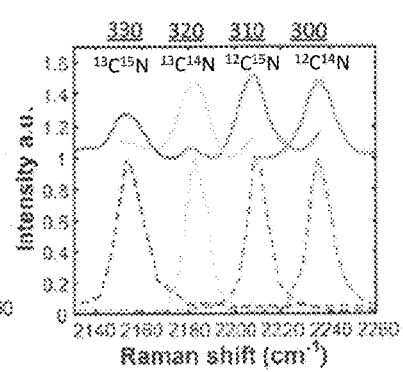
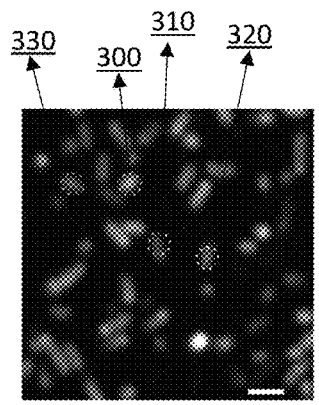
Fig. 3D
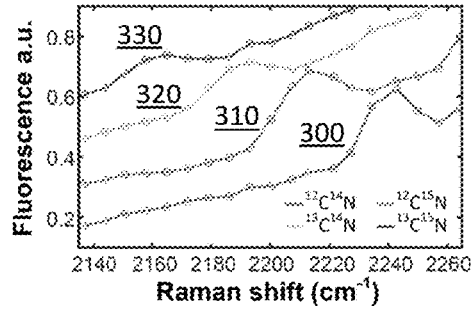
Fig. 3E
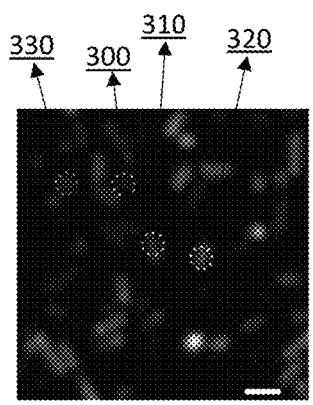
Fig. 3F

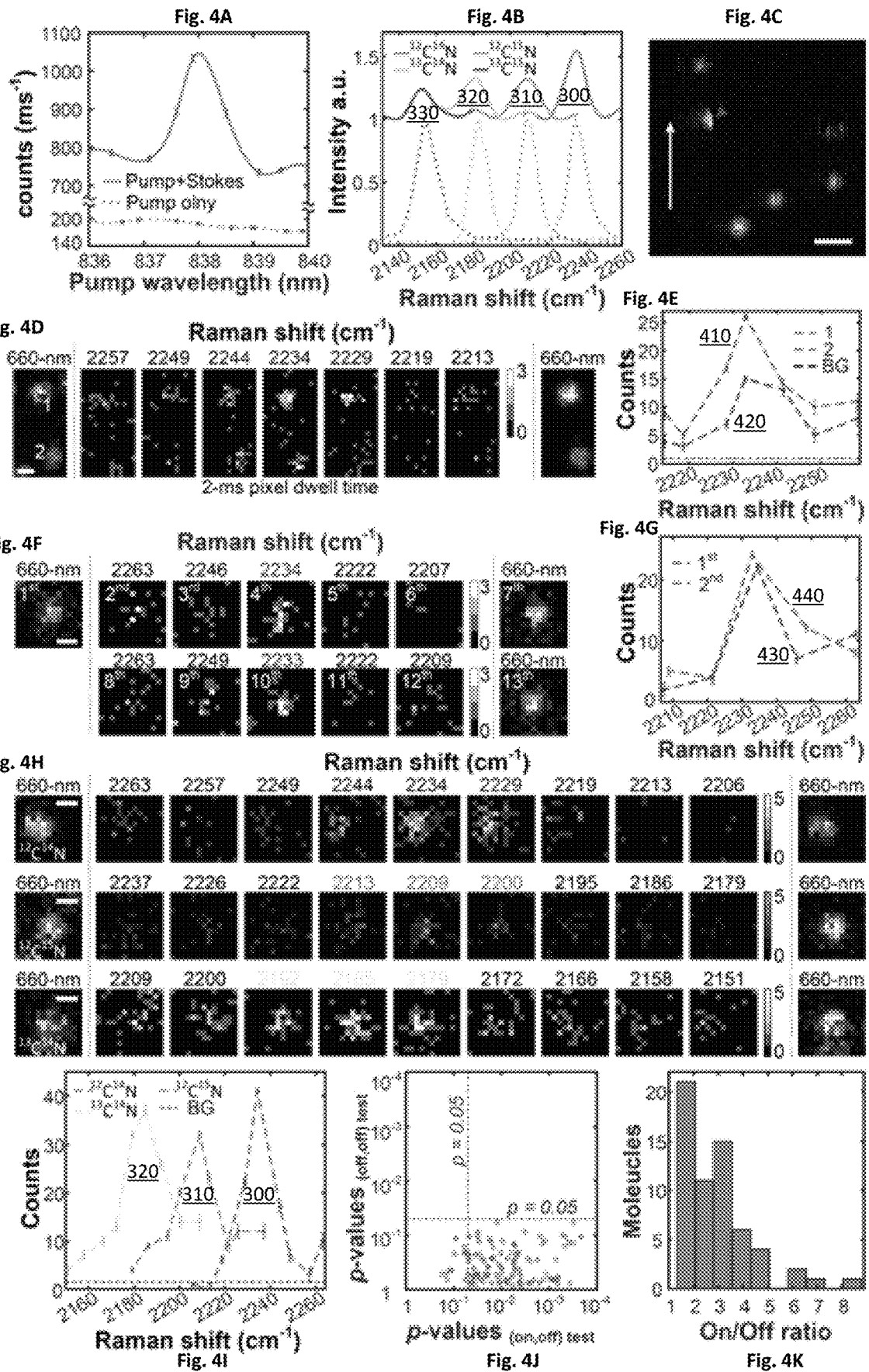

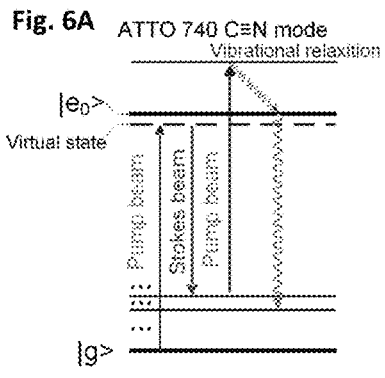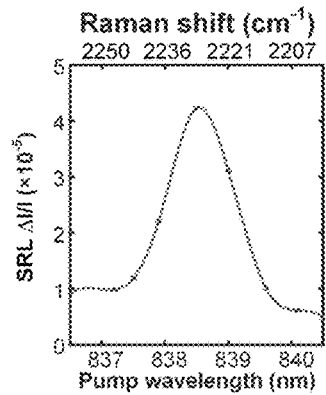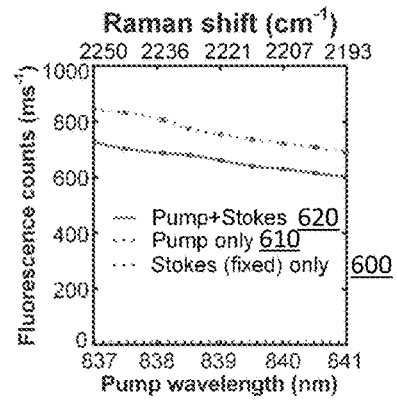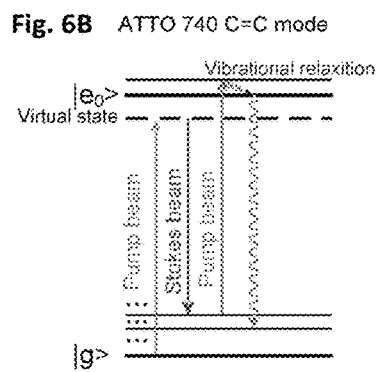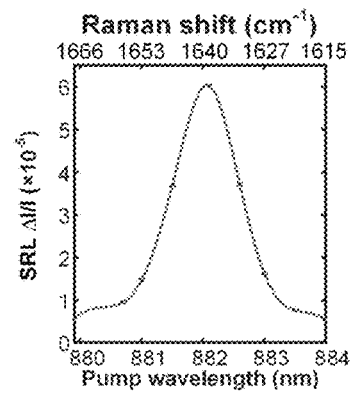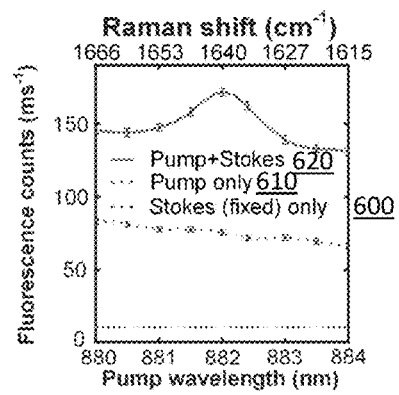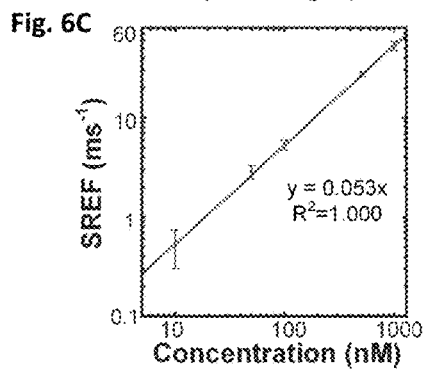

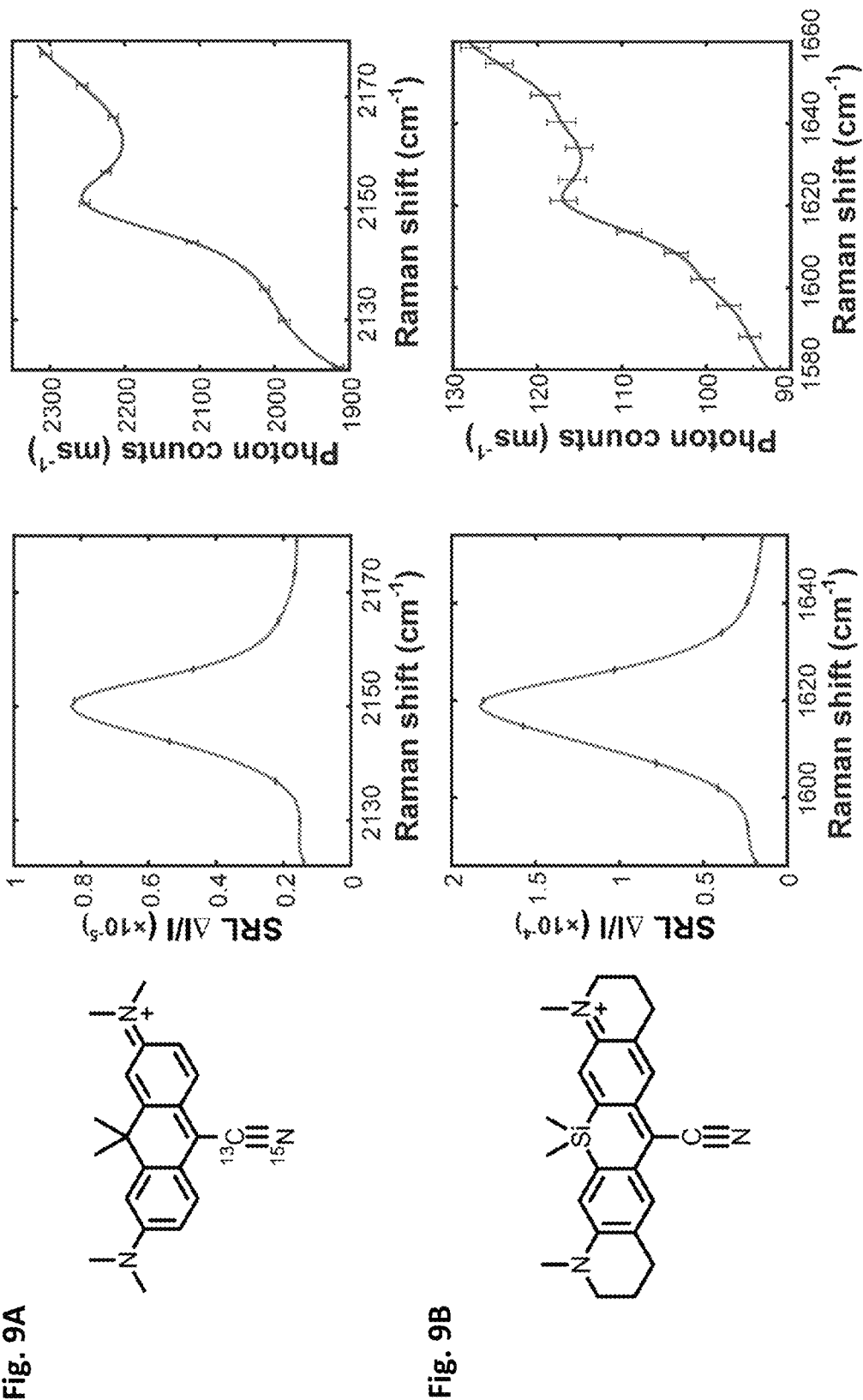

Fig. 14A
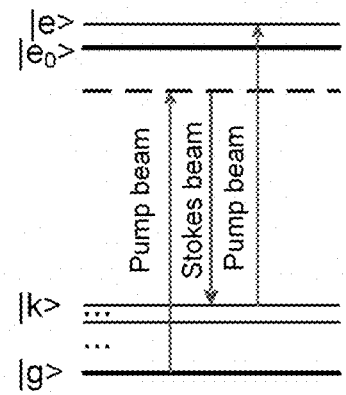
Fig. 14B
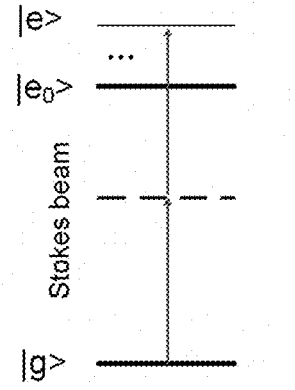
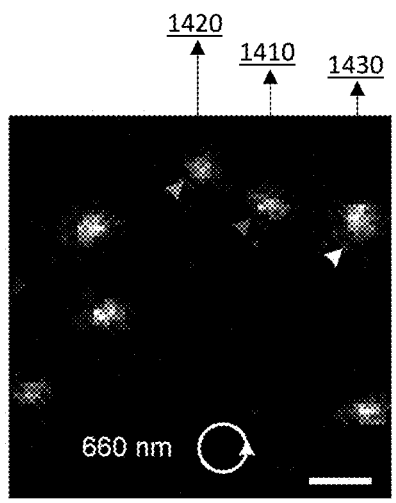
Fig. 14C
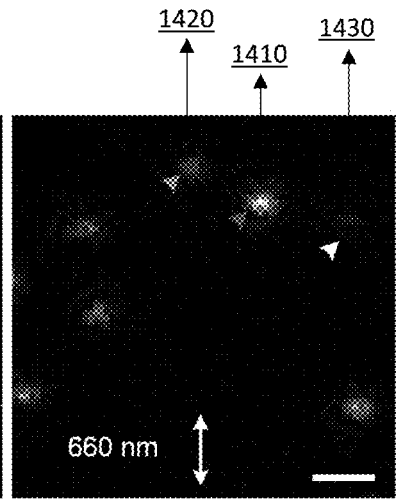
Fig. 14D
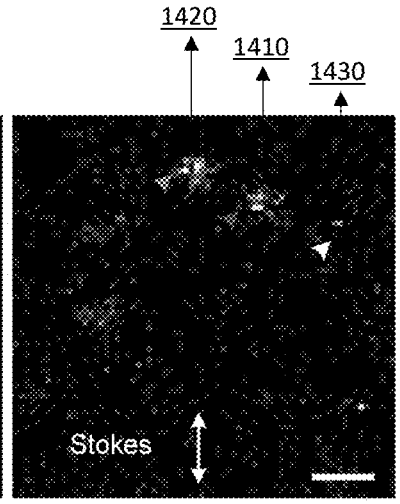
Fig. 14E

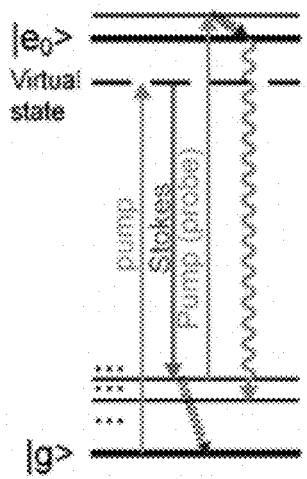
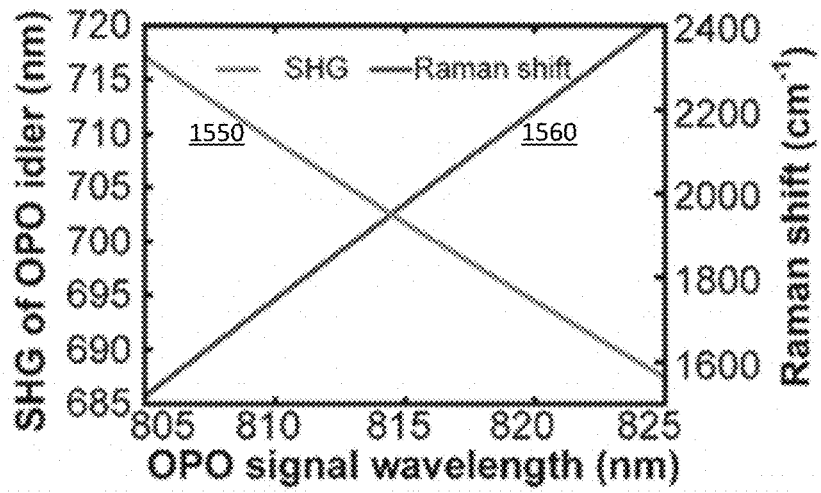
Fig. 15A  Fig. 15B
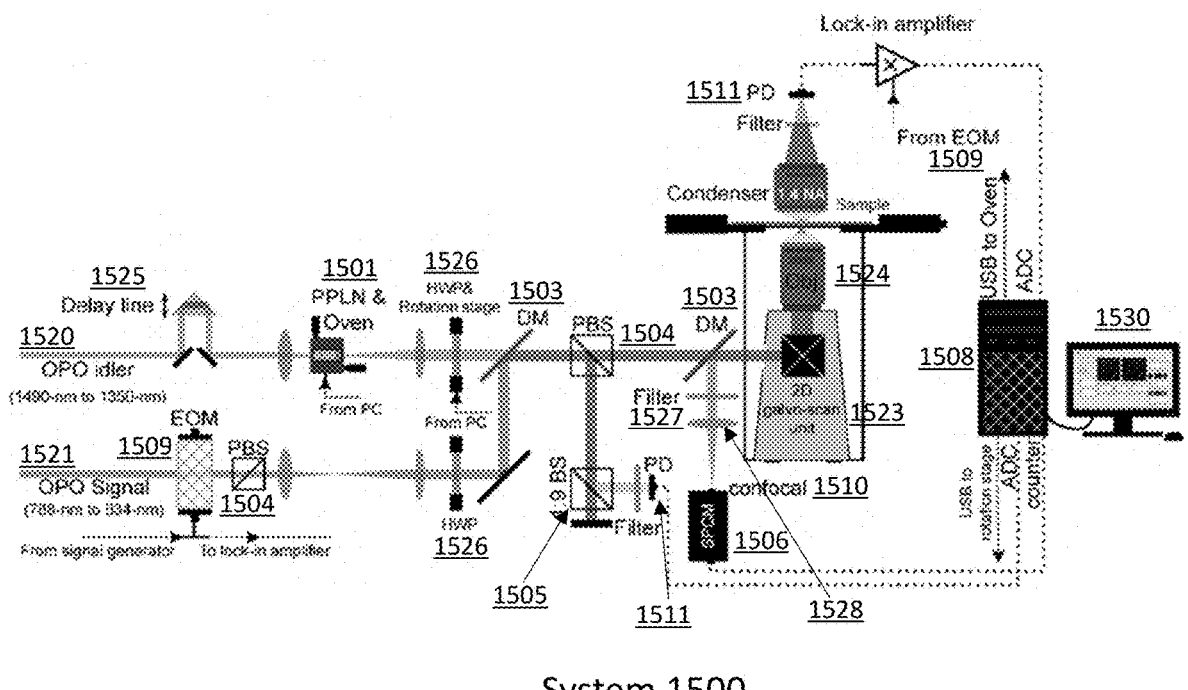
System 1500
Fig. 15C

Fig. 18A 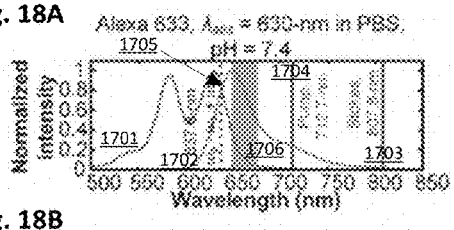 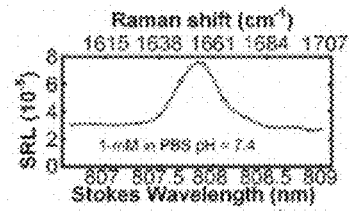 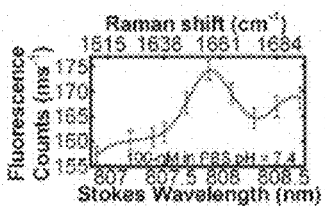
Fig. 18B 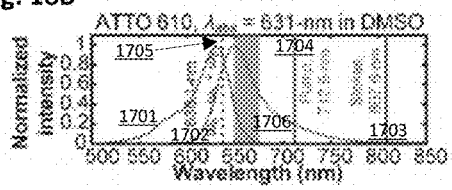 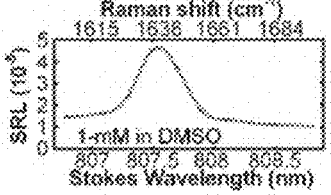 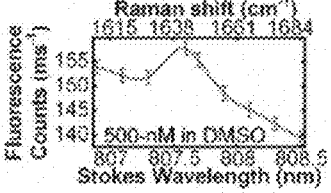
Fig. 18C 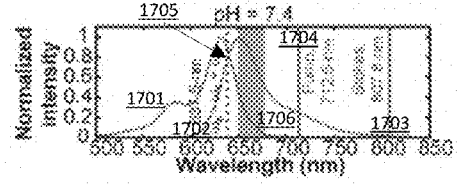 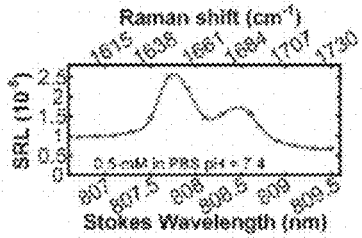 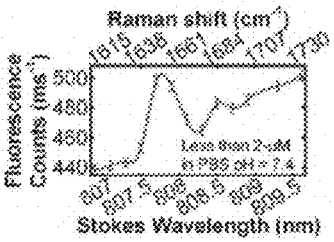
Fig. 18D 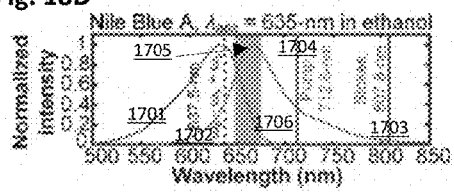 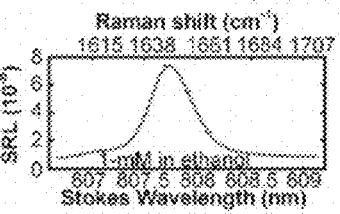 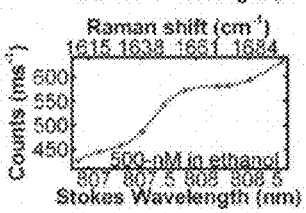
Fig. 18E 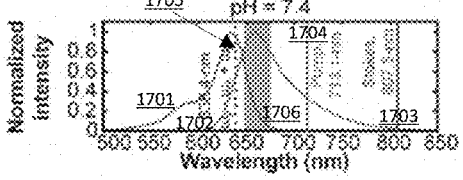 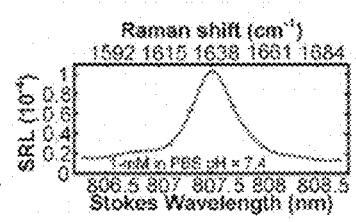 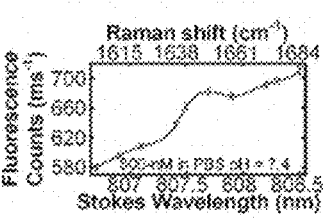
Fig. 18F 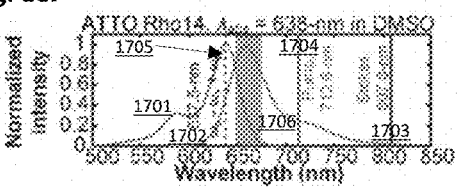 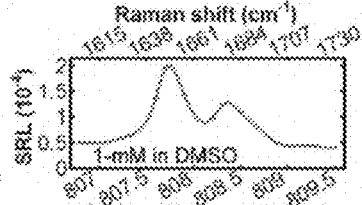 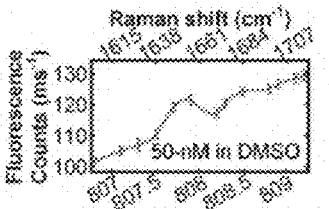
Fig. 18G 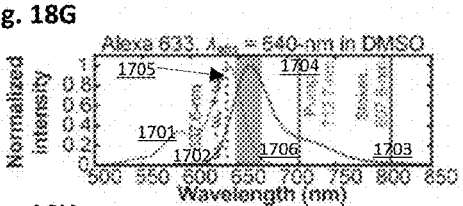 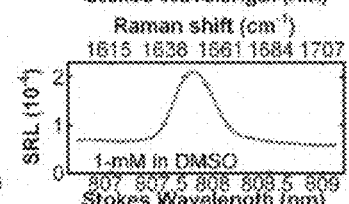 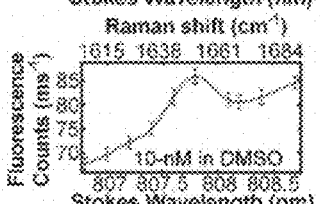
Fig. 18H 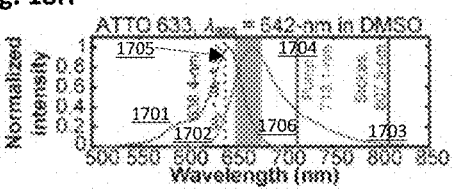 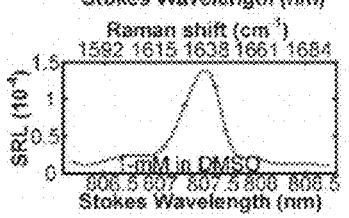 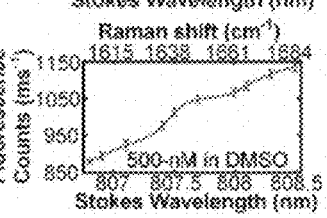

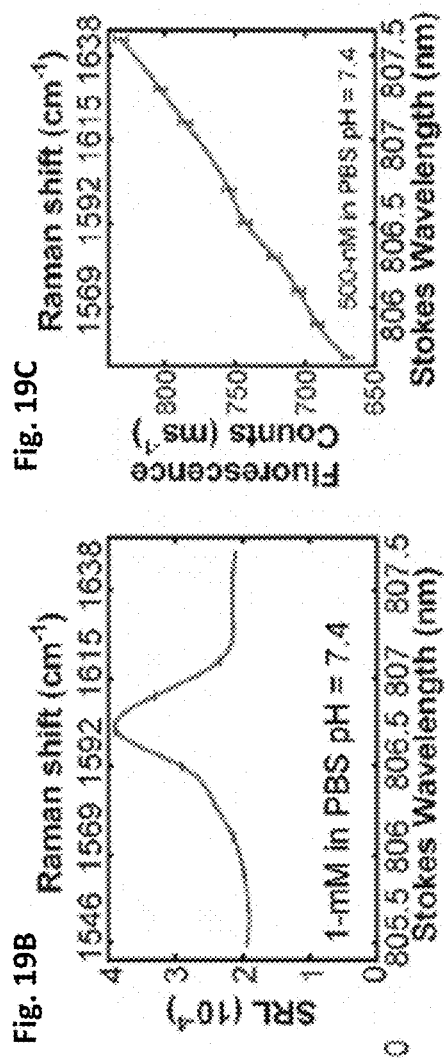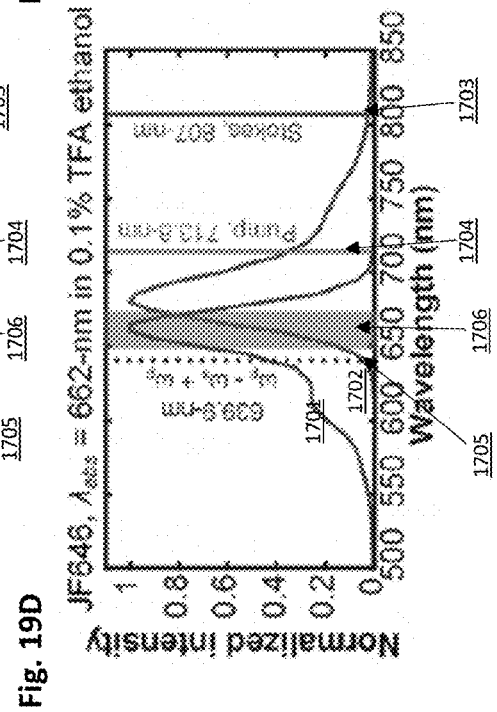
Fig. 19A Fig. 19B Fig. 19C Fig. 19D Fig. 19E Fig. 19F

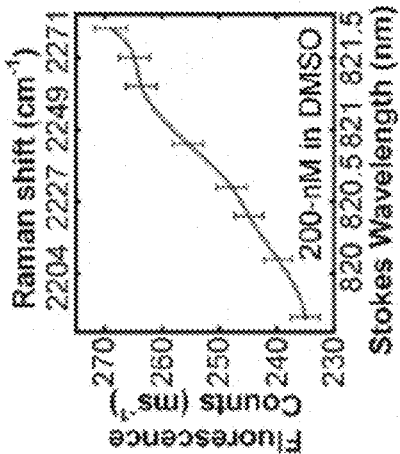
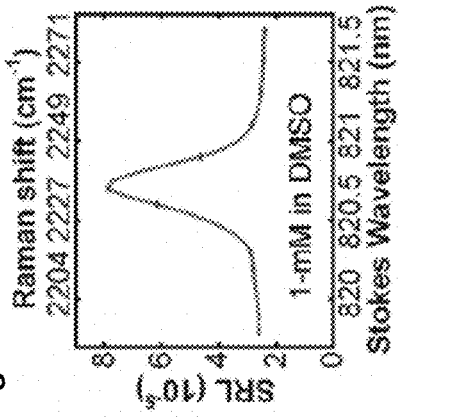
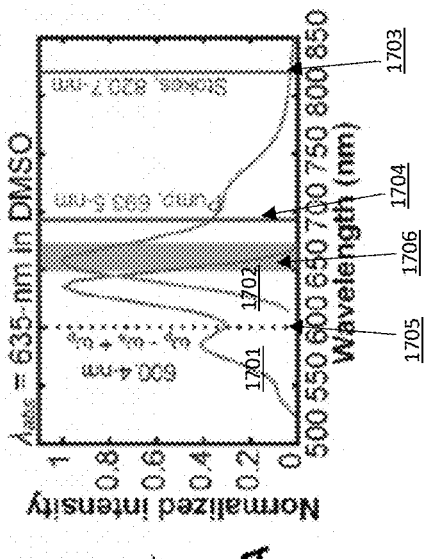
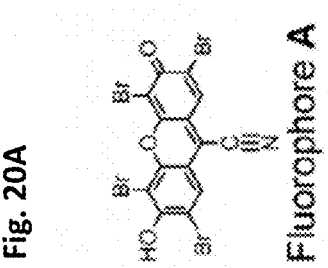
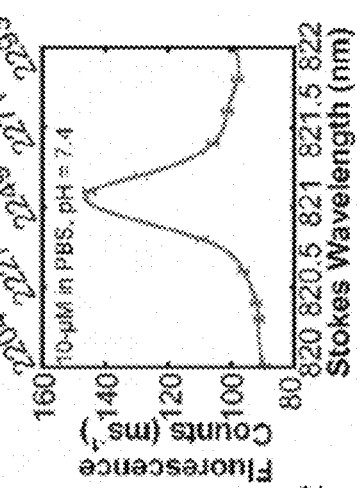
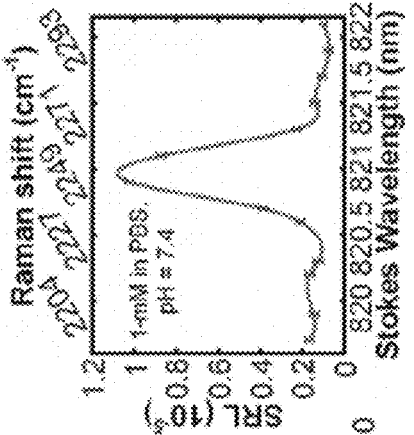
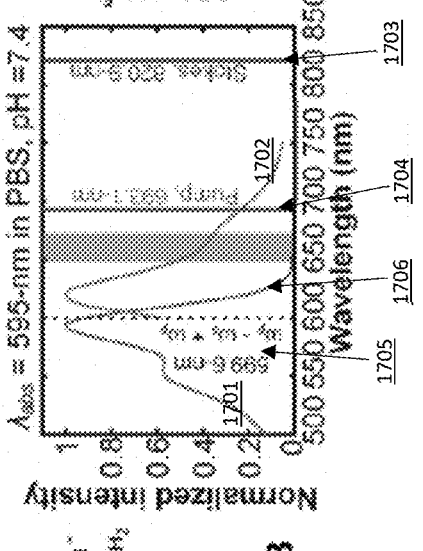
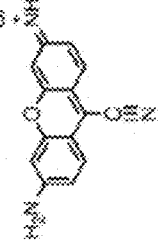

System 2400

STIMULATED RAMAN COUPLED FLUORESCENCE SPECTROSCOPY AND MICROSCOPY SYSTEM AND METHOD

CROSS-REFERENCE TO RELATED APPLICATION(S)

This application is a continuation of International Patent Application No. PCT/US2020/022333, filed on Mar. 12, 2020, that published as International Patent Publication No. WO 2020/186026 on Sep. 17, 2020, and also relates to and claims priority from U.S. Provisional Patent Application No. 62/817,327, filed on Mar. 12, 2019, the entire disclosures of which are incorporated herein by reference.

STATEMENT REGARDING FEDERALLY SPONSORED RESEARCH

This invention was made with government support under Grant Nos. EB020892 and GM128214, awarded by the National Institutes of Health. The government has certain rights in the invention.

FIELD OF THE DISCLOSURE

The present disclosure relates generally to Raman scattering, and more specifically, to exemplary embodiments of exemplary stimulated Raman coupled fluorescence spectroscopy and microscopy system and method.

BACKGROUND INFORMATION

The current big data era has created increasing demands for rapid accumulation of massive information, where high-throughput multiplexed detection of large number of targets is highly desirable. Optical detection is one of the most efficient methods for non-invasive information readout at far field. As a result, many optical multiplexing techniques have been developed, such as multiplexed microscopy and barcoding. These techniques are primarily based on fluorescence of organic dyes, fluorescent proteins or inorganic luminescent nanomaterials including quantum dots, rare earth nanoparticles and up-conversion nanocrystals.

However, due to the broad linewidth and significant overlap in fluorescence spectra, the number of resolvable features for fluorescence detection is limited. Thus, multiplexed fluorescence microscopy can achieve fewer than 10-color simultaneous imaging, requiring the use of complicated optical setup and spectral un-mixing, and less than 2000 optical barcodes can be created even with combinatory spectral encoding, due to the unavoidable crosstalk and self-quenching issues.

Multiplexing refers to high-throughput simultaneous measurement of a large number of distinctive species. Modern life science and technology has increasing demands for multiplexing techniques, such as simultaneous visualization of multiple components in a protein complex or multiple organelles in a single cell with molecular imaging probes, high-throughput detection of antigens or small molecules for cell sorting, medical diagnostics and drug discovery with bead-based suspension assays and high-density information storage and encryption for identity security and anti-counterfeiting. To achieve multiplexing in a complex system, it requires a matrix of distinguishable codes that can be readily applied and identified, and optical codes are one of the most popular methods for non-invasive and non-destructive readout at far field.

Many luminescent materials have been developed over the last several decades for optical multiplexing. For example, organic dyes and fluorescent proteins are widely applied for multicolor imaging in biological systems and inorganic luminescent materials including quantum dots, metal nanostructures, rare earth nanoparticles, and up-conversion nanocrystals are commonly used in spectral barcoding for multiplexed identification, which is key to high-throughput screening and data security applications. However, because of the broad linewidth and significant spectral overlap, the number of resolvable features in current luminescent materials is limited. Less than 7 colors can be practically imaged in live cells by fluorescence multiplexing microscopy requiring multiple lasers, filters and detectors as well as complicated spectral unmixing and color compensation. And fewer than 2000 spectral barcodes can be reached with combinatory encoding due to the unavoidable crosstalk in organic dyes, FRET energy transfer between different quantum dots limited number of suitable features and complicated decoding procedures with rare-earth nanocrystals and metal nanoparticles. Therefore, new methods that can overcome the spectral limitation and break the long-standing "multiplexing ceiling" are greatly needed.

Thus, it may be beneficial to provide exemplary optical super-multiplexing systems, compounds, and methods which utilize fluorescent compounds, that can overcome at least some of the deficiencies described herein above.

SUMMARY OF EXEMPLARY EMBODIMENTS

Optical multiplexing impacts widely in life science, medicine, and information technology. Current multiplexing techniques are restricted to a limited number due to the spectral overlap and significant crosstalk in luminescent materials.

In one exemplary embodiment of the present disclosure, exemplary methods can be provided for imaging fluorescent probes, with improved signal to noise ratios relative to conventional fluorescence detection, and the exploitation of their optical properties for super-multiplexed detection. In one aspect of such exemplary embodiment, the method is Stimulated Raman Coupled Fluorescence (SRCF). In another exemplary embodiment of the present disclosure, the method can be or include Stimulated Raman Excited Fluorescence (SREF).

Vibrational-based spectroscopy and microscopy have made profound impact to chemistry, material science and biology because of exquisite chemical specificity. Unfortunately, vibrational signal is intrinsically weak. Currently, the only viable way to achieve single-molecule level sensitivity is through surface-enhanced Raman scattering ("SERS") or tip-enhanced Raman scattering ("TERS"). However, the strict reliance on close contact with metallic nanostructures limits their applicability in many chemical and biological systems.

According to the present disclosure, an all far-field new nonlinear spectroscopy/microscopy called Stimulated Raman Coupled Fluorescence ("SRCF") can be developed. To achieve high sensitivity vibrational spectroscopy and microscopy down to single molecule level, first, electronic pre-resonance stimulated Raman scattering ("epr-SRS") can be adopted to ensure an enhancement factor more than 1011 for Raman process; second, instead of directly detecting stimulated Raman loss (or gain) on giant pump laser background (or Stokes laser background), a probe process can be employed to couple the Raman transition to electronic excited-state population for subsequent fluorescence detection, the large Stokes shift of fluorescence emission ensures laser background free detection, and hence significantly improved the signal-to-noise ratio. Specifically, there are two types of coupling. The first one is called stimulated Raman excited fluorescence ("SREF"). In SREF, a probe beam is used to directly excite the molecule from the hot band generated by epr-SRS to an electronic excited state for fluorescence emission. The second one can be called stimubetween 2 and 200 members, more typically, between 10 and 100 members, and still more typically, between 4 and 50 members. In another exemplary embodiment of the present disclosure, the exemplary use of the fluorescent probes described herein can be provided in optical super-multiplexing by Raman scattering, using SRCF or SREF.

Fluorescent compounds typically fall into one of the following categories:

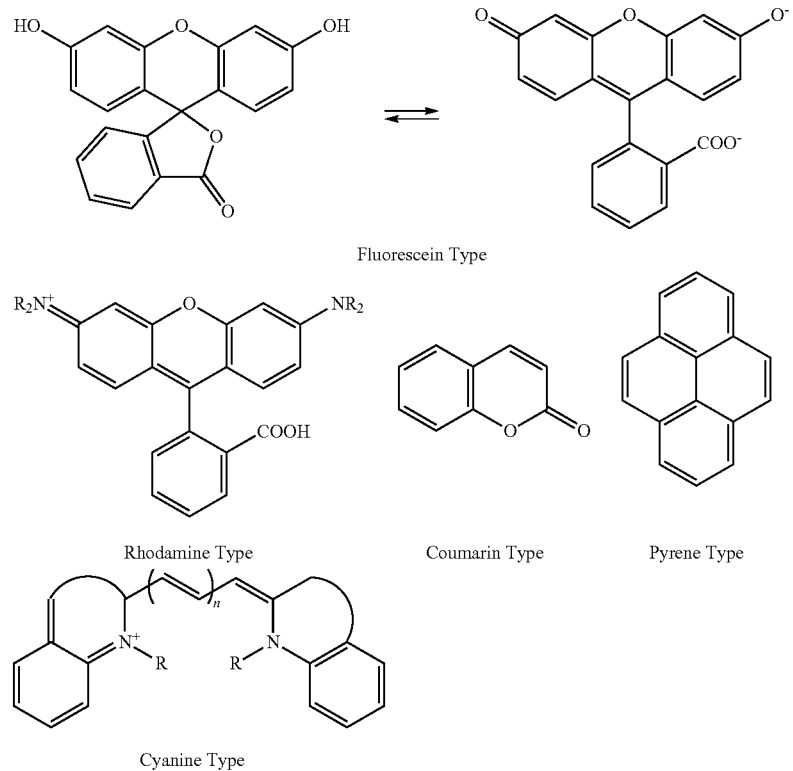

lated Raman attenuated fluorescence ("SRAF"). In SRAF, a ground state depletion can be induced by epr-SRS process when Raman resonance is satisfied, which will result in the decreasing of fluorescence originated from probe beam induced electronic transitions started from ground state or other vibrational excited states. For both SREF and SRAF, the electron transition induced by probe beam could be either one-photon excitation or multiphoton excitation.

For example, single molecule SREF spectroscopy and microscopy of the C≡N mode of Rhodamine 800 dye molecule and its three isotopologues containing isotopically-edited nitrile bonds have been achieved. In principle, with proper laser configuration, the method can be applied to all electronic transition coupled Raman modes of all fluorescence molecules. Application-wise, with exquisite chemical selectivity and ultimate sensitivity, SRCF holds great promise to impact chemistry, biophysics and material science, being complementary to SERS and TERS. For biophotonics, with improved sensitivity over epr-SRS, SREF is poised for super-multiplex biomedical imaging. Moreover, with single-molecule imaging demonstrated with SREF, localization-based super-resolution vibrational nanoscopy could also be anticipated.

In an exemplary embodiment of the present disclosure, the fluorescent probes are present in libraries which include In these compounds, one or more of the aromatic rings can be functionalized with a functional group, such as a nitrile, amine, ketone, aldehyde, hydroxyl, thiol, ether, thiolether, carboxylic acid, ester, thiolester, amide, carbamate, urea, thiourea, phosphoric acid, and sulfonic acid groups. These groups can provide the fluorescent compounds with unique Raman spectral peaks, which can be separated from peaks present in other fluorescent compounds.

Rhodamine 800 is one representative fluorescent molecule.

A small library of fluorescent compounds can show a large number of distinct frequencies, with single strong peak and minimal crosstalk.

In some aspects of this exemplary embodiment, materials can be conjugated to the fluorescent compounds described herein. Representative materials to which the fluorescent compounds can be conjugated include, but are not limited to, nanoparticles, including nanobeads, nanorods, nanostars and nanowires, such as metallic nanostructures and carbon nanotubes, microparticles, including microbeads, such as polystyrene microbeads, nanobodies, antibodies, antibody mimetics, including nanobodies, antibody mimetics and antibodies which specifically bind to stem cells, cancer cells, immune cells, neurons, glia, bacteria, fungi, and/or viruses, nucleic acids, including DNA, including genomic DNA and cDNA, RNA, such as siRNA, mRNA, tRNA, tmRNA, ncRNA, rRNA, shRNA, ribotymes, and the like, riboswitches, aptamers, primers, probes, and artificial nucleic acid analogues, such as peptide nucleic acids, morpholino- and locked nucleic acids, glycol nucleic acids, and threose nucleic acids.

In one aspect of such exemplary embodiment, libraries of material-conjugated fluorescent compounds can be imaged using SRCF and/or SREF. Libraries which include these fluorescent compounds, which can target multiple organelles, can be used to image organelles in cells. Libraries which include fluorescent compounds linked to antibodies, nanobodies, antibody mimetics, nucleic acids, and the like, which bind to stem cells, cancer cells, immune cells, neurons, glia, bacteria, viruses, and/or fungi can be used to identify the presence of antigens, receptors, genetic materials, and/or the types of, stem cells, cancer cells, immune cells, neurons, glia, bacteria, viruses, and/or fungi present in a biological sample. Certain antibodies, monobodies, nucleic acids, aptamers, and the like can also be used to determine the presence of cellular products such as cytokines, proteins, and other factors.

In another exemplary embodiment, the fluorescent compounds are used to image organelles in cultured live cells. The methods involve culturing live cells, which can be derived from an in vitro tissue cell culture of interest or extracted from an in vivo subject of interest, incubating the cultured live cells with fluorescent compounds in culture media, wherein the fluorescent compounds each comprise a specific organelle-targeted probe, labeling the cultured live cells with the fluorescent compounds, and imaging the cells using stimulated Raman microscopy. In one aspect of such exemplary embodiment, the cultured live cells are seeded in a well before they are incubated and labeled with the fluorescent compounds, and then the cells are labeled with the fluorescent compounds, wherein the fluorescent compounds each comprise a specific organelle-targeted probe, which probes specifically target different organelles. Representative organelle-targeted probes include probes which target the plasma membrane, endoplasmic reticulum (ER), Golgi, mitochondria, lipid droplets, lysosome, nucleus, and tubulin in the cultured live cells.

In another exemplary embodiment of the present disclosure, the fluorescent compounds can be used in methods of live-cell tagging using spectral barcoded beads. The methods involve mixing polymeric microbeads, such as polystyrene beads, with spectral barcoded fluorescent compounds, binding the beads with the spectral barcoded fluorescent compounds to form barcoded beads, and culturing live cells, which can be derived from in vitro tissue cell culture of interest, or extracted from an in vivo subject of interest. The barcoded beads are incubated with the cultured live cells in culture media, which labels the cultured live cells with the barcoded beads. The cultured live cells can then be imaged using SRCF and/or SREF, and the spectral barcodes of the barcoded beads in the whole field of view can then be decoded.

In another exemplary embodiment of the present disclosure, the fluorescent compounds can be used to identify a population of cancer cells using flow cytometry, or other methods for sorting/counting cells. The methods involve associating one or more fluorescent compounds with live cells of a subject of interest, wherein the fluorescent compounds are conjugated with antibodies that detect, and bind to, specific cell surface markers of the live cells, and further wherein the antibodies bind to cell surface markers of the live cells. The live cells can be positioned in a focused flow stream of a flow cytometer; and imaged using SRCF and/or SREF. The resulting spectra can be analyzed to identify individual groups of live cells. Cells that are not cancer cells are not linked to the fluorescent compound-conjugated antibodies, whereas cancer cells are linked to the fluorescent compound-conjugated antibodies. By looking at the Raman spectrum, it is possible to separately identify cancer cells and non-cancer cells.

In another exemplary embodiment of the present disclosure, the fluorescent compounds can be used in methods of flow cytometry-based high throughput medical diagnosis. The methods involve associating one or more fluorescent compounds, which may be conjugated to one or more antibodies, nucleic acids or other molecules which form a complex with specific biological markers on specific subpopulations of cells which are indicative of a particular disease state with live cells of a subject of interest, wherein specific subpopulations of the live cells are specifically associated with distinct sets of fluorescent compounds. The live cells are positioned in a flow cytometer, and subjected to SRCF and/or SREF methods to identify individual groups of live cells.

An analysis of the Raman scattering spectrum can provide a diagnosis of a specific disease, based on the binding of the fluorescent compounds to specific subpopulations of cells, if present in the cell population. Thus, the presence of cells within one or more sub-populations can be detected, and correlated with a particular disease state. For example, where it is unclear whether a patient has a bacterial or viral infection, fluorescent compounds conjugated to antibodies, nucleic acids or other molecules can be used which bind to bacteria, preferably to one or more specific bacteria, and if a bacteria, ideally a specific type of bacteria, is detected, appropriate antibiotics can be administered, and if a bacteria is not detected, antibiotic administration can be avoided. This can be particularly advantageous where a patient has sepsis or bacterial meningitis, and real-time assays can be particularly preferred over typical cell culture-based approaches, which often cause delays in patients receiving appropriate care.

Another exemplary embodiment of the present disclosure can involve methods of cell sorting. The methods involve associating fluorescent compounds with live cells of a subject of interest, wherein specific subpopulations of the live cells are specifically associated with distinct sets of fluorescent compounds. The specific subpopulations of live cells are sorted using spectroscopy, based on the specific association of the subpopulation of cells with a distinct set of fluorescent compounds. SRCF and/or SREF can be used to identify the cells. When libraries of fluorescent compounds are used, each of which binds to a different subpopulation of cells, and each of which has a different "spectral barcode," a single biological sample can be screened for multiple subpopulations of cell types.

In another exemplary embodiment of the present disclosure, the fluorescent compounds can be used to produce a cell atlas in vivo. The exemplary methods involve associating fluorescent compounds with live cells of a subject of interest, wherein specific subpopulations of the live cells are specifically associated with distinct sets of fluorescent compounds; mapping relationships between the specific subpopulations of live cells, wherein the specific subpopulations of live cells are distinguishable by their specific association with a distinct set of fluorescent compounds.

A library comprising two or more fluorescent compounds can be present in a kit for imaging cultured live cells. The kit can include one or more non-specifically targeted fluorescent compounds, organelle-targeted fluorescent compounds, spectral barcoded fluorescent compounds, fluorescent compounds attached to a bead or other microparticle, and/or fluorescent compounds attached to metal nanostructures, as well as instructions for using the fluorescent compounds in cultured live cell imaging using SRCF and/or SREF. In an exemplary embodiment of the present disclosure, the kit comprises non-specifically targeted fluorescent compounds, organelle-targeted fluorescent compounds, and spectral barcoded fluorescent compounds, as well as instructions for using the fluorescent compounds in cultured live cell imaging using SRCF and/or SREF.

In one exemplary embodiment of the present disclosure, where the exemplary method and/or kit is used to search for cancer cells, stem cells, immune cells, neurons, glia, bacteria, fungi, viruses, and/or other types of biological particles, the fluorescent compounds are attached to a solid support, such as a nanoparticle, microparticle, or metal nanostructure, such as a gold particle. In one aspect of this exemplary embodiment, the diameter of the particle is between about 2 and about 200 nm, more typically, between about 2 and about 100 nm, and still more typically, between about 4 and about 50 nm.

In another exemplary embodiment of the present disclosure, where the method and/or kit can be used to identify DNA, one or more primers and/or probes are conjugated to one or more fluorescent compounds, and the one or more primers and/or probes are used in screening methods where fluorescently-labeled primers and/or probes might otherwise be used, except that, whereas fluorescence is typically used to detect the presence or absence of fluorescently-labeled primers and/or probes, SRCF and/or SREF is used to detect the presence or absence of primers and/or probes labeled with the fluorescent compounds.

Further, in one exemplary embodiment of the present disclosure, a modified excitation source is provided in order to explore SREF spectroscopy in the visible region. In particular, a large palette of red dyes can be harnessed in order to systematically study SREF spectroscopy on a dozen of different cases with a fine spectral interval of several nanometers. The results can establish the generality of SREF spectroscopy for a wide range of molecules, but also reveal a tight window of proper electronic pre-resonance for the stimulated Raman pumping process.

In an exemplary embodiment of the present disclosure, an exemplary computer-accessible medium, system, and method for providing an excited fluorescence radiation can include, with a beam of a probe, exciting a molecule to an excited state for a fluorescence emission to effectuate the excited fluorescence radiation and detecting the molecule based on the fluorescence emission, wherein the beam of the probe is in either the near-infrared or visible light spectrum.

In some exemplary embodiments of the present disclosure, the excitation of the molecule can include: exciting the molecule to an intermediate vibrational state and then exciting the molecule in the intermediate vibrational state to the excited state. For example, the molecule can be excited to the intermediate vibrational state through stimulated Raman scattering, e.g., electronic pre-resonance stimulated Raman scattering ("epr-SRS"). Further, the beam of the probe can be in one of the near-infrared or visible light spectrum. Further, the molecule can be a fluorescent compound. Further, the fluorescent compound can be one of a fluorescein type, a rhodamine type, a coumarin type, a pyrene type, or a cyanine type. Further, one or more aromatic rings of the fluorescent compound can be functionalized with one of a nitrile group, an amine group, a ketone group, an aldehyde group, a hydroxyl group, a thiol group, an ether group, a thiolether group, a carboxylic acid group, an ester group, a thiolester group, an amide group, a carbamate group, a urea group, a thiourea group, a phosphoric acid group, or a sulfonic acid group. Further, the fluorescent compound can be conjugated with one of a nanoparticle or a microparticle. For example, the nanoparticle is one of a nanobead, a nanorod, a nanostar, or a nanowire, wherein the nanowire can be one of a metallic nanostructure or a carbon nanotube. Further, the microparticle can be one of a polystyrene microbead, nanobody, antibody mimetics, and antibodies which bind to one of stem cells, cancer cells, immune cells, neurons, glia, bacteria, fungi, viruses, nucleic acids, or artificial nucleic acid analogues.

Further, in some exemplary embodiments of the present disclosure, the exemplary computer-accessible medium, system, and method for providing an excited fluorescence radiation can also include imaging organelles in cultured live cells based on the fluorescent compound. Further, the cultured live cells can be seeded in a well before being incubated and labeled with the fluorescent compound, and wherein the fluorescent compounds each comprises a specific organelle-targeted probe. Further, the organelle-target probe can target one of a plasma membrane, an endoplasmic reticulum (ER), a Golgi, a mitochondria, lipid droplets, a lysosome, a nucleus, or a tubulin in the cultured live cells.

Further, in some exemplary embodiments of the present disclosure, the exemplary computer-accessible medium, system, and method for providing an excited fluorescence radiation can also include identifying a population of cancer cells using flow cytometry based on the fluorescent compound.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIGS. 1A-1D, 1F and 1G are exemplary energy diagrams according to an exemplary embodiment of the present disclosure;

FIG. 1E is an exemplary schematic diagram of the exemplary apparatus according to an exemplary embodiment of the present disclosure;

FIG. 2A is an exemplary graph illustrating stimulated Raman excited fluorescence spectroscopy on Rhodamine 800 according to an exemplary embodiment of the present disclosure;

FIGS. 2B and 2C are exemplary spectrum diagrams according to an exemplary embodiment of the present disclosure;

FIG. 2D is an exemplary graph illustrating a pure stimulated Raman excited fluorescence spectroscopy signal as a function of the relative time delay between pump and Stokes pulses according to an exemplary embodiment of the present disclosure;

FIG. 2E is an exemplary graph illustrating a pump-power dependence of a pure stimulated Raman excited fluorescence signal according to an exemplary embodiment of the present disclosure;

FIG. 2F is an exemplary graph illustrating a Stokes-power dependence of a pure stimulated Raman excited fluorescence signal according to an exemplary embodiment of the present disclosure;

FIG. 2G is an exemplary graph illustrating the dependence of pure stimulated Raman excited fluorescence on Rh800 concentrations in Dimethyl sulfoxide according to an exemplary embodiment of the present disclosure;

FIG. 3A is an exemplary molecular diagram of the chemical structure of Rh800 and its three derivatives according to an exemplary embodiment of the present disclosure;

FIG. 3B is an exemplary graph illustrating absorption and emission spectra for four Rh800 isotopologues according to an exemplary embodiment of the present disclosure;

FIG. 3C is an exemplary graph illustrating stimulated Raman excited fluorescence excitation spectra and the corresponding Stimulated Raman Scattering spectra according to an exemplary embodiment of the present disclosure;

FIG. 3D is an exemplary fluorescence image according to an exemplary embodiment of the present disclosure;

FIG. 3E is an exemplary graph illustrating stimulated Raman excited fluorescence spectra of cells according to an exemplary embodiment of the present disclosure:

FIG. 3F is an exemplary SREF image according to an exemplary embodiment of the present disclosure;

FIGS. 4A and 4B are exemplary graphs illustrating ensemble stimulated Raman excited fluorescence spectra of Rh800 and its isotopologues according to an exemplary embodiment of the present disclosure;

FIG. 4C is an exemplary single-molecule fluorescence image excited by a 660 nm laser according to an exemplary embodiment of the present disclosure;

FIGS. 4D and 4E are a set of exemplary images and a corresponding graph of the recording of stimulated Raman excited fluorescence spectra of two Rh800 molecules simultaneously according to an exemplary embodiment of the present disclosure;

FIGS. 4F and 4G are a set of exemplary images and a corresponding graph of a recording of stimulated Raman excited fluorescence spectra of the same molecule according to an exemplary embodiment of the present disclosure;

FIGS. 4H and 4I are a set of exemplary images and a corresponding graph of single molecule stimulated Raman excited fluorescence of Rh800 isotopologues according to an exemplary embodiment of the present disclosure;

FIG. 4J is an exemplary graph illustrating a t-test of signals between the on-resonance channel and its adjacent two off-resonance channels according to an exemplary embodiment of the present disclosure;

FIG. 4K is an exemplary graph illustrating the on/off ratio distribution from FIG. 4J according to an exemplary embodiment of the present disclosure;

FIG. 6A is an exemplary energy diagram, and a set of pump wavelength graphs for C≡N mode in DMSO according to an exemplary embodiment of the present disclosure;

FIG. 6B is an exemplary energy diagram, and a set of pump wavelength graphs for C=C mode in DMSO according to an exemplary embodiment of the present disclosure;

FIG. 6C is an exemplary graph illustrating the concentration dependence of the C=C mode a pure stimulated Raman excited fluorescence signal according to an exemplary embodiment of the present disclosure:

FIG. 9A is an exemplary molecular diagram of the chemical structure of MARS dyes and associated exemplary graphs illustrating Stimulated Raman Scattering spectra and Stokes power for $\lambda_{abs}$=735 nm according to an exemplary embodiment of the present disclosure;

FIG. 9B is an exemplary molecular diagram of the chemical structure of MARS dyes and associated exemplary graphs illustrating Stimulated Raman Scattering spectra and Stokes power $\lambda_{abs}$=790 nm according to an exemplary embodiment of the present disclosure;

FIG. 14A is an exemplary energy-level diagram of stimulated Raman excited fluorescence according to an exemplary embodiment of the present disclosure;

FIG. 14B is an exemplary energy-level diagram for a Stokes beam according to an exemplary embodiment of the present disclosure;

FIG. 14C is an exemplary single-molecule one-photon fluorescence image of Rh800 excited by a circular polarized 600 nm CW laser according to an exemplary embodiment of the present disclosure;

FIG. 14D is an exemplary single-molecule one-photon fluorescence image of Rh800 excited by a linear polarized 660-nm CW laser according to an exemplary embodiment of the present disclosure;

FIG. 14E is an exemplary single-molecule two-photon fluorescence image of Rh800 excited by linear-polarized Stokes beam according to an exemplary embodiment of the present disclosure;

FIG. 15A is an exemplary energy diagram according to an exemplary embodiment of the present disclosure;

FIG. 15B is an exemplary graph illustrating wavelength of a second harmonic generation of an optical parametric oscillator idler and corresponding resonance Raman shift according to an exemplary embodiment of the present disclosure;

FIG. 15C is an exemplary diagram of a laser microscopy system for single molecule stimulated Raman excited fluorescence according to an exemplary embodiment of the present disclosure;

FIG. 18A is a set of exemplary graphs illustrating a stimulated Raman excited fluorescence spectroscopy, a stimulated Raman scattering spectrum, and a stimulated Raman excited fluorescence spectrum of Alexa 633 (Carboxy) in PBS (pH=7.4) according to an exemplary embodiment of the present disclosure;

FIG. 18B is a set of exemplary graphs illustrating a stimulated Raman excited fluorescence spectroscopy, a stimulated Raman scattering spectrum, and a stimulated Raman excited fluorescence spectrum of ATTO 610 (NHS ester) in DMSO according to an exemplary embodiment of the present disclosure;

FIG. 18C is a set of exemplary graphs illustrating a stimulated Raman excited fluorescence spectroscopy, a stimulated Raman scattering spectrum, and a stimulated Raman excited fluorescence spectrum of ATTO Rho14 (NHS ester) in PBS (pH=7.4) according to an exemplary embodiment of the present disclosure;

FIG. 18D is a set of exemplary graphs illustrating a stimulated Raman excited fluorescence spectroscopy, a stimulated Raman scattering spectrum, and a stimulated Raman excited fluorescence spectrum of Nile Blue A in ethanol according to an exemplary embodiment of the present disclosure;

FIG. 18E is a set of exemplary graphs illustrating a stimulated Raman excited fluorescence spectroscopy, a stimulated Raman scattering spectrum, and a stimulated Raman excited fluorescence spectrum of ATTO 633 (NHS ester) in PBS (pH=7.4) according to an exemplary embodiment of the present disclosure;

FIG. 18F is a set of exemplary graphs illustrating a stimulated Raman excited fluorescence spectroscopy, a stimulated Raman scattering spectrum, and a stimulated Raman excited fluorescence spectrum of ATTO Rho14 (NHS ester) in DMSO according to an exemplary embodiment of the present disclosure;

FIG. 18G is a set of exemplary graphs illustrating a stimulated Raman excited fluorescence spectroscopy, a stimulated Raman scattering spectrum, and a stimulated Raman excited fluorescence spectrum of Alexa 633 (Carboxy) in DMSO according to an exemplary embodiment of the present disclosure;

FIG. 18H is a set of exemplary graphs illustrating a stimulated Raman excited fluorescence spectroscopy, a stimulated Raman scattering spectrum, and a stimulated Raman excited fluorescence spectrum of ATTO 633 (NHS ester) in DMSO according to an exemplary embodiment of the present disclosure;

FIG. 19A is an exemplary graph illustrating stimulated Raman excited fluorescence spectroscopy for Alexa 647 (NHS ester) according to an exemplary embodiment of the present disclosure;

FIG. 19B is an exemplary graph illustrating a stimulated Raman scattering spectrum of Alexa 647 (NHS ester) according to an exemplary embodiment of the present disclosure;

FIG. 19C is an exemplary graph illustrating a stimulated Raman excited fluorescence spectrum of Alexa 647 (NHS ester) according to an exemplary embodiment of the present disclosure;

FIG. 19D is an exemplary graph illustrating stimulated Raman excited fluorescence spectroscopy for JF646 (NHS ester) according to an exemplary embodiment of the present disclosure;

FIG. 19E is an exemplary graph illustrating a stimulated Raman scattering spectrum of JF646 (NHS ester) according to an exemplary embodiment of the present disclosure;

FIG. 19F is an exemplary graph illustrating a stimulated Raman excited fluorescence spectrum of JF646 (NHS ester) according to an exemplary embodiment of the present disclosure;

FIG. 20A is an exemplary diagram illustrating a first synthesized dye according to an exemplary embodiment of the present disclosure;

FIG. 20B is an exemplary graph illustrating stimulated Raman excited fluorescence spectroscopy for the first synthesized dye in FIG. 20A according to an exemplary embodiment of the present disclosure;

FIG. 20C is an exemplary graph illustrating a stimulated Raman scattering spectrum of the first synthesized dye in FIG. 20A according to an exemplary embodiment of the present disclosure;

FIG. 20D is an exemplary graph illustrating a stimulated Raman excited fluorescence spectrum of the first synthesized dye in FIG. 20A according to an exemplary embodiment of the present disclosure;

FIG. 20E is an exemplary diagram illustrating a second synthesized dye according to an exemplary embodiment of the present disclosure;

FIG. 20F is an exemplary graph illustrating stimulated Raman excited fluorescence spectroscopy for the second synthesized dye in FIG. 20E according to an exemplary embodiment of the present disclosure;

FIG. 20G is an exemplary graph illustrating a stimulated Raman scattering spectrum of the second synthesized dye in FIG. 20E according to an exemplary embodiment of the present disclosure;

FIG. 20H is an exemplary graph illustrating a stimulated Raman excited fluorescence spectrum of the second synthesized dye in FIG. 20E according to an exemplary embodiment of the present disclosure;

Figure 5:
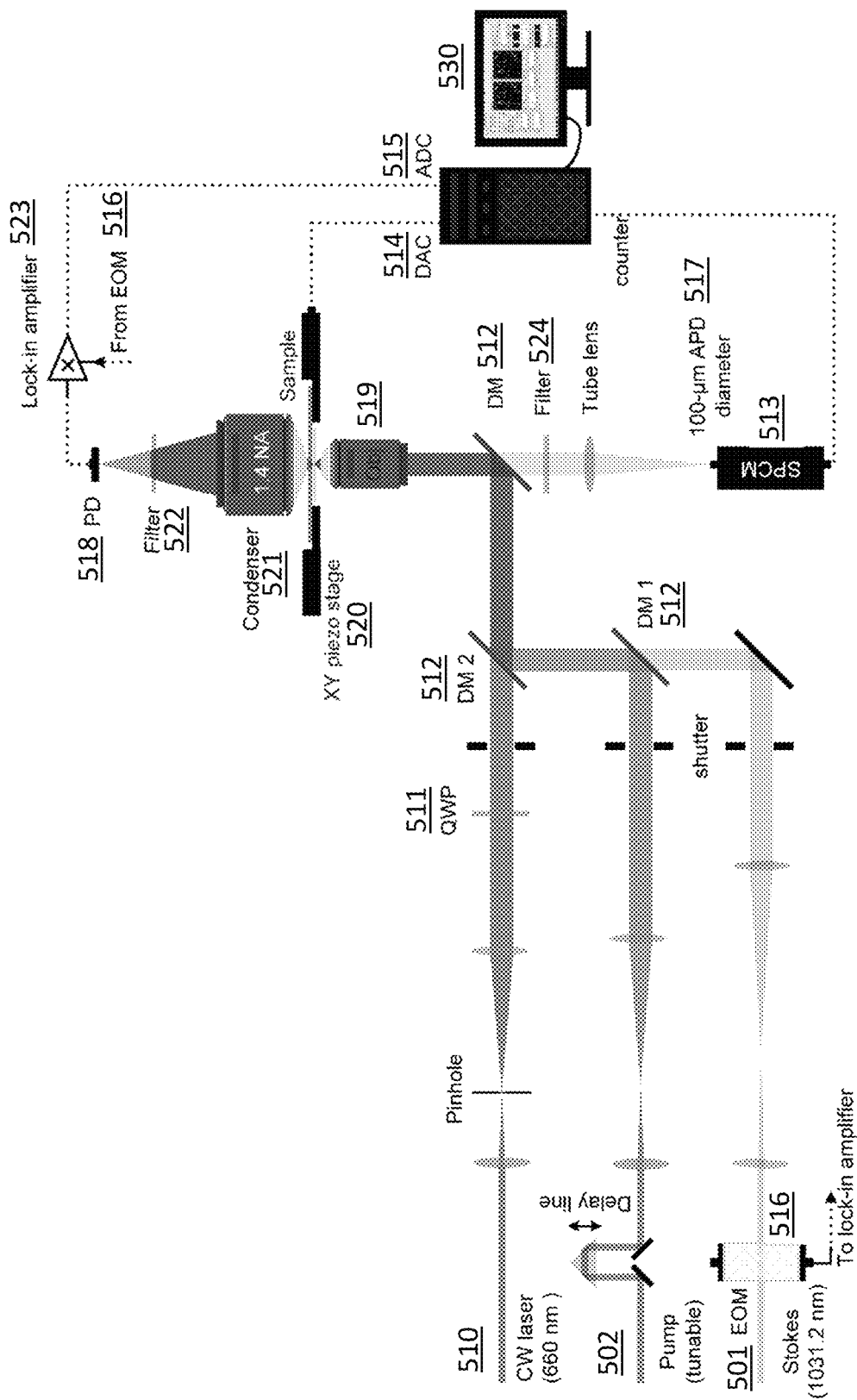
FIG. 5 is an exemplary diagram of a laser microscopy system for single molecule stimulated Raman excited fluorescence according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the Figures, it is done so in connection with the illustrative embodiments and is not limited by the particular embodiments illustrated in the figures.

DETAILED DESCRIPTION OF EXEMPLARY EMBODIMENTS

Some exemplary modes for carrying out the present disclosure are presented in terms of its aspects, herein discussed below. However, the present disclosure is not limited to the described embodiment and a person skilled in the art will appreciate that many other embodiments of the present disclosure are possible without deviating from the basic concept of the present disclosure, and that any such work around will also fall under scope of this application. It is envisioned that other styles and configurations of the present disclosure can be easily incorporated into the teachings of the present disclosure, and only one particular configuration shall be shown and described for purposes of clarity and disclosure and not by way of limitation of scope.

Exemplary Definitions

The term "independently" can be used herein to indicate that the variable, which is independently applied, varies independently from application to application. Thus, in a compound such as R"XYR", wherein R" is "independently carbon or nitrogen," both R" can be carbon, both R" can be nitrogen, or one R" can be carbon and the other R" nitrogen.

The term "alkyl," as used herein, unless otherwise specified, can refer to a saturated straight, branched, or cyclic, primary, secondary, or tertiary hydrocarbons, including both substituted and unsubstituted alkyl groups. The alkyl group can be optionally substituted with any moiety that does not otherwise interfere with the reaction or that provides an improvement in the process, including but not limited to but limited to halo, haloalkyl, hydroxyl, carboxyl, acyl, aryl, acyloxy, amino, amido, carboxyl derivatives, alkylamino, dialkylamino, arylamino, alkoxy, aryloxy, nitro, cyano, sulfonic acid, thiol, imine, sulfonyl, sulfanyl, sulfinyl, sulfamonyl, ester, carboxylic acid, amide, phosphonyl, phosphinyl, phosphoryl, phosphine, thioester, thioether, acid halide, anhydride, oxime, hydrozine, carbamate, carbonate, urea, phosphonic acid, or phosphonate, either unprotected, or protected as necessary, as known to those skilled in the art, for example, as taught in Greene, et al., Protective Groups in Organic Synthesis, John Wiley and Sons, Second Edition, 1991, hereby incorporated by reference. Specifically included are $CF_3$ and $CH_2CF_3$.

In the text, whenever the term C(alkyl range) is used, the term independently can include each member of that class as if specifically and separately set out. The term "alkyl" can include $C_{1-22}$ alkyl moieties, and the term "lower alkyl" includes $C_{1-6}$ alkyl moieties. It is understood to those of ordinary skill in the art that the relevant alkyl radical is named by replacing the suffix "-ane" with the suffix "-yl".

The term "alkenyl" can refer to an unsaturated, hydrocarbon radical, linear or branched, in so much as it contains one or more double bonds. The alkenyl group disclosed herein can be optionally substituted with any moiety that does not adversely affect the reaction process, including but not limited to but not limited to those described for substituents on alkyl moieties. Non-limiting examples of alkenyl groups include ethylene, methylethylene, isopropylidene, 1,2-ethane-diyl, 1,1-ethane-diyl, 1,3-propane-diyl, 1,2-propane-diyl, 1,3-butane-diyl, and 1,4-butane-diyl.

The term "alkynyl" can refer to an unsaturated, acyclic hydrocarbon radical, linear or branched, in so much as it contains one or more triple bonds. The alkynyl group can be optionally substituted with any moiety that does not adversely affect the reaction process, including but not limited to those described above for alkyl moieties. Non-limiting examples of suitable alkynyl groups include ethynyl, propynyl, hydroxypropynyl, butyn-1-yl, butyn-2-yl, pentyn-1-yl, pentyn-2-yl, 4-methoxypentyn-2-yl, 3-methylbutyn-1-yl, hexyn-1-yl, hexyn-2-yl, and hexyn-3-yl, 3,3-dimethylbutyn-1-yl radicals.

The term "alkylamino" or "arylamino" can refer to an amino group that has one or two alkyl or aryl substituents, respectively.

The term "acyl" can refer to a carboxylic acid ester in which the non-carbonyl moiety of the ester group is selected from the group consisting of straight, branched, or cyclic alkyl or lower alkyl, alkoxyalkyl, including, but not limited to methoxymethyl, aralkyl, including, but not limited to, benzyl, aryloxyalkyl, such as phenoxymethyl, aryl, including, but not limited to, phenyl, optionally substituted with halogen (F, Cl, Br, or I), alkyl (including but not limited to $C_1$, $C_2$, $C_3$, and $C_4$) or alkoxy (including but not limited to $C_1$, $C_2$, $C_3$, and $C_4$), sulfonate esters such as alkyl or aralkyl sulphonyl including but not limited to methanesulfonyl, the mono, di or triphosphate ester, trityl or monomethoxytrityl, substituted benzyl, trialkylsilyl (e.g., dimethyl-t-butylsilyl) or diphenylmethylsilyl. Aryl groups in the esters optimally comprise a phenyl group. The term "lower acyl" refers to an acyl group in which the non-carbonyl moiety is lower alkyl.

The term "aliphatic" can refer to hydrocarbons which are not aromatic, including those having an open chain structure, such as alkanes, alkenes, and alkynes, ideally those with from 1-12 carbons, and cyclic hydrocarbons, ideally those with from 3-10 carbons.

The terms "alkoxy" and "alkoxyalkyl" can embrace linear or branched oxy-containing radicals having alkyl moieties, such as methoxy radical. The term "alkoxyalkyl" also embraces alkyl radicals having one or more alkoxy radicals attached to the alkyl radical, that is, to form monoalkoxyalkyl and dialkoxyalkyl radicals. The "alkoxy" radicals can be further substituted with one or more halo atoms, such as fluoro, chloro or bromo, to provide "haloalkoxy" radicals. Examples of such radicals include fluoromethoxy, chloromethoxy, tri fluoromethoxy, difluoromethoxy, trifluoroethoxy, fluoroethoxy, tetrafluoroethoxy, pentafluoroethoxy, and fluoropropoxy.

The term "alkylamino" can denote "monoalkylamino" and "dialkylamino" containing one or two alkyl radicals, respectively, attached to an amino radical. The terms arylamino denotes "monoarylamino" and "diarylamino" containing one or two aryl radicals, respectively, attached to an amino radical. The term "aralkylamino", embraces aralkyl radicals attached to an amino radical. The term aralkylamino denotes "monoaralkylamino" and "diaralkylamino" containing one or two aralkyl radicals, respectively, attached to an amino radical. The term aralkylamino further denotes "monoaralkyl monoalkylamino" containing one aralkyl radical and one alkyl radical attached to an amino radical.

The term "aryl", alone or in combination, can mean a carbocyclic aromatic system containing one, two or three rings wherein such rings can be attached together in a pendent manner or can be fused. Non-limiting examples of aryl include phenyl, biphenyl, or naphthyl, or other aromatic groups that remain after the removal of a hydrogen from an aromatic ring. The term aryl includes both substituted and unsubstituted moieties.

The terms "alkaryl" or "alkylaryl" can refer to an alkyl group with an aryl substituent. The terms "aralkyl" or "arylalkyl" refer to an aryl group with an alkyl substituent.

The term "heteroatom," as used herein, can refer to oxygen, sulfur, nitrogen and phosphorus.

The terms "heteroaryl" or "heteroaromatic," as used herein, can refer to an aromatic that includes at least one sulfur, oxygen, nitrogen or phosphorus in the aromatic ring. In some exemplary embodiments, the heteroaryl ring can be a moiety with 5-10 ring atoms of which 1-5 ring atoms are heteroatoms.

The term "heteroarylalkyl" can refer to a heteroaryl moiety attached to a $C_{1-12}$ alkyl group.

The aryl, arylalkyl, alkylaryl, heteroaryl, and heterarylalkyl groups can optionally be substituted with any moiety that does not adversely affect the ability of the fluorescent compounds to be detected, including but not limited to those described above for alkyl moieties. Non-limiting examples of substituted aryl include heteroarylamino, N-aryl-N-alkylamino, N-heteroarylamino-N-alkylamino, heteroaralkoxy, arylamino, arylalkylamino, arylthio, monoarylamidosulfonyl, arylsulfonamido, diarylamidosulfonyl, monoaryl amidosulfonyl, arylsulfinyl, arylsulfonyl, heteroarylthio, heteroarylsulfinyl, heteroarylsulfonyl, aroyl, heteroaroyl, aralkanoyl, heteroaralkanoyl, hydroxyaralkyl, hydoxyheteroaralkyl, haloalkoxyalkyl, aryl, aralkyl, aryloxy, aralkoxy, aryloxyalkyl, saturated heterocyclyl, partially saturated heterocyclyl, heteroaryl, heteroaryloxy, heteroaryloxyalkyl, arylalkyl, heteroarylalkyl, arylalkenyl, and heteroarylalkenyl, carboaralkoxy. The term "halo," as used herein, can include chloro, bromo, iodo and fluoro.

The term "heterocyclic," "heterocyclyl," and cycloheteroalkyl can refer to a nonaromatic cyclic group wherein there is at least one heteroatom, such as oxygen, sulfur, nitrogen, or phosphorus in the ring.

Nonlimiting examples of heteroaryl and heterocyclic groups can include furyl, furanyl, pyridyl, pyrimidyl, thienyl, isothiazolyl, imidazolyl, tetrazolyl, pyrazinyl, benzofuranyl, benzothiophenyl, quinolyl, isoquinolyl, benzothienyl, isobenzofuryl, pyrazolyl, indolyl, isoindolyl, benzimidazolyl, purinyl, carbazolyl, oxazolyl, thiazolyl, isothiazolyl, 1,2,4-thiadiazolyl, isooxazolyl, pyrrolyl, quinazolinyl, cinnolinyl, phthalazinyl, xanthinyl, hypoxanthinyl, thiophene, furan, pyrrole, isopyrrole, pyrazole, imidazole, 1,2,3-triazole, 1,2,4-triazole, oxazole, isoxazole, thiazole, isothiazole, pyrimidine or pyridazine, and pteridinyl, aziridines, thiazole, isothiazole, 1,2,3-oxadiazole, thiazine, pyridine, pyrazine, piperazine, pyrrolidine, oxaziranes, phenazine, phenothiazine, morpholinyl, pyrazolyl, pyridazinyl, pyrazinyl, quinoxalinyl, xanthinyl, hypoxanthinyl, pteridinyl, 5-azacytidinyl, 5-azauracilyl, triazolopyridinyl, imidazolopyridinyl, pyrrolopyrimidinyl, pyrazolopyrimidinyl, adenine, N6-alkylpurines, N6-benzylpurine, N6-halopurine, N6-vinypurine, N6-acetylenic purine, N6-acyl purine, N6-hydroxyalkyl purine, N6-thioalkyl purine, thymine, cytosine, 6-azapyrimidine, 2-mercaptopyrmidine, uracil, N5-alkylpyrimidines, N5-benzylpyrimidines, N5-halopyrimidines, N5-vinylpyrimidine, N5-acetylenic pyrimidine, N5-acyl pyrimidine, N5-hydroxyalkyl purine, and N6-thioalkyl purine, and isoxazolyl. The heteroaromatic group can be optionally substituted as described above for aryl. The heterocyclic or heteroaromatic group can be optionally substituted with one or more substituents selected from the group consisting of halogen, haloalkyl, alkyl, alkoxy, hydroxy, carboxyl derivatives, amido, amino, alkylamino, and dialkylamino. The heteroaromatic can be partially or totally hydrogenated as desired. As a non-limiting example, dihydropyridine can be used in place of pyridine. Functional oxygen and nitrogen groups on the heterocyclic or heteroaryl group can be protected as necessary or desired. Suitable protecting groups are well known to those skilled in the art, and include trimethylsilyl, dimethylhexylsilyl, t-butyldimethylsilyl, and t-butyldiphenylsilyl, trityl or substituted trityl, alkyl groups, acyl groups such as acetyl and propionyl, methanesulfonyl, and p-toluenelsulfonyl. The heterocyclic or heteroaromatic group can be substituted with any moiety that does not adversely affect the reaction, including but not limited to but not limited to those described above for aryl.

The term "nucleic acid" can refer to DNA, including genomic DNA and cDNA, RNA, such as siRNA, mRNA, tRNA, tmRNA, ncRNA, rRNA, shRNA, ribozymes, and the like, riboswitches, aptamers, primers, probes, and artificial nucleic acid analogues, such as peptide nucleic acids, morpholino- and locked nucleic acids, glycol nucleic acids, and threose nucleic acids.

The term "peptide" can refer to a natural or synthetic compound containing two to one hundred amino acids linked by the carboxyl group of one amino acid to the amino group of another.

The term "protected", as used herein and unless otherwise defined, can refer to a group that is added to an oxygen, nitrogen, or phosphorus atom to prevent its further reaction or for other purposes. A wide variety of oxygen and nitrogen protecting groups are known to those skilled in the art of organic synthesis, and are described, for example, in Greene et al., Protective Groups in Organic Synthesis, supra.

The term "spectral barcoded fluorescent compounds" can relate to where multiple fluorescent compounds are used, each of which has a unique spectral band. These multiple fluorescent compounds can be conjugate to, or encapsulated within, a solid support, such as a nanoparticle or microparticle. Nanoparticles typically have a size between about 2 and about 100 nm, and microparticles typically have a diameter between about 0.1 and 100 µm. The solid support can also be conjugated to a binding member which is known to bind specifically to a biological particle of interest. By measuring the peaks of fluorescent compounds in the Raman spectrum from the biological sample, one can determine whether a biological particle of interest is present in a biological sample. The presence of multiple fluorescent compounds allows for the generation of multiple spectral bands, which provides a unique "barcode" to the solid support. In some exemplary embodiments, the spectral barcoding of fluorescent compounds in solid supports can be achieved by controlled physical absorption, such as using microfluidics, or controlled chemical synthesis.

The term "solid support" as used herein refers to any type of solid support to which one or more of the fluorescent compounds, and, ideally, a binding member, such as an antibody, nucleic acid, and the like, are bound. Examples include, but are not limited to, nanoparticles, including nanobeads, nanorods, nanostars and nanowires, such as metallic nanostructures and carbon nanotubes, microparticles, including microbeads, such as polystyrene microbeads, and chips.

As used herein, flow cytometry can be a laser- or impedance-based, biophysical technology employed in cell counting, cell sorting, biomarker detection and protein engineering. Cells are suspended in a stream of fluid, and passed through an electronic detection apparatus. A flow cytometer allows simultaneous multiparametric analysis of the physical and chemical characteristics of up to thousands of particles per second. A common variation involves linking the analytical capability of the flow cytometer to a sorting device, to physically separate and thereby purify particles of interest based on their optical properties. Such a process is called cell sorting, and the instrument is commonly termed a "cell sorter".

Modern flow cytometers can be used to analyze many thousand particles per second, in "real time," and, if configured as cell sorters, can actively separate and isolate particles at similar rates having specified optical properties.

A flow cytometer can have, e.g., five main components: a flow cell, a measuring system, a detector, an amplification system, and a computer for analysis of the signals. The flow cell has a liquid stream (sheath fluid), which carries and aligns the cells so that they pass single file through the light beam for sensing. The measuring system commonly use measurement of impedance (or conductivity) and optical systems—lamps (mercury, xenon); high-power water-cooled lasers (argon, krypton, dye laser); low-power air-cooled lasers (argon (488 nm), red-HeNe (633 nm), green-HeNe, HeCd (UV)); diode lasers (blue, green, red, violet) resulting in light signals. The detector and analog-to-digital conversion (ADC) system converts analog measurements of forward-scattered light (FSC) and side-scattered light (SSC) as well as dye-specific fluorescence signals into digital signals that can be processed by a computer. The amplification system can be linear or logarithmic.

The process of collecting data from samples using the flow cytometer can be termed 'acquisition'. Acquisition can be mediated by a computer physically connected to the flow cytometer, and the software which handles the digital interface with the cytometer. The software is capable of adjusting parameters (e.g., voltage, compensation) for the sample being tested, and also assists in displaying initial sample information while acquiring sample data to ensure that parameters are set correctly.

Flow cytometers can typically have multiple lasers and fluorescence detectors. Increasing the number of lasers and detectors allows for multiple antibody labeling, and can more precisely identify a target population by their phenotypic markers. Certain instruments can even take digital images of individual cells, allowing for the analysis of fluorescent signal location within or on the surface of cells.

As used herein, stimulated Raman spectroscopy low cytometry can be a technique which combines stimulated Raman spectroscopy with flow cytometry. SRS flow cytometry, and, more specifically, a multiplex stimulated Raman scattering process, is described, for example, in Zhang et al., "Stimulated Raman scattering flow cytometry for label-free single-particle analysis," Optica, Vol. 4, No. 1/January 2017. For example, by using a 32-channel detector array, an SRS flow cytometer can detect single particles with spectral coverage of 200 $cm^{-1}$ and a throughput over 10,000 particles per second.

Stimulated Raman scattering (SRS) microscopy can be an imaging technique that looks at the vibrational frequencies of chemical bonds. Different types of bonds will have different frequencies based on the surrounding molecular environment. For example, a C—H bond on a DNA molecule (2,956 cm-1) is going to have a slightly different vibrational frequency compared to a C—H bond on proteins (2,931 cm-1) or lipids (2,854 cm-1).

Stimulated Raman Excited Fluorescence (SREF) can integrate superb detection sensitivity and fine chemical specificity. Through stimulated Raman pumping to an intermediate vibrational eigenstate followed by an up-conversion to an electronic fluorescent state, SREF encodes vibrational resonance into the excitation spectrum of fluorescence emission. By harnessing narrow vibrational linewidth, multiplexed SREF imaging can be demonstrated in cells, breaking the "color barrier" of fluorescence. By leveraging superb sensitivity of SREF, all-far-field single-molecule Raman spectroscopy and imaging without plasmonic enhancement can be achieved, a long-sought-after goal in photonics. Thus, SREF merges Raman and fluorescence spectroscopy.

Stimulated Raman attenuated fluorescence (SRAF) involves inducing a ground state depletion using an epr-SRS process when Raman resonance is satisfied, which results in the decreasing of fluorescence originating from probe beam-induced electronic transitions started from ground state or other vibrational excited states.

Hyperspectral imaging can be part of a class of techniques commonly referred to as spectral imaging or spectral analysis. Hyperspectral imaging is related to multispectral imaging. Hyperspectral imaging (HSI) uses continuous and contiguous ranges of wavelengths (e.g. 400-1100 nm in steps of 0.1 nm) whilst multispectral imaging (MSI) uses a subset of targeted wavelengths at chosen locations (e.g. 400-1100 nm in steps of 20 nm).

Multispectral imaging deals with several images at discrete and somewhat narrow bands. Being "discrete and somewhat narrow" is what distinguishes multispectral imaging in the visible wavelength from color photography. A multispectral sensor may have many bands covering the spectrum from the visible to the longwave infrared. Multispectral images do not produce the "spectrum" of an object.

Hyperspectral imaging can deal with imaging narrow spectral bands over a continuous spectral range, producing the spectra of all pixels in the scene. A sensor with only 20 bands can also be hyperspectral when it covers the range from 500 to 700 nm with 20 bands each 10 nm wide. In hyperspectral imaging, the recorded spectra have fine wavelength resolution and cover a wide range of wavelengths. Hyperspectral imaging measures contiguous spectral bands, as opposed to multispectral imaging which measures spaced spectral bands.

In light of the exemplary and non-limiting definitions provided above, described below are the fluorescent compounds, conjugates of the fluorescent compounds with various biological and non-biological moieties, libraries comprising a plurality of the fluorescent compounds, the use of the fluorescent compounds in biological applications, and the use of the fluorescent compounds in non-biological applications, including non-imaging applications.

Headings used herein are for organizational purposes only and are not meant to be used to limit the scope of the description or the enclosed claims. As used throughout this application, the word "may" is used in a permissive sense (i.e., meaning having the potential to), rather than the mandatory sense (i.e., meaning must). The terms "a" and "an" herein do not denote a limitation of quantity, but rather denote the presence of at least one of the referenced items.

Ranges may be expressed herein as from "about" one particular value, and/or to "about" another particular value. When such a range is expressed, another exemplary embodiment includes from the one particular value and/or to the other particular value. Similarly, when values are expressed as approximations, by use of the antecedent "about," it will be understood that the particular value forms another exemplary embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed.

Various exemplary embodiments of the present disclosure will be better understood with reference to the following exemplary and non-limiting definitions:

To merge the advantages from both worlds of Raman and fluorescence, an exemplary hybrid spectroscopy by encoding vibrational features onto the fluorescence spectrum can be utilized. While linear fluorescence spectroscopy excites the electronic transition, e.g., directly (see e.g., FIG. 1A, which depicts a one-photon excited fluorescence), nonlinear fluorescence excitation can employ one or more virtual states as intermediates, thus potentially probing more states (see e.g., FIG. 1B, which depicts a conventional two-photon excited fluorescence). However, conventional nonlinear fluorescence still lacks chemical specificity, owing to the extremely short-lived virtual states (e.g., large energy uncertainty). If a long-lived vibrational eigenstate with a well-defined energy level can mediate a multiphoton fluorescence excitation process, the intermediate vibrational information can then be encoded into the fluorescence excitation spectrum. Indeed, such double resonance spectroscopy have been explored decades ago in which an infrared ("IR") pulse excites an intermediate vibrational transition followed by a visible pulse to excite the fluorescence (see e.g., FIG. 1C, which depicts an infrared-mediated double-resonance fluorescence). Despite being a powerful approach to investigate vibrational dynamics of chromophores, the strong IR absorption in water and poor spatial resolution can be intrinsically unfavorable for applications in biological systems. Moreover, the reported sensitivity is still several orders away from single molecules.

Considering stimulated Raman scattering ("SRS") can be complementary to IR excitation by offering much higher spatial resolution and avoiding water absorption, stimulated Raman excited fluorescence ("SREF") can be utilized, by harnessing two beams (e.g., pump and Stokes) to coherently populate the intermediate vibrational state via SRS and a third probe beam to up-convert the vibrational population to the electronic excited state for subsequent fluorescence (see e.g., FIG. 1D, depicting the stimulated Raman excited fluorescence (SREF)). Unlike conventional fluorescence spectroscopy (see e.g., FIGS. 1A and 1B), SREF can be a Raman-mediated three-photon process, thus its excitation spectrum, by tuning $\omega_p-\omega_s$, can map out vibrational information of electronic ground state. FIG. 1E illustrates the microscope setup (see also FIG. 5). Briefly, temporally and spatially overlapped pump (e.g., $\omega_p$ tunable) and Stokes (e.g., $\omega_s$, 1031.2-nm) picosecond pulse trains can be focused by a high numerical aperture (N.A.) objective 101 to perform SRS excitation. The pump pulse (e.g., either through one-photon or two-photon) also plays the role of probe pulse (e.g., green line or red dash line) for excitation to the electronic excited state for fluorescence emission. Backward fluorescence can then be detected by a small-area avalanche photodiode ("APD") 102 with confocal detection. Both the reflected laser beams and the coherent anti-Stoke Raman scattering ("CARS") signal can be completely blocked by proper filter sets.

However, the exemplary initial attempt on a coumarin dye (e.g., SRS excitation of C=C mode followed up by two-photon excitation to the fluorescent state) can be unsuccessful without detecting any vibrational feature by tuning $\omega_p-\omega_s$. It can be found that, even with a quantum amplification up to $10^8$ achieved under modern SRS microscopy, the effective SRS excitation cross sections can still be less than $10^{-20}$ $cm^2$ for typical chromophores including coumarin, resulting in much less efficient vibrational pumping rate compared to the rapid vibrational relaxation (e.g., sub-picosecond) of molecules in condensed phases[7]. As a result, this SREF pathway can be easily overwhelmed by other competing processes such as two-photon fluorescence background, which can be observed in the exemplary attempt on coumarin and previous unsuccessful trial on perylene dye.

The Raman cross section of electronically coupled vibrational modes can be enhanced up to 10 when $\omega_p$ can be brought close to $\omega_{abs}$. Thus, the SRS pumping rate under the close electronic resonance (see e.g., FIG. 1F, which depicts SREF with rigorous/close electronic resonance for the SRS process) can be enhanced. A near-IR dye ATTO 740 (e.g., $\omega_{abs}$, 760-nm in DMSO) and its nitrile mode (e.g., Raman peak at 2227 cm$^{-1}$) can be used in the exemplary second attempt (see e.g., FIG. 6A, which depicts the SREF spectroscopic investigation of C≡N). The SREF excitation spectra of ATTO 740 can be acquired by tuning $\omega_p$ across the nitrile Raman peak. Although a strong SRS peak can be detected as stimulated Raman loss of the pump beam, no vibrational feature can be observed on the fluorescence excitation spectrum. Apparently, too-close resonance condition of SRS can be unavoidably accompanied by a strong anti-Stokes fluorescence background directly excited by the pump beam, which can easily overwhelm the SREF signal.

Linear absorption cross section (e.g., which determines the anti-Stokes fluorescence background) can decay faster than that of (pre)resonance Raman scattering cross section (e.g., which determines the SRS pumping rate) as a function of pump detuning of $\omega_{abs}-\omega_p$. Thus, a proper pump detuning might help attenuate the anti-Stokes fluorescence background and, at the same time, largely retain the desired SREF signal. Additional experiments can be performed on the C═C skeletal mode (e.g., Raman peak at 1640 cm$^{-1}$) for ATTO 740 (see e.g., FIG. 6B, which depicts the SREF spectroscopic investigation of C═C), which corresponds to a larger pump detuning than that of nitrile mode (see e.g., FIG. 1G, which depicts SREF with proper electronic pre-resonance for the SRS process). Indeed, with the anti-Stokes fluorescence background decreasing by approximately 10 folds than that of the close-resonance case (see e.g., FIGS. 6A and 6B, blue dash curves), an obvious Raman-like peak can be detected on top of the broad fluorescence excitation spectrum (see e.g., FIG. 6B, blue line in right column). Hence, the above two tests (see e.g., FIGS. 6A and 6B) on the same ATTO 740 dye clearly support the exemplary strategy of retrieving SREF peak by proper electronic pre-resonance. Further, as depicted in FIGS. 6A and 6B, the respective left columns shows the energy-level diagrams; 1-mM solutions can be used for all SRS measurements (the central columns); 500-nM solutions can be used for SREF measurements (right columns). Further, FIGS. 6A and 6B, in the right columns thereof, include a dash curve 600 for Stokes-only excited fluorescence, a dash curve 610 for pump-only excited fluorescence, and a solid curve 620 for fluorescence excited by temporally and spatially overlapped Pump and Stokes beams. Dots are measurement data, and curves are cubic spline interpolations. Laser powers are 16-mW for Stokes beam and 8-mW for pump beam. The error bars represent 95% confidence intervals of the mean values of normal distributions fitted by 100 independent measurements, respectively. Further, the fluorescence signals of FIGS. 6A and 6B have been normalized to the same collection efficiency.

Figure 7B:
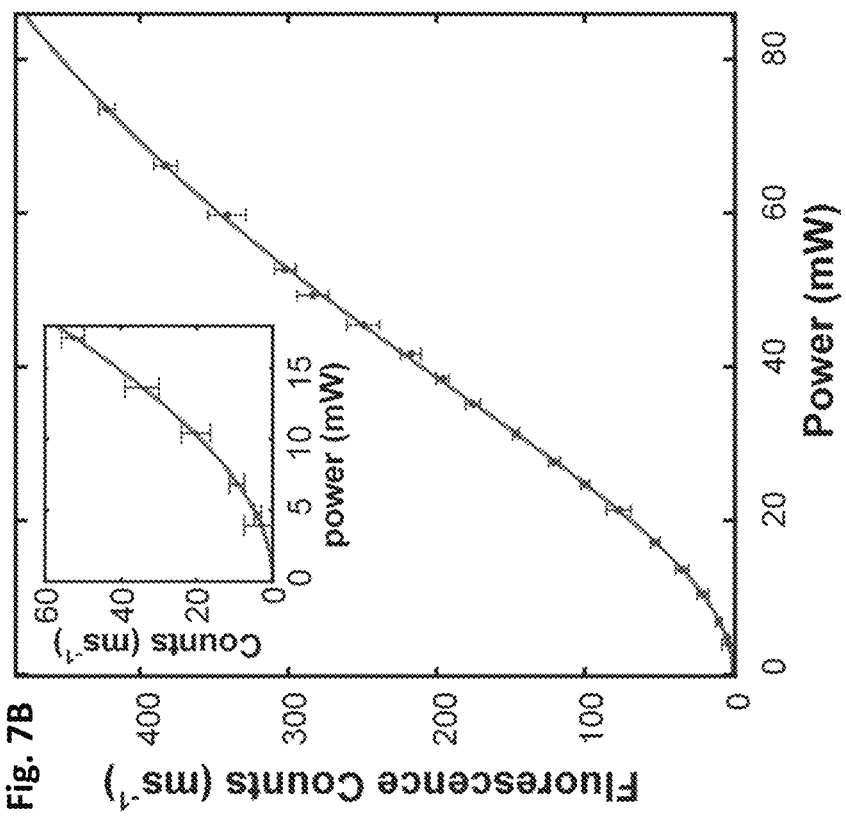
FIG. 7B is an exemplary graph illustrating a Stokes-only excited fluorescence background according to an exemplary embodiment of the present disclosure.
Figure 7A:
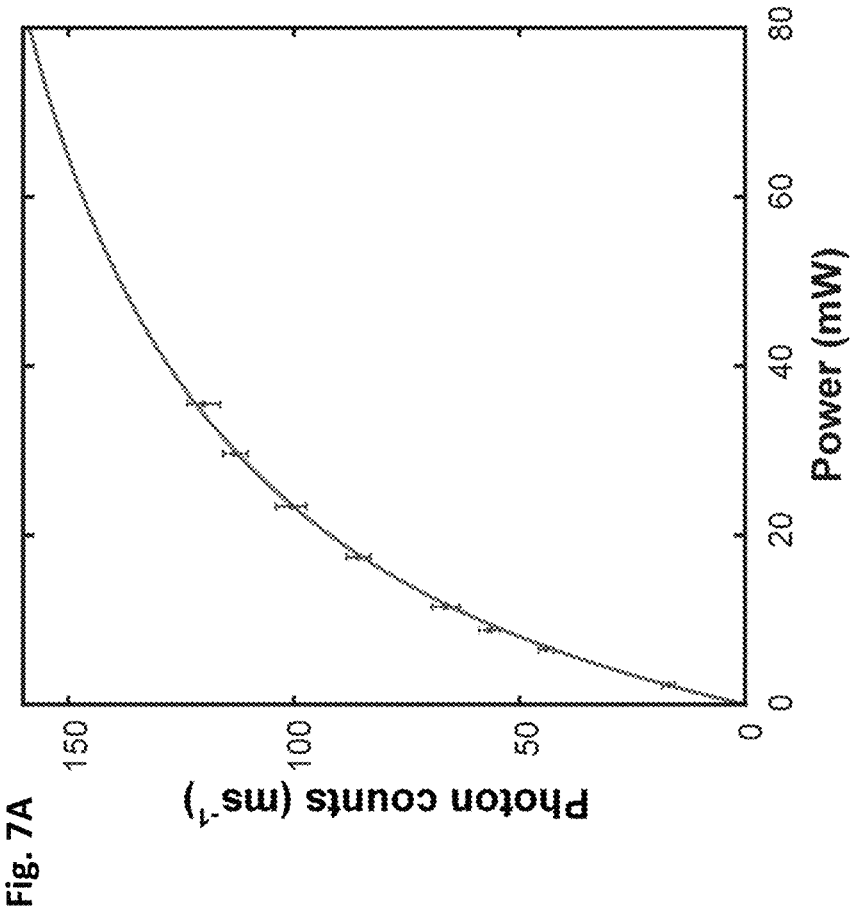
FIG. 7A is an exemplary graph illustrating the power dependence for only a pump according to an exemplary embodiment of the present disclosure.

To demonstrate SREF as a general approach, an exemplary dye Rhodamine 800 ("Rh800") (see e.g., FIG. 2A) with higher fluorescence quantum yield than ATTO 740 and better collection efficiency due to its bluer emission. FIG. 2A depicts an absorption spectra 200 and emission spectra 210 of Rh800 in DMSO, together with the tunable pump beam 220, the fixed Stokes beam 230 at 1031.2-nm, and the energy level 240 of $(\omega_p-\omega_s)+\omega_p$. Pump beam 220 is also used as the probe beam. Rh800 bears a conjugated nitrile (C≡N) moiety with a distinct Raman peak at 2236 cm$^{-1}$ (see e.g., FIG. 2B). When $\omega_p-\omega_s$ can be tuned to match the C≡N vibration, SRS can be operating in the region of electronic pre-resonance (e.g., $\omega_p$ around 838 nm, $\omega_{abs}$ approximately 700 nm), and the total energy $(\omega_p-\omega_s)+\omega_p$ reaches its $\omega_{abs}$ (see e.g., FIG. 2A). The SREF excitation spectrum can be obtained by sweeping $\omega_p$ across the C≡N resonance with 500 nM Rh800 solution. Remarkably, a pronounced Raman-like peak has emerged at 2236 cm$^{-1}$ within the fluorescence excitation spectrum 250 (see e.g., FIG. 2C, solid line). Both its position and width can be consistent with the corresponding SRS peak (see e.g., FIG. 2B), proving its vibrational origin. As a negative control, the pump beam alone generates one-photon anti-Stokes fluorescence 260 from thermally excited vibrational population (see e.g., FIG. 2C, dash line 260; see also FIG. 7A), and the Stokes beam alone mainly leads to two-photon excited fluorescence (see e.g., FIG. 2C, dash line 270; see also FIG. 7B). With regard to FIG. 7A, a sample can be prepared by spin-coating 100-nM Rh800 PMMA toluene solution on a quartz coverslip. The measurements (dots) are well-fitted by a two-level one-photon absorption model, indicating the pump-beam excited fluorescence is mainly a one-photon process. Further, with regard to FIG. 7B, 50-nM Rh800 DMSO solution can be used. The measurements (dots) are fitted by a two-level two-photon-absorption mediated transition model, indicating a two-photon excitation process. Inset shows the quadratic power dependence at lower Stokes powers. The error bars represent 95% confidence intervals of the mean values of normal distributions fitted by 100 independent measurements, respectively.

Further, with regard to FIG. 2D, which depicts an exemplary pure SREF signal as a function of the relative time delay between pump and Stokes pulses, the time-delay dependence fits well with the cross-correlation profile of pump and Stokes pulses. Further, the laser power dependence can be linear to both pump and Stokes beams (see e.g., FIG. 2E, which depicts an exemplary pump-power dependence of an exemplary pure SREF signal with Stokes power set to 6 mW, and 2F, which depicts a Stokes-power dependence of a pure SREF signal with pump power also set to 6 mW), since the up-conversion step to the fluorescent state can already be saturated with the exemplary pulsed probe (e.g., pump) laser (see e.g., FIG. 8A, which depicts a simplified three-level system together with corresponding transitions, and 8B, which depicts the solved rate equation of $N_2$ and $N_3$ population, as a function of time during the pulse, from initial population $N_1$ of 6000). Third, general SREF detectability can be demonstrated on more molecules in both fingerprint region (e.g., double bond) and cell-silent region (e.g., triple bond) (see e.g., FIG. 9A, which corresponds to $\lambda_{abs}$=735 nm, detecting nitrile mode, using 500-μM solution for SREF spectrum measurement with Pump power=13 mW and Stokes power=7.5 mW, and 9B, which corresponds to $\lambda_{abs}$=790 nm, detecting double bond mode, using 20-μM solution for SREF spectrum measurement with Pump power=5 mW and Stokes power=15 mW, where the error bars for FIGS. 9A and 9B represent 95% confidence intervals of the mean values of normal distributions fitted by 100 independent measurements, respectively), for example, it can be confirmed that the linear concentration dependence with a superb sensitivity readily down to 10 nM (see e.g., FIG. 2G). The corresponding SREF signal can be extrapolated to be approximately 2-3 photons per ins at the single-molecule-equivalent concentration (e.g., approximately 8 nM). Relatively poorer detection sensitivity can be obtained for C=C mode in ATTO740 (e.g., owing to its poorer fluorescence quantum yield and collection efficiency) (see e.g., FIG. 6C, which depicts the concentration dependence of the C=C mode pure SREF signal).

Figure 8B:
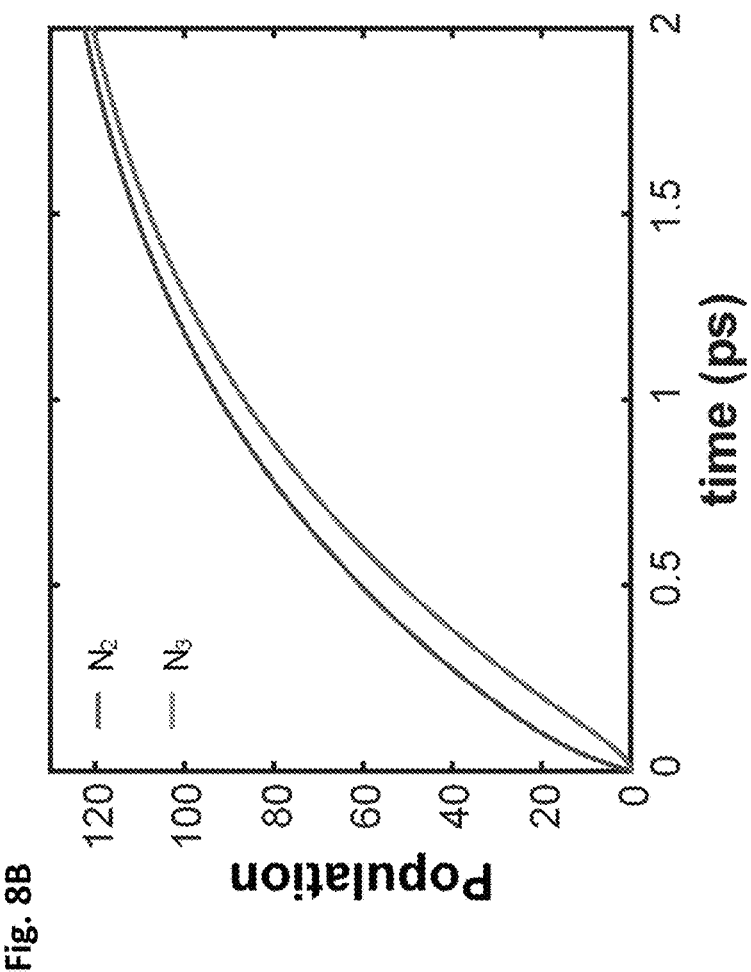
FIG. 8B is an exemplary graph illustrating rate-equation modeling for a stimulated Raman excited fluorescence process with a solved rate equation of $N_2$ and $N_3$ population according to an exemplary embodiment of the present disclosure.

It can be constructive to theoretically analyze the SREF signal of Rh800. A vibrational excitation rate of $8 \times 10^3$ per millisecond ("ms") can be estimated from FIG. 2B for a single C≡N bond of Rh800 under the excitation of merely 12-mW pump beam and 13-mW Stokes beam. For SRS detection whose sensitivity can be limited by laser shot noise (e.g., about $7 \times 10^6$ photons per ms for the pump beam), 1,000 Rh800 molecules can be utilized to overcome the shot noise. In contrast, SREF can circumvent the overwhelming laser background by up-converting some of the vibrational population to electronic-excited state for subsequent fluorescence detection. In addition to electronic pre-resonance, how to optimize the up-conversion efficiency can be another key. The exemplary analysis suggests that, under the exemplary experimental condition, the up-conversion efficiency can almost be totally determined by the competition between SRS pumping and the relaxation of vibrational excited state. Vibrational relaxation often occurs very fast in polyatomic molecules: a vibrational lifetime of 0.5 ps can be estimated by considering a predominately lifetime-broadened vibrational linewidth (e.g., approximately 11 $cm^{-1}$ for C≡N in Rh800). That can be why 2-ps pulses can be chosen to be short enough to compete favorably with vibrational relaxation yet long enough to maintain the fine spectral selectivity. In contrast, an inefficient pulse width of 5-ns can be used in the previous unsuccessful attempt. Numerically, the SREF process can be modeled with a three-level rate equation, and obtained 20% upconversion efficiency, close to the result from steady-state approximation (see e.g., FIGS. 8A and 8B). This corresponds to a SREF excitation rate about $1.6 \times 10^3$ per ms. Considering the 16% fluorescence quantum-yield and an overall 2% microscope fluorescence collection, a moderate signal of 5 photons per ms can be theoretically estimated from a single Rh800 molecule, which agrees well with experimental measurement (e.g., extrapolated to approximately 8 nM in FIG. 2G).

SREF combines the desirable properties of chemical specificity and superb sensitivity, thereby going beyond the standard fluorescence and Raman spectroscopy. To showcase the exquisite vibrational selectivity of SREF, a set of new isotopologues for Rh800 (or structure 300) containing isotopically-edited nitrile moiety can be synthesized (see e.g., FIG. 3A, $^{12}C\equiv^{15}N$ (or derivative 310), $^{13}C\equiv^{14}N$ (or derivative 320), and $^{13}C\equiv^{15}N$ (or derivative 330); synthesis described below). FIG. 3A shows, as expected, that the absorption and emission spectra can be identical among these isotopologues, preventing their spectral separation by standard fluorescence procedures (see e.g., FIG. 3B). In contrast, spectrally well-resolved SREF peaks from C≡N vibrations can be successfully acquired for four isotopologues (see e.g., FIG. 3C and FIG. 10), in agreement with corresponding Raman peak positions (see e.g., FIG. 3C, bottom, dashed).

By leveraging the fine vibrational specificity, multiplexed SREF imaging can be demonstrated. There can be increasing demand for simultaneously imaging a large number of molecular targets in complex systems. However, due to the limited chemical specificity, fluorescence microscopy exhibits a fundamental "color barrier": in practice, no more than 5 fluorescent dye can be simultaneously imaged. In the exemplary multiplexed SREF imaging, a single SREF image can be obtained by sample raster scanning for a given $\omega_p$; a stack of hyperspectral images can then be acquired by sweeping $\omega_p$. As a proof of concept, living E. coli cells (see e.g., FIG. 3D), each stained with one of the four Rh800 isotopologues and then mixed together, could be unequivocally resolved by the detected SREF peak (see e.g., FIG. 3E) and assigned back to the corresponding Rh800 isotopologues (see e.g., FIG. 3F). Thus, when coupled with newly developed palettes of vibrational probes, multiplexed SREF imaging can break the "color barrier" of fluorescence and hold the promise for super-multiplex optical microscopy.

The exemplary system, method, and computer-accessible medium, according to an exemplary embodiment of the present disclosure, can be used to show the first all-far-field vibrational imaging of single molecules at room temperature. Previous single-molecule Raman spectroscopy may only be possible in the optical near field with the help of strong plasmonic enhancement. Electronic resonance on light-absorbing chromophores can also be indispensable for nearly all single-molecule surface-enhanced Raman spectroscopy: detecting single-molecule non-resonant molecules can be extremely rare. Nonetheless, the strict reliance on close contact to metallic nanostructures (e.g., angstrom level precision) can limit the applicability of these near-field procedures in vast chemical and biological systems. In retrospect, single-molecule fluorescence spectroscopy made its major impact in chemistry and biology after it transitioned from near-field to far-field. In light of this, single-molecule far-field Raman spectroscopy can have potential to impact many areas where metallic nanostructures can be inaccessible or undesired.

Figure 11:
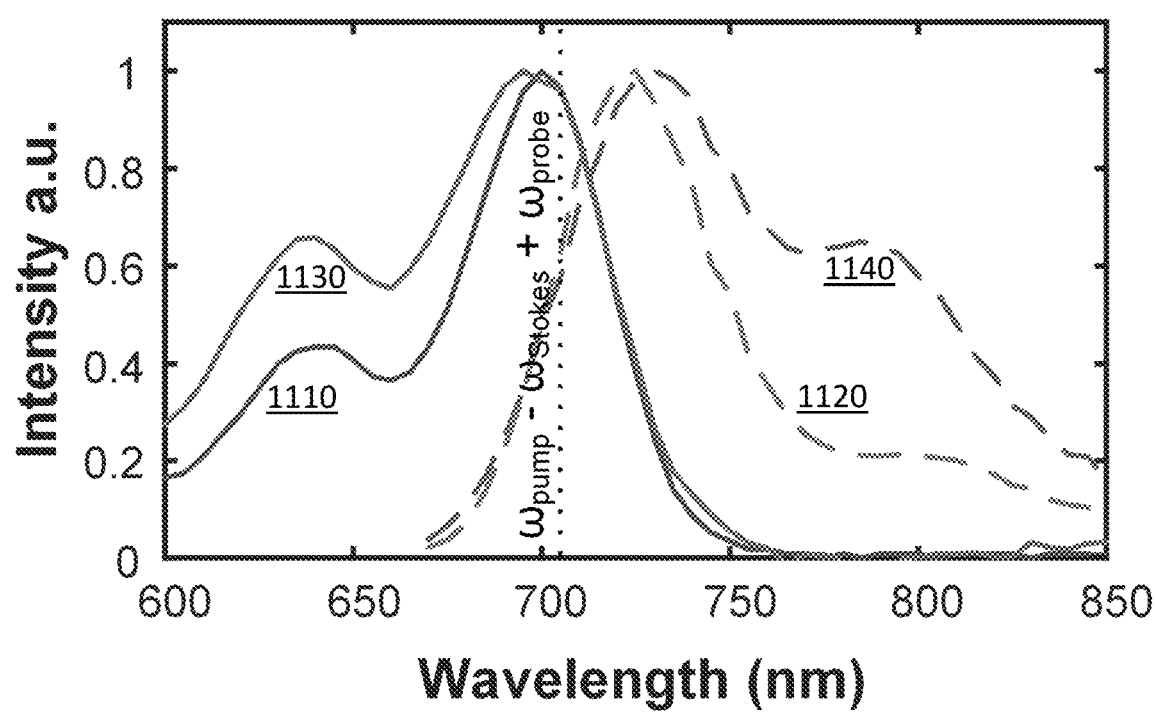
FIG. 11 is an exemplary graph illustrating absorption and fluorescence spectra of Rh800 in a Dimethyl sulfoxide and in a PMMA film according to an exemplary embodiment of the present disclosure.
Figure 12:
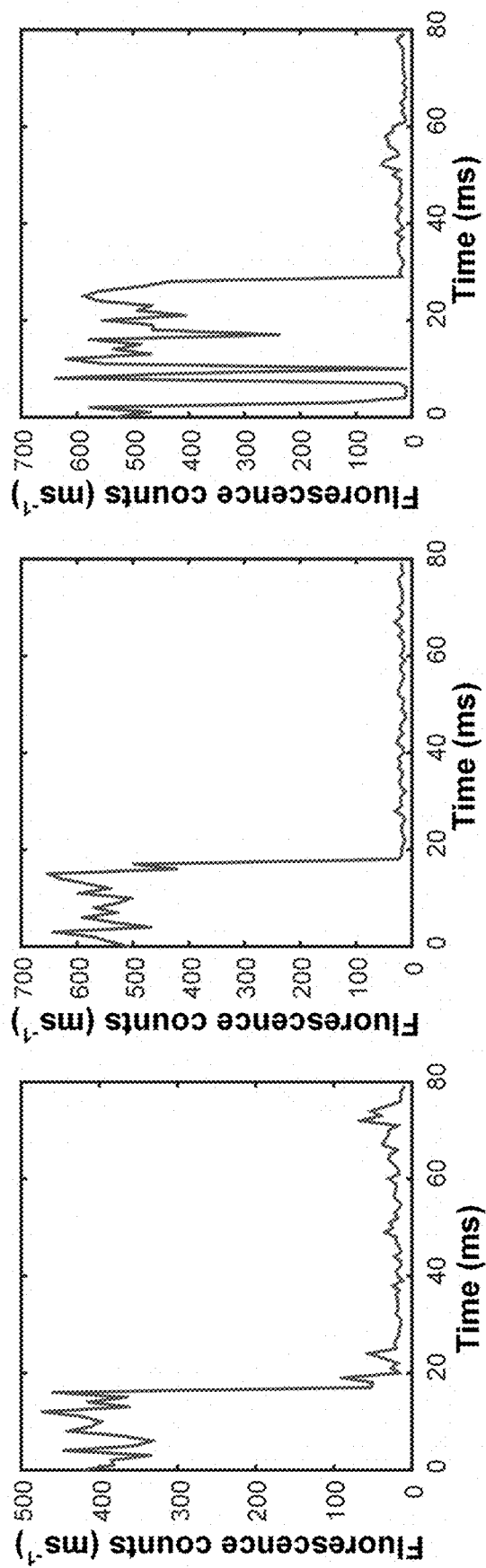
FIG. 12 is a set of timing diagrams of one-photon fluorescence traces of Rh800 molecules excited under saturated laser excitation power according to an exemplary embodiment of the present disclosure.
Figure 13:
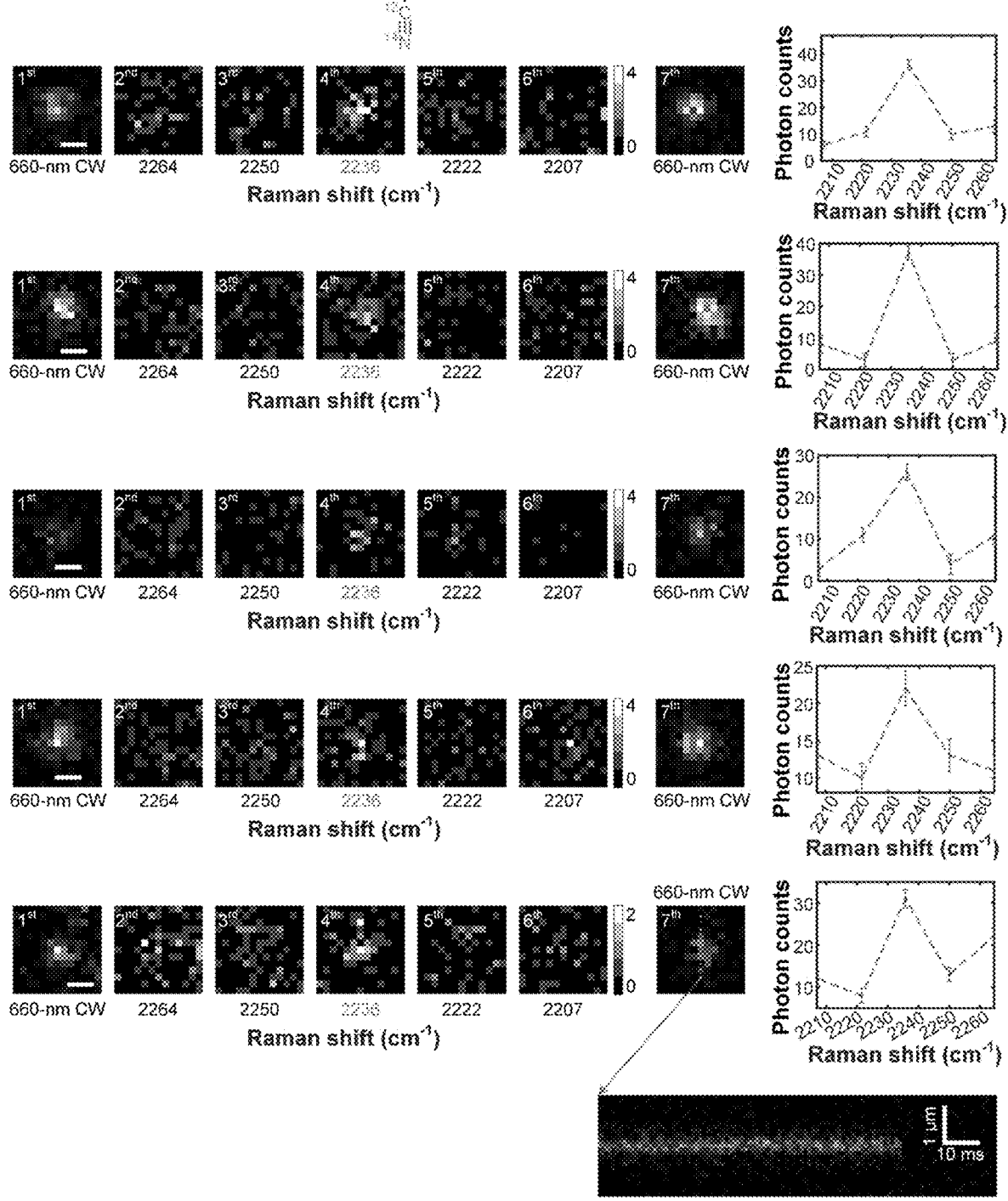
FIG. 13 is a set of exemplary single-molecule stimulated Raman excited fluorescence spectral images of Rh800 and associated proton count graphs according to an exemplary embodiment of the present disclosure.

For imaging single molecules in the far field, exemplary sample preparations can be utilized for embedding Rh800 in PMMA film and validated the spectroscopic preservation using absorption, fluorescence and SREF spectra of Rh800 isotopologues (see e.g., FIG. 4A, which depicts the exemplary spectra for Rh800, FIG. 4B, which depicts the exemplary spectra for the Rh800 isotopologues 300, 310, 320, and 330, and FIG. 11, which depicts exemplary absorption (solid lines) and fluorescence (dash lines) spectra of Rh800 in DMSO (lines 1110 and 1120) and in PMMA film (lines 1130 and 1140)). To assist locating and confirming individual molecules, a 660-nm continuous wave laser can be used for one-photon fluorescence (see e.g., FIG. 5). Single-molecule distribution could be evidenced by abrupt photobleaching during raster scanning (e.g., half-moon pattern in FIG. 4C), occasional blinking, and single-step beaching time traces (see e.g., FIG. 12, which depicts exemplary one-photon fluorescence traces of Rh800 molecules excited under saturated laser excitation power, where the 660-nm CW laser was set to 10 mW on sample). Single-molecule SREF spectral images can be acquired by sweeping $\omega_p$ across the vibrational resonance of C≡N in Rh800. A consistently more pronounced signal can be observed at the on-resonance frequency for multiple molecules (e.g., molecules 410 and 420) within the same field-of-view (see e.g., FIGS. 4D and 4E), as well as in repetitive pump scans (e.g., rounds 430 and 440) over the same molecule (see e.g., FIGS. 4F and 4G). The peak position, shape and line-width all resemble the bulk SREF measurement, confirming the vibrational resonance (see e.g., FIGS. 4D-4I). Quantitatively, about 4 photons per ms can be detected from the brightest pixel from on-resonance images (see e.g., FIG. 13, in which the wavelength of pump beam is tuned across the C≡N vibrational resonance (pump beam at 838 nm correspond to C≡N resonance); 12-mW pump beam and 13-mW Stokes beam can be used for excitation; color bar, photon counts in 1-ms dwell time; photon counts plot at the right side are from the sum of photons within the 5×5-pixel center area of corresponding images, and error bars are the standard deviation of photon counts of nearby 50 molecule-free 5×5-pixel regions; inset shows the final kymograph (660-nm laser excited) of the molecule in the last row after all the images have been acquired; and scale bar, 400 nm), comparable to the solution measurement. The single-molecule identity and its survival can be further confirmed by additional 660-nm-excited fluorescence following SREF series and subsequent single-step photo-bleaching.

Such ultimate sensitivity can be extendable to Rh800 isotopologues that can be vibrationally distinct but electronically identical (see e.g., FIGS. 4H and 4I). By sweeping $\omega_p$ across the corresponding vibrational resonance, sharp SREF image contrasts can be clearly observed at the expected Raman shifts for both $^{12}C\equiv^{15}N$ (derivative 310) (2207 cm$^{-1}$) and $^{13}C\equiv^{14}N$ (derivative 320) (2183 cm$^{-1}$) (see e.g., FIGS. 4H and 4I). Such fine chemical specificity at the single-molecule level can be extremely difficult, if not impossible, to be achieved by room-temperature fluorescence spectroscopy or absorption spectroscopy. Raman selectivity of single-molecule SREF spectral images can be confirmed by conducting statistical tests over 61 complete image sets. For each set, a t-test between on-resonance signals and two adjacent off-resonance signals respectively can be performed, as well as between the two off-resonance channels (see e.g., FIG. 4J, Table 1 below). In most sets (e.g., 53 out of 61), the on-resonance signals can be statistically higher than off-resonance backgrounds (e.g., p<0.05). In contrast, no significant difference can be found between the two off-resonance channels. Interestingly, the signal-to-background ratios (e.g., on/off ratio) (see e.g., FIG. 4K) show a broad distribution, which can likely originate from random orientations of individual Rh800 within PMMA film and the possible mismatch of dipole moments between SREF and two-photon fluorescence (see e.g., FIGS. 14A to 14E). As depicted in FIGS. 14A to 14E, the molecule (e.g., molecule 1410) with the best orientation for SREF (also the best for one-photon fluorescence) does not show the strongest two-photon fluorescence excited by Stokes beam. Meanwhile, the molecule (e.g., molecule 1420) that shows, e.g., strongest two-photon fluorescence (blue arrow) is not the one with the best orientation for SREF. As illustrated, molecules with orientation perpendicular to the dipole moment of one-photon fluorescence, e.g., molecule 1430, show no two-photon fluorescence. In this regard, this invention can be the first all-far-field Raman spectroscopy of single molecules.

TABLE 1

Single-molecule statistical analysis.

| Set | On/Off ratio | -log($P_{On/Off2}$) | -log($P_{On/Off3}$) | -log($P_{Off2/Off3}$) |
|---|---|---|---|---|
| 1 | 3.43 | 3.19 | 3.16 | 0.23 |
| 2 | 2.04 | 3.01 | 2.43 | 0.21 |
| 3 | 1.63 | 1.05 | 1.75 | 0.93 |
| 4 | 1.75 | 2.33 | 2.22 | 0.68 |
| 5 | 2.50 | 2.79 | 2.57 | 0.11 |
| 6 | 1.80 | 1.57 | 1.49 | 0.20 |
| 7 | 1.72 | 2.09 | 1.40 | 0.16 |
| 8 | 1.80 | 1.80 | 1.37 | 0.11 |
| 9 | 2.05 | 2.26 | 1.95 | 0.48 |
| 10 | 1.78 | 2.60 | 1.38 | 0.12 |
| 11 | 1.61 | 1.51 | 1.29 | 0.30 |
| 12 | 2.00 | 1.32 | 1.55 | 0.65 |
| 13 | 1.54 | 0.94 | 0.96 | 0.35 |
| 14 | 1.32 | 0.83 | 0.75 | 0.30 |
| 15 | 1.60 | 1.26 | 0.86 | 0.19 |
| 16 | 2.95 | 2.26 | 2.85 | 0.85 |
| 17 | 2.00 | 1.23 | 1.83 | 0.79 |
| 18 | 1.63 | 1.38 | 1.44 | 0.25 |
| 19 | 2.00 | 1.32 | 1.83 | 0.58 |
| 20 | 4.36 | 3.06 | 2.89 | 0.19 |
| 21 | 2.94 | 2.23 | 1.46 | 0.07 |
| 22 | 1.79 | 1.32 | 2.26 | 0.52 |
| 23 | 2.38 | 1.65 | 2.60 | 0.52 |
| 24 | 3.25 | 1.79 | 2.04 | 0.89 |
| 25 | 1.84 | 1.03 | 1.29 | 0.65 |
| 26 | 2.48 | 2.39 | 2.29 | 0.38 |
| 27 | 4.83 | 2.74 | 3.13 | 0.54 |
| 28 | 1.85 | 1.99 | 1.37 | 0.14 |
| 29 | 2.63 | 1.32 | 3.31 | 0.97 |
| 30 | 3.60 | 1.81 | 2.57 | 0.57 |
| 31 | 3.06 | 2.19 | 1.93 | 0.24 |
| 32 | 2.22 | 1.69 | 1.71 | 0.25 |
| 33 | 1.92 | 1.67 | 2.00 | 0.30 |
| 34 | 6.00 | 3.19 | 3.43 | 0.12 |
| 35 | 3.56 | 1.41 | 2.00 | 0.40 |
| 36 | 4.57 | 2.68 | 2.12 | 0.18 |
| 37 | 3.33 | 1.26 | 1.23 | 0.67 |
| 38 | 2.70 | 1.91 | 3.51 | 1.23 |
| 39 | 2.22 | 1.45 | 2.34 | 0.64 |
| 40 | 3.57 | 2.40 | 2.92 | 0.30 |
| 41 | 4.00 | 1.45 | 1.89 | 0.30 |
| 42 | 2.30 | 1.47 | 1.44 | 0.30 |
| 43 | 2.50 | 2.26 | 1.74 | 0.30 |
| 44 | 3.20 | 1.53 | 2.90 | 0.89 |
| 45 | 3.56 | 1.72 | 2.26 | 0.43 |
| 46 | 3.08 | 1.51 | 3.27 | 0.99 |
| 47 | 3.05 | 2.29 | 3.32 | 0.81 |
| 48 | 6.00 | 4.89 | 5.36 | 0.73 |
| 49 | 4.00 | 2.38 | 1.80 | 0.12 |
| 50 | 3.43 | 2.13 | 1.94 | 0.12 |
| 51 | 4.80 | 2.82 | 3.67 | 0.97 |
| 52 | 3.75 | 1.83 | 2.12 | 0.57 |
| 53 | 8.80 | 3.41 | 3.51 | 0.88 |
| 54 | 1.85 | 2.42 | 1.32 | 0.07 |
| 55 | 3.78 | 1.74 | 1.99 | 0.41 |
| 56 | 2.67 | 2.37 | 1.63 | 0.14 |
| 57 | 2.82 | 2.82 | 4.49 | 0.98 |
| 58 | 2.38 | 1.99 | 2.38 | 0.68 |
| 59 | 3.17 | 1.61 | 2.29 | 0.57 |
| 60 | 3.45 | 1.51 | 2.48 | 1.07 |
| 61 | 6.57 | 3.12 | 2.68 | 0.18 |

Note: The signal for each channel is calculated as the sum of photons within the 5×5-pixel center areas. The On/Off ratio is calculated by dividing the vibrational on-resonance SREF signal (e.g., Pump wavelength=838 nm) by the signal average of adjacent two off-resonance channels (e.g., Pump wavelength=837 and 839). $P_{On/Off2}$ and $P_{On/Off3}$ can be the p-values for one-tailed paired t-test on signals of 25 pixels in the 5×5-pixel center areas for the on-resonance channel (e.g., Pump wavelength=838 nm) and adjacent two off-resonance channels (e.g., Pump wavelength=837 nm and 839 nm), respectively. $P_{Off2/Off3}$ is the p-value for two-tailed paired t-test on signals of 25 pixels in the 5×5-pixel center areas for the second off-resonance channel (e.g., Pump wavelength=837 nm) and the third off-resonance channel (e.g., Pump wavelength=839 nm).

The exemplary apparatus can utilize chemical selectivity and the superb sensitivity into a new Raman-mediated multiphoton fluorescence process of SREF. Different from previous attempts, electronic pre-resonance can be devised and up-conversion efficiency can be optimized to ensure successful SREF detection above competing backgrounds. Agreement can be found between theory and experiments for Rh800 and its isotopologues. Clear SREF spectroscopy of different Raman modes can be recorded in several other dyes in both fingerprint region and cell-silent region (see e.g., FIGS. 3C, FIGS. 6A to 6C and 9A to 9B), supporting its general applicability. Most notably, single-molecule Raman spectroscopy and imaging can be achieved at optical far-field (see e.g., FIGS. 4A to 4K), bypassing the need of plasmonic enhancement. This can have profound implications, in light of the revolutionary impact of far-field single-molecule fluorescence spectroscopy. Besides spectroscopic applications, SREF has also great potential for biological imaging. Owing to its superior detection sensitivity than SRS (e.g., by about 100 times), multiplexed SREF can provide a more sensitive procedure for super-multiplex vibrational imaging. With the single-molecule imaging capability, localization-based methods can enable super-resolution vibrational imaging.

Further technical improvement can promise even higher signals and richer spectral information. For example, utilizing fluorophores with higher quantum yields (e.g., only 16% for Rh800 and 10% for ATTO740) could result in much brighter SREF signal; a more sophisticated laser source with both tunable pump and Stokes beams and ideally a separate probe beam could facilitate more flexible excitation control, enabling SREF investigation of many more molecules across the wide spectrum.

Exemplary Method
System Configuration of Lasers and Microscope

An exemplary comprehensive experimental procedure, according to an exemplary embodiment of the present disclosure, is shown in FIG. 5. For example, a laser microscopy system 500 for single molecule stimulated Raman excited fluorescence illustrated in FIG. 5 can include a continuous-wave (CW) laser 510, a quarter wave plate (QWP) 511, dichroic mirrors (DM) 512, single photon counting module (SPCM) 513, a digital-to-analog converter (DAC) 514, an analog-to-digital converter (ADC) 515, an electro-optical modulator (EOM) 516, an avalanched photodiode (APD) 517, and a photodiode (PD) 518. A picoEmerald S system can be used to provide synchronized Stokes beam 501 and pump beam 502 for SRS and SREF measurements. A fundamental 1031.2 nm IR fiber laser (e.g., 2-ps pulse width and 80-MHz repetition rate, 0.5-nm FWHM bandwidth) can be adopted as the exemplary Stokes beam 501. A part of the IR laser can be frequency-doubled to synchronously seed the optical parametric oscillator (OPO) system and produce a tunable pump beam 502 (e.g., 2-ps pulse width, 0.5-nm FWHM bandwidth). The idler beam can be blocked. All beams can be linear polarized in the same direction. Pump and Stokes can be expanded and coupled into an Olympus IX71 microscope to overfill the back pupil of objective for diffraction-limited-resolution imaging. An objective lens 519, such as a 60× water immersion objective lens (e.g., UPLSAPO, 1.2 N.A., Olympus), can be used for all measurements. Two raster scanning methods can be used for imaging: stage scanning for single molecule imaging and laser scanning for living cell imaging. Stage-scan can be achieved with a XY piezo stage 520 (e.g., P545, Physik Instrumente); laser scanning can be achieved by a standard 2D-galvanometer (e.g., GVSM002, Thorlabs), which can be added between the dichroic mirror 512 (details about the galvanometer setup can be found in FIG. 24). All imaging scanning and data acquisition can be controlled by computer programs, e.g., home-written LabVIEW programs, via a processor 530.

For SRS (e.g., stimulated Raman loss, SRL) detection, the Stokes beam can be modulated at 20-MHz by the EOM 516 to achieve shot-noise limited detection. The forward-going pump and Stokes beams after samples can be collected by a high NA IR-coated oil condenser 521 (e.g., 1.4 NA, Olympus), which can be aligned by Kohler illumination. A high-speed large-area silicon PIN PD 518 (e.g., S3590-09, Hamamatsu) can be used as the detector. A high OD bandpass filter 522 (e.g., ET890/220m, Chroma) can be placed in front of the photodiode to block the Stokes beam completely and transmit the pump beam. The PD 518 can be reversed biased by 64 V from a DC power supply to increase both the saturation threshold and response bandwidth. Signal output of the PD 518 can be then sent to a fast lock-in amplifier 523 (e.g., HF2L1, Zurich Instruments) for signal demodulation. The demodulated signal can be digitalized by a NI card including the DAC 514 and the ADC 515 (e.g., PCI-6259, NI), which can also be driven by a computer program (e.g., LabVIEW) via the processor 530.

In SREF, the Stokes laser may not be modulated. For SREF detection of Rh800 and MARS dyes (e.g., both nitrile bond and C=C bond), pump and Stokes beams pass through a dichroic mirror 512 (e.g., FF825-SDi01, Semrock) to excite the molecules, and the backward fluorescence can then be detected. Two bandpass filters 524 (e.g., FF01-709/167-25, Semrock) each with OD greater than 6 can be used to block the reflected laser beams, and another bandpass filter (e.g., FF01-735/28-25, Semrock) with OD greater than 7 can be adopted for completely blocking the CARS background. For SREF detection of ATTO740 C=C bond, the corresponding dichroic mirror 512 can be FF825-SDi01 (e.g., Semrock) and the filters include two bandpass filters (e.g., FF01-819/44-25, Semrock). For SREF detection of ATTO740 nitrile bond, the corresponding dichroic mirror 512 can be FF825-SDi01 (e.g., Semrock) and the filters include two bandpass filters (e.g., FF01-709/167-25, Semrock) for blocking of reflected laser beams, and another bandpass filter (e.g., FF01-785/62-25, Semrock) for completely blocking of CARS background. A high quantum-yield (e.g., approximately 70% at 700-nm) SPCM 513 (e.g., SPCM-NIR-14-FC, 70-cps dark counts, Excelitas) can be used to detect fluorescent emission for general measurements, and a similar quantum-yield SPCM 513 but with much lower dark counts (e.g., SPCM-AQRH-16-FC, 7-cps dark counts, Excelitas) can be used for single-molecule SREF imaging presented in FIG. 4. The 100-μm active APD 517 diameter forms a loose confocal configuration for detection and imaging.

For parallel single-molecule fluorescence detection, an additional 660-nm CW laser 510 (e.g., Coherent) can be coupled into the microscope. A QWP 511 can be used to transform the linear polarization to circular polarization. For 660-nm CW laser 510 excited fluorescence detection of Rh800, laser passes through a dichroic mirror (e.g., 690dcxr, Chroma), and fluorescence can be collected after two bandpass filters (e.g., FF01-795/150-25, Semrock; FF01-747/33-25, Semrock).

Physical Model for SREF Signal Estimation

Figure 8A:
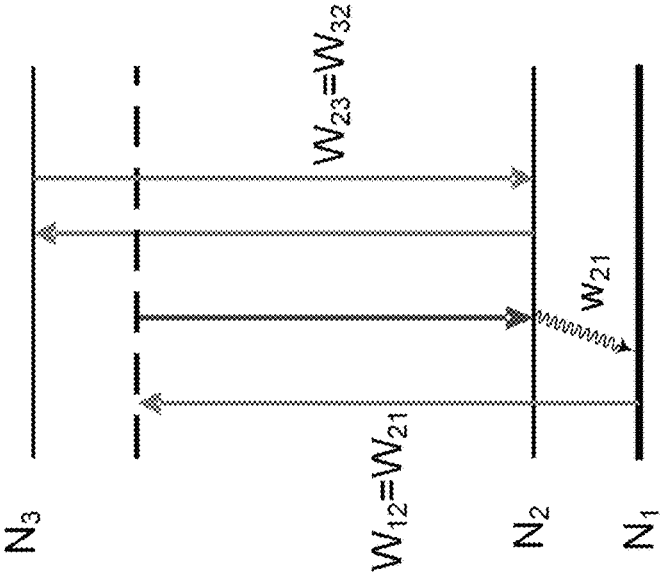
FIG. 8A is an exemplary graph illustrating rate-equation modeling for a stimulated Raman excited fluorescence process for a three-level system with corresponding transitions according to an exemplary embodiment of the present disclosure.
Figure 10A:
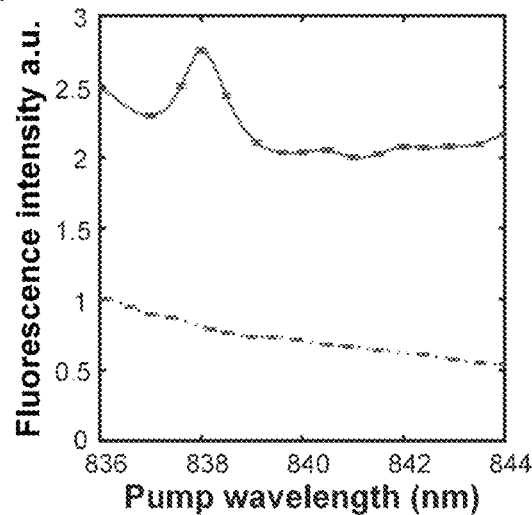
FIG. 10A is an exemplary graph illustrating stimulated Raman excited fluorescence of Rh800 isotopologues of $^{12}C\equiv^{14}N$ containing isotope-edited nitrile group in a Dimethyl sulfoxide solution according to an exemplary embodiment of the present disclosure.
Figure 10B:
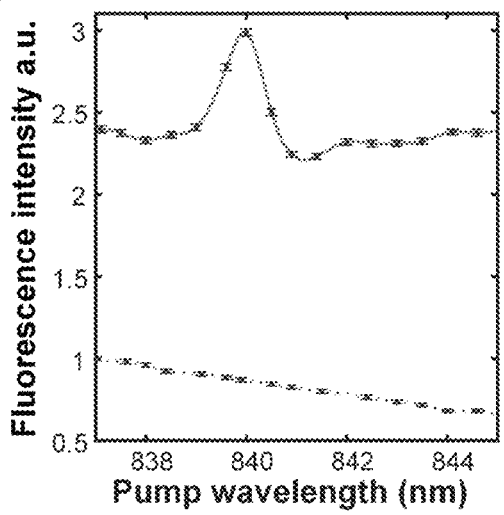
FIG. 10B is an exemplary graph illustrating stimulated Raman excited fluorescence of Rh800 isotopologues of $^{12}C\equiv^{15}N$ containing isotope-edited nitrile group in a Dimethyl sulfoxide solution according to an exemplary embodiment of the present disclosure.
Figure 10C:
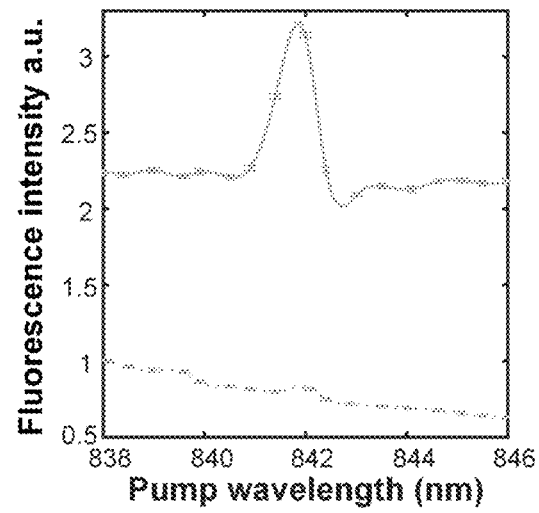
FIG. 10C is an exemplary graph illustrating stimulated Raman excited fluorescence of Rh800 isotopologues of $^{13}C\equiv^{14}N$ containing isotope-edited nitrile group in a Dimethyl sulfoxide solution according to an exemplary embodiment of the present disclosure.
Figure 10D:
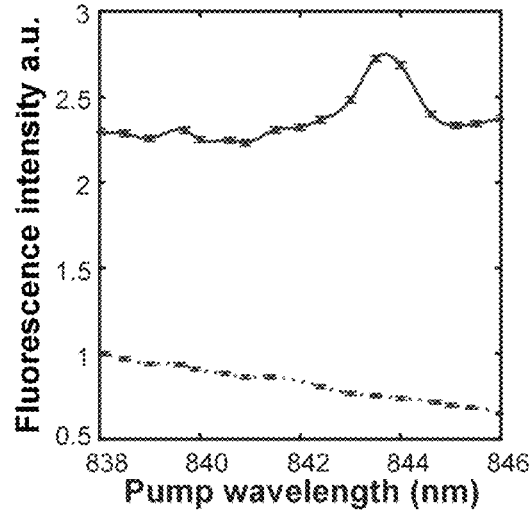
FIG. 10D is an exemplary graph illustrating stimulated Raman excited fluorescence of Rh800 isotopologues of $^{13}C\equiv^{15}N$ containing isotope-edited nitrile group in a Dimethyl sulfoxide solution according to an exemplary embodiment of the present disclosure.

Since the electronic coherence dies out in condensed phase at room temperature within tens of femtoseconds, and the exemplary SRS excitation rate can be much slower than the decay rate of vibrational coherence, it can be feasible to model the SREF process by rate equations of a three-level system. The energy-level diagram is shown in FIG. 8A. $N_1$, $N_2$ and $N_3$ represent the population on the corresponded states. $W_{12}$ can be the epr-SRS excitation rate, $w_{21}$ can be the vibrational relaxation rate for targeted vibrational mode, $W_{23}$ can be the probe excitation rate from vibrational excited state to electronic excited state. All other transition processes can be omitted because of much smaller transition rates. The rate equation of the system can thus be written as:

$$\frac{dN_1}{dt} = W_{12}(N_2 - N_1) + w_{21}N_2 \quad (M.1.1)$$

$$\frac{dN_2}{dt} = W_{23}(N_3 - N_2) + W_{12}(N_1 - N_2) - w_{21}N_2 \quad (M.1.2)$$

$$\frac{dN_3}{dt} = W_{23}(N_2 - N_3) \quad (M.1.3)$$

The epr-SRS process for C≡N Raman mode in Rh800 can be considered. The epr-SRS excitation probability at C≡N resonance can be measured to be $\Delta I/I=2\times10^{-5}$ per pump pulse with 1-mM Rh800 DMSO solution, under 12-mW pump beam (e.g., 838-nm) and 13-mW Stokes beam (e.g., 1031.2-nm). With an 80-MHz repetition rate, one 2-ps pump pulse contains $6\times10^8$ photons at this power, which indicates $1.2\times10^4$ SRS transitions in one pulse duration. There can be about $1.2\times10^5$ molecule in the focal volume with an N.A.=1.2 objective and 1-mM concentration (e.g., $2.0\times10^{-13}$ cm$^3$ focal volume). Hence, the epr-SRS transition probability can be about 0.1 per molecule per pulse under these conditions. Moreover, the transition rate for $W_{12}$ can be $1.2\times10^4/(1.2\times10^5\times2\times10^{-12} \text{ s})=5\times10^{10}$ s per molecule per second (s) within the pulse duration. This represents an average epr-SRS transition rate of $5\times10^{10}$/s$\times2\times10^{-12}$ s$\times80$ MHz=$8\times10^3$ per molecule per millisecond. The linewidth of C≡N mode of Rh800 can be measured to be 11 cm$^{-1}$, indicating a 0.5-ps lifetime ($\tau_{21}$). Therefore, $w_{21}=2\times10^{12}$/s. The absorption cross-section for Rh800 at the peak absorption wavelength can be $4\times10^{-16}$ cm$^2$. Assuming a Franck-Condon factor of 0.1, a value reasonable for many electronic coupled vibrational modes, $W_{23}$ can then be $6\times10^8\times0.1\times4\times10^{-16}$ cm$^2/(1.2\times10^{-9}$ cm$^2\times2\times10^{-12}$ s$)=10^{13}$/s (e.g., focal area can be $1.2\times10^{-9}$ cm$^2$) per pulse duration (e.g., it should be noted that even the Franck-Condon factor can be ten times smaller, the solution of equation (M.1) did not have obvious change), Obviously, because both probe process (e.g., time constant determined by $W_{23}$) and the SRS pumping process (e.g., time constant determined by $w_{21}$) have a time constant smaller than the laser pulse width, the steady state solution of equation (M.1) can be a good approximation, $$N_3 = N_2 = N_1 \frac{W_{12}}{w_{21} + W_{12}} \approx N_1 \frac{W_{12}}{w_{21}} = \tau_{12}W_{12}N_1 \approx \tau_{12}W_{12}N \quad (M.2)$$

For example, $W_{12}$ can be much smaller than $w_{21}$ here, hence, $N_1 \approx N$, the total molecule number in the laser focus. So, SREF emission rate, $W_{SREF}$, can be represent as, $$W_{SREF} = f_{rep}N_3\eta = f_{rep}\tau_{12}W_{12}N\eta \propto f_{rep}\tau_{12}\sigma I_p I_s N\eta \quad (M.3)$$

where $f_{rep}$ can be the laser repetition rate; $I_p$ and $I_s$ can be the beam intensities of pump laser and Stokes laser, respectively; σ can be the (e.g., pre-resonance) spontaneous Raman cross section of the C≡N Raman mode; η can be the fluorescence quantum yield of Rh800. Equation (M.3) shows that the SREF signal can be proportional to molecule concentration, Stokes beam intensity, Pump beam intensity, vibrational state lifetime, and laser repetition rate as long as the time interval between two adjacent pulses can be longer than the fluorescence life time.

Under obtained parameters of $W_{12}$, $w_{21}$, $W_{23}$, the population dynamics of 50-μM Rh800 DMSO solution (e.g., 6000 molecule at the focal volume) in one pulse duration of 2-ps can be numerically calculated. The readers can check that the result can be very close to the steady state result (M.2). The initial populations at the beginning of the pulse can be set to $N_1=6000$, $N_2=N_3=0$. Numerically solving the equation (M.1.1-3) within 2-ps pulse duration, the time-evolved solutions in FIG. 4B show that both $N_2$ and $N_3$ reach about 120 at the end of the pulse. This result indicates that the probability for one molecule being excited to electronic transition state after one pulse excitation can be 2% (=120/6000), corresponding to a single molecule SREF transition rate of 80000 pulses/ms×0.02/pulse=1600/ms. The coupling efficiency between epr-SRS and the probe process can be $1600/8\times10^3$=20%. With a 16% fluorescence quantum yield of Rh800 dye molecule and a collection efficiency approximately 2% of the exemplary microscope (e.g., estimated including all optics and electronic yield), the SREF signal size for one molecule equals to 80000×0.02×0.16×0.02≈5 photon/ms.

Due to the sub-picosecond lifetime of vibrational relaxation, only a small portion of the SRS transitions can be successfully transferred as population at the electronic excited state, which contributes to SREF signal. Under steady state approximation, the coupling efficiency of the probing process can be simply represented as $$\eta_c = \frac{N_3}{N_1 W_{12}\tau_{pulse}} = \frac{\tau_{12}W_{12}N_1}{N_1 W_{12}\tau_{pulse}} = \frac{\tau_{12}}{\tau_{pulse}} \quad (M.4)$$

For example, $\tau_{pulse}$ can be the pulse width. For the exemplary system, equation (M.4) gives 0.5 ps/2 ps=25%, which can be very close to the numerical simulation showed, above. To increase the coupling efficiency without losing the spectral resolution, the shortest pulse for SREF excitation can be around 1 ps for Fourier transform-limited pulse laser system (e.g., bandwidth approximately 10 cm$^{-1}$).

Experimental Procedures for SREF Spectroscopy and Imaging

Exemplary Materials for sample preparation. Dimethyl sulfoxide ("DMSO") (e.g., Sigma, D8418), toluene (e.g., Sigma, 650579), Rhodamine 800 (e.g., Rh800) (e.g., Sigma, 83701), ATTO740 (e.g., ATTO-TEC, AD 740-21), PMMA (e.g., Electron Microscopy Sciences, PMMA powder in the kit, 14655), sulfate acid (e.g., Sigma, 258105), Hydrogen peroxide solution (e.g., 30 wt. % in water) (e.g., Sigma, 216763).

Exemplary Staining and imaging of living *E. coli* cells in FIG. 3. Cells can be incubated with 0.5 μM Rh800 in PBS for 15 min at room temperature for different isotopologues, then centrifuged and washed with PBS at room temperature before mixing together. After mixing, the cells can be seeded on polylysine coated coverslip for SREF imaging. The pixel dwell time of galvanometer-driven raster scanning system can be set to 10 μs. Nineteen-frame SREF image series can be acquired by fixing the Stokes beam at 1,031.2 nm and scanning the pump beam through 836.5-845.5 nm range with a 0.5-nm step size. $P_{pump}$ and $P_{Stokes}$ can be 12 mW and 10 mW, respectively.

Exemplary Single-molecule sample preparation. PMMA solution (e.g., 1 wt. % in toluene) can be prepared by directly dissolving PMMA powder in toluene. 10-mM Rh800 DMSO solution can be pre-diluted to 1-nM in toluene, and further diluted to 50-μM in above PMMA solution. The 50-pM Rh800 PMMA solution can be spin-coated (e.g., 5000 r/min, Laurell Technologies Corporation) onto a quartz coverslip (e.g., Alfa Aesar) to form PMMA-embedded single molecule specimen. Quartz coverslips can be cleaned by first soaking in Piranha solution (e.g., $H_2SO_4:H_2O_2$ solution=3:1 v/v) at 90 degrees Celsius overnight, and then by 30-min ultrasonic cleaning in deionized water for more than 4 times.

Exemplary SREF spectroscopy and imaging of Rh800 and its isotopologues in FIG. 4. For ensemble SREF spectra recording of Rh800 and its isotopologues in PMMA films, samples can be prepared by spin-coating 500-nM corresponding dyes in 1% PMMA toluene onto quartz coverslips. $P_{pump}$ and $P_{Stokes}$ can be 12 mW and 13 mW, respectively. For single-molecule SREF imaging shown in FIG. 4, the imaging sequence can be initial fluorescence imaging (e.g., 660-nm laser excited), sequential SREF spectral imaging series, and final fluorescence imaging again. Pixel size can be set to 100-nm×100-nm; and pixel dwell time were set to 2-ms. $P_{pump}$ and $P_{Stokes}$ can be 8 mW and 6 mW, respectively.

Exemplary Single-molecule statistical analysis in FIG. 4. For a t-test of 61 sets of single-molecule SREF images shown in FIG. 4, signals of 25 pixels in the 5×5-pixel center areas of corresponding images can be used. p-values of on/off tests can be the results of one-tailed paired t-tests between the on-resonance channel (e.g., Pump wavelength=838 nm) and adjacent two off-resonance channels (e.g., Pump wavelength=837 nm and 839 nm), respectively; the p-value of off/off control tests can be the results of two-tailed paired t-test between the high-energy-side off-resonance channel (e.g., Pump wavelength=837 nm) and the low-energy-side off-resonance channel (e.g., Pump wavelength—839 nm). On/off ratios can be calculated by dividing the on-channel signal by the average signal of adjacent two off-resonance channels.

Synthesis of Three Isotope-Edited Rh800 Molecules
Synthesis of $^{12}C\equiv^{15}N$ Rhodamine 800 (Rh800)

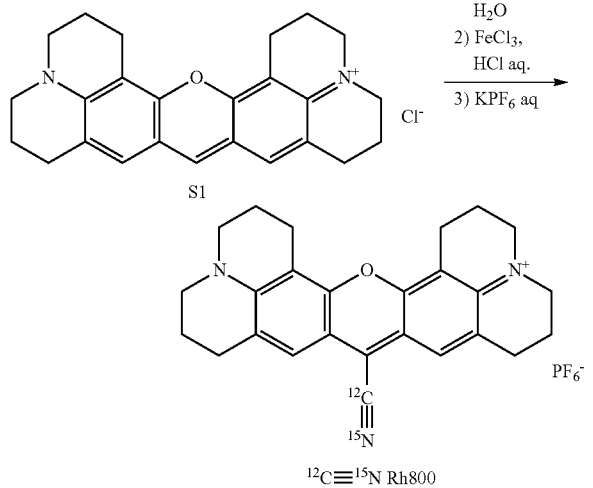

To a solution of S1 (7.5 mg, 18 μmol) in 5 mL acetonitrile and 1 mL water can be added to $KC^{15}N$ solution in $H_2O$ (0.1 M, 360 μL, 36 μmol). The solution can be stirred for 30 min before $FeCl_3$ solution in $HCl/H_2O$ (0.5 M in 1 N HCl, 144 μL, 72 μmol) can be added. The solution can be stirred for another 2 h before 2 mL 5% $KPF_6$ aq. solution can be added. The dark-blue system can be formed and extracted with 3×3 mL DCM. The organic layers can be combined, dried over $Na_2SO_4$ before the solvent can be removed in vacuo. The product can be purified via silica gel flash chromatography (DCM to DCM/MeOH=9/1) to yield $^{12}C\equiv^{15}N$ Rh800 (2.0 mg, 3.7 μmol, 21%) as a dark blue solid.

$^1$H NMR (500 MHz, $CD_3OD$) δ ppm: 7.45 (s, 2H), 3.68-3.56 (m, 8H), 3.00 (t, J=6.4 Hz, 4H), 2.94 (t, J=6.2 Hz, 4H), 2.12-1.99 (m, 8H)

HRMS (ESI+) m/z Calcd. for $C_{26}H_{26}N_2^{15}NO$ $[M]^+$: 397.2046. Found: 397.2043.

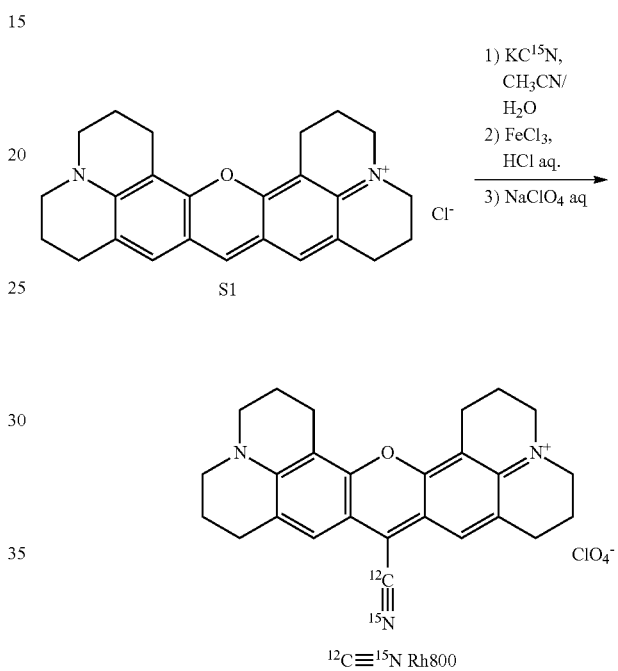

To a solution of S1 (8.3 mg, 20 μmol) in 5 mL acetonitrile and 1 mL water can be added $KC^{15}N$ solution in $H_2O$ (0.1 M, 400 μL, 40 μmol). The solution can be stirred for 30 min before $FeCl_3$ solution in $HCl/H_2O$ (0.5 M in 1 N HCl, 160 μL, 80 μmol) can be added. The solution can be stirred for another 2 h before 2 mL 5% $NaClO_4$ aq. solution can be added. The dark-blue system can be formed and extracted with 3×3 mL DCM. The organic layers can be combined, dried over $Na_2SO_4$ before the solvent can be removed in vacuo. The product can be purified via neutral aluminum oxide flash chromatography (DCM to DCM/MeOH=9/1) to yield $^{12}C\equiv^{15}N$ Rh800 (6.0 mg, 12 μmol, 60%) as a dark blue solid.

$^1$H NMR (500 MHz, $CD_3OD$) δ ppm: 7.47 (s, 2H), 3.64 (t, J=5.9 Hz, 8H), 3.02 (t, J=6.4 Hz, 4H), 2.96 (t, J=6.4 Hz, 4H), 2.13-2.04 (m, 8H)

HRMS (ESI+) m/z Calcd. for $C_{26}H_{26}N_2^{15}NO$ $[M]^+$: 397.2046. Found: 397.2047.

Synthesis of $^{13}C\equiv^{15}N$ Rh800, $^{13}C\equiv^{15}N$ Rh800:

These two dyes can be prepared following the same procedures of $^{12}C\equiv^{15}N$ Rh800 using the corresponding isotopic potassium cyanides as reagents.

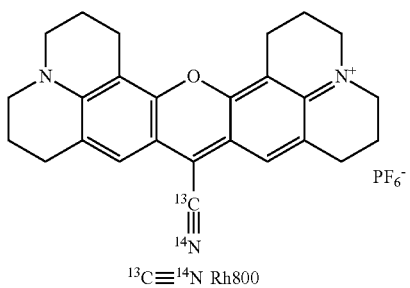

$^{13}C≡^{14}N$ Rh800

$^1$H NMR (400 MHz, CD$_3$OD) δ ppm: 7.44 (s, 2H), 3.67-3.56 (m, 8H), 2.99 (t, J=6.3 Hz, 4H), 2.94 (t, J=6.2 Hz, 4H), 2.13-1.99 (m, 8H)

$^{13}$C NMR (101 MHz, CD$_3$OD) δ 112.4

HRMS (ESI+) m/z Calcd. for C$_{25}$$^{13}$CH$_{26}$N$_3$O [M]$^+$: 397.2109. Found: 397.2104.

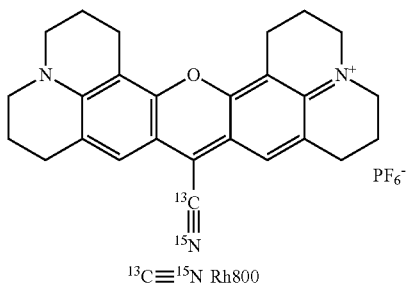

$^{13}C≡^{15}N$ Rh800

$^1$H NMR (500 MHz, CD$_3$OD) δ ppm: 7.45 (s, 2H), 3.66-3.58 (m, 8H), 3.00 (t, J=6.4 Hz, 4H), 2.94 (t, J=6.3 Hz, 4H), 2.11-1.98 (m, 8H)

$^{13}$C NMR (126 MHz, CD$_3$OD) δ 112.4 (d, J=16.4 Hz)

HRMS (ESI+) m/z Calcd. for C$_{25}$$^{13}$CH$_{26}$N$_2$$^{15}$NO [M]$^+$: 398.2080. Found: 398.2081.

SREF Spectroscopy in the Visible Region

In order to address certain limitations (e.g., OPO system operated only in near-IR region, and too much electronic resonance will make anti-Stokes fluorescence dominate SREF, while too little electronic resonance will make SREF too weak), according to an exemplary embodiment of the present disclosure, a modified excitation source can be provided in order to open up a new excitation range near 600-nm, which allows for the testing of the generality of SREF spectroscopy on a number of visible dyes and for the studying of the effect of electronic resonance condition in a systematic way. In some exemplary embodiments, a two-beam free tunable laser system can be used to gain independent access to electronic resonance and vibrational resonance. Alternatively or in addition, the idler beam from the OPO laser source can be frequency doubled and then recombined with the OPO signal beam as a new pair of pump and Stokes beams (see e.g., FIGS. 15A to 15C) to open up a new SREF excitation range near 600-nm. Benefiting from a large variety of commercial fluorescence dyes in this visible range, the generality of SREF can be sufficiently tested. Moreover, a rich list of dyes with slightly different (a few nm interval) absorption peak ($\lambda_{abs}$) can be selected in this range, which can provide different electronic resonance conditions for systematic evaluation. In some embodiments, a modified SREF laser microscopy system 1500 for opening an excitation band near 600 nm can include a periodically poled Lithium Niobate (PPLN) 1501; quarter-wave plate (QWP) 1502; dichroic mirror (DM) 1503; a polarization beam splitter (PBS) 1504; beam splitter (BS) 1505; a single photon counting module (SPCM) 1506; an analog-to-digital converter (ADC) 1508; an electro-optical modulator (EOM) 1509; an avalanched photodiode (APD) 1510; and photodiode (PD) 1511.

Figure 16A:
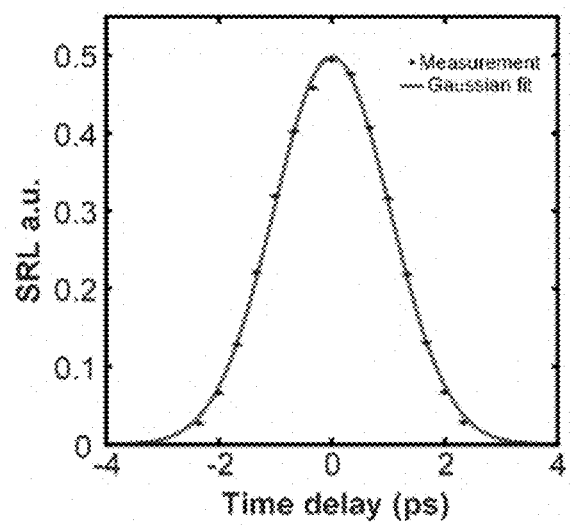
FIG. 16A is an exemplary graph of a stimulated Raman loss signal of a dimethyl sulfoxide hexachlorocyclohexane according to an exemplary embodiment of the present disclosure.

In some embodiments, the modified excitation source can based on an optical modification of an OPO system (e.g., picoEmerald S, APE) which can output the signal beam ($\lambda_{signal}$, tunable from 790-nm to 960-nm) and the idler beam ($\lambda_{idler}$), with their wavelengths following a relationship of $1/\lambda_{signal}+1/\lambda_{idler}=1/515.6$-nm. Thus, by tuning $\lambda_{signal}$, $\lambda_{idler}$ will cover the wavelength range of 1484.4-nm to 1113.8-nm with the same pulse shape and laser linewidth (2-ps, 0.6-nm FWHM bandwidth). The idler beam can then be frequency doubled by second harmonic generation (SHG) with PPLN 1501 crystal (Covesion, MSHG1420-0.5-5) (see e.g., FIGS. 15B and 15C). The SHG ($\lambda_{idler}/2$) of the idler can then be used as the new pump beam ($\omega_p$), and the signal $\lambda_{signal}$ can then be used as the new Stokes beam ($\omega_s$). Further, when tuning $\lambda_{signal}$ from 805-nm to 825-nm with the PPLN temperature matched simultaneously, the $\lambda_{idler}/2$ will sweep from 717.1-nm to 687.4-nm. As such, the energy difference between this new pair covers the Raman shift between 1523-cm$^{-1}$ and 2426-cm$^{-1}$ (see e.g., FIG. 15B, which depicts the wavelength of SHG 1550 of OPO idler and corresponding resonance Raman shift 1560 as a function of OPO signal wavelength when OPO signal is set as Stoke beam and the SHG is set as pump beam). The crystal length (5 mm) is chosen to be short enough to ensure neglectable group velocity mismatch, which well maintains of the ~2-ps pulse width for efficient SREF excitation (see e.g., FIG. 16A, which depicts the stimulated Raman loss (SRL) signal of DMSO HCH deformation mode (1420 cm$^{-1}$) at different time delays between doubled idler and OPO signal; dots are measurements and curve is Gaussian fitting).

With this new excitation source, the total excitation energy (($\omega_p-\omega_s)+\omega_p$) for a typical C=C skeletal mode (~1650 cm$^{-1}$) of fluorescent dyes reaches ~638-nm. Therefore, C=C skeletal mode with dye absorption peak ($\lambda_{abs}$) around 638-nm can be excited. Different from the previous near-IR region which lacks bright fluorophores, many commercial fluorophores with high photo-stability and large quantum yield, such as Alexa 610, ATTO Rho14, Nile Blue A, Alexa 633, ATTO 633, Alexa 647 etc., can be found with absorption peak around 638-nm (likely because of the famous He—Ne laser line at 633-nm). To test the generality of SREF spectroscopy and to ascertain the critical and/or important electronic pre-resonance condition systematically, seven popular fluorescent dyes with $\lambda_{abs}$ gradually shifting from 621-nm to 662-nm can be selected. With the additional use of a solvatochromic effect in different solvents, 11 different $\lambda_{abs}$ can be generated within this range with a step size of several nanometers (Table 1). Since the total SREF excitation energy (($\omega_p-\omega_s)+\omega_p$) of the C=C mode is fixed around 638-nm, these 11$\lambda_{abs}$ from 621-nm to 662-nm serve as a "sweep" to study the effect of electronic resonance condition in a systematic way. As shown in Table 2 below, these 11 cases can be divided into three categories depending on the energetic relationship between $\lambda_{abs}$ and (($\omega_p-\omega_s)+\omega_p$).

TABLE 2

Spectral properties of red SREF dyes

| Dye[1] | Solvent[2] | $\lambda_{abs}$ (nm) | C = C mode (cm$^{-1}$) | $(\omega_p - \omega_s) + \omega_p$ (nm) | Concentration (nM) | SNR[3] |
|---|---|---|---|---|---|---|
| ATTO 610 * | a | 621 | 1644 | 638.1 | 500 | undetectable |
| Alexa 633 ^ | a | 630 | 1651 | 637.6 | 100 | 2.5 |
| ATTO 610 * | b | 631 | 1644 | 638.1 | 500 | 3.0 |
| ATTO Rho14 * | a | 632 | 1652 & 1680 | 637.5 & 635.7 | <2000 | 7.5 & 2.1 |
| Nile Blue A | c | 635 | 1652 | 637.5 | 500 | 7.1 |
| ATTO 633 * | a | 635 | 1640 | 638.4 | 500 | 3.1 |
| ATTO Rho14 * | b | 638 | 1652 &1680 | 637.5 & 635.7 | 50 | 3.0 & 1.5 |
| Alexa 633 ^ | b | 640 | 1651 | 637.6 | 10 | 3.0 |
| ATTO 633 * | b | 642 | 1640 | 638.4 | 500 | 1.6 |
| Alexa 647 * | a | 654 | 1602 | 640.8 | 500 | undetectable |
| JF 646 * | d | 662 | 1616 | 639.9 | 500 | undetectable |

Note:
1. ^ for carboxy linker; * for NHS linker;
2. a for PBS (pH = 7.4); b for DMSO; c for ethanol; d for 0.1% TFA in ethanol;
3. SNR for signal to noise ratio; data shown in Figures 17A to 17C, 18A to 18H, and 19A to 19F.

Figure 17A:
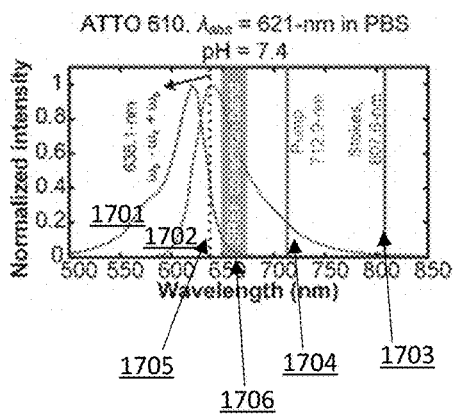
FIG. 17A is an exemplary graph illustrating stimulated Raman excited fluorescence spectroscopy on ATTO 610 according to an exemplary embodiment of the present disclosure.
Figure 17B:
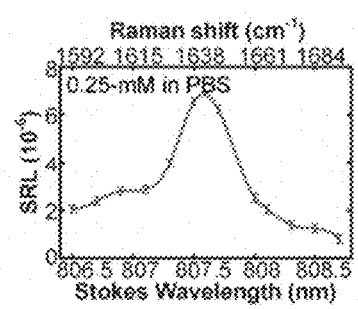
FIG. 17B is an exemplary graph illustrating a stimulated Raman scattering spectrum of ATTO 610 according to an exemplary embodiment of the present disclosure.
Figure 17C:
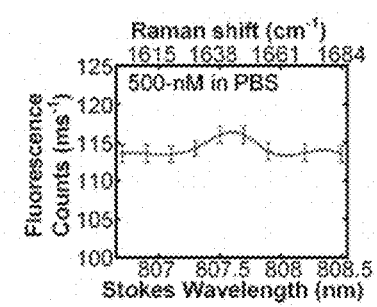
FIG. 17C is an exemplary graph illustrating a stimulated Raman excited fluorescence spectrum of ATTO 610 according to an exemplary embodiment of the present disclosure.

Starting from the high-energy side of the absorption peaks, ATTO 610 (NHS ester) in phosphate buffered saline (PBS, pH=7.4) is the model dye in this category. As shown in FIG. 17B, the SRS spectrum of ATTO 610 (NHS ester) clearly shows a Raman peak around 1638 cm$^{-1}$ for its C=C skeletal mode. FIG. 17B also depicts the corresponding concentration and solvent, i.e., 0.25 mM in PBS. Further, the SRS spectrum was measured under 2.5-mW pump power and 13-mW Stokes power. Further, FIG. 17A depicts the SREF excitation and signal collection diagrams for ATTO 610 (NHS ester) in PBS (pH=7.4), where curve 1701 shows the absorption spectra and curve 1702 shows the emission spectra. Further, lines 1703, 1704, and 1705 show the corresponding wavelength positions of Stokes beam ($\omega_s$), pump beam ($\omega_p$) and total excitation energy $((\omega_p-\omega_s)+\omega_p)$, respectively; and the band 1706 shows the fluorescence collection band of filter set (FF01-661/20, Semrock). Further, e.g., all laser lines and CARS lines $((\omega_p-\omega_s)+\omega_p)$ can be avoided.

For example, the electronic resonance can be detuned substantially so that the total SREF excitation energy $((\omega_p-\omega_s)+\omega_p)$ is lying below the ensemble 0-0 transition energy (i.e. the cross point between the absorption spectrum and corresponding emission spectrum). As a result of this energetic gap, the pure SREF signal is observed to be very weak and barely detectable above the background (see e.g., FIGS. 17B and 17C, which depicts the SREF spectrum of ATTO 610 (NHS ester), where the SREF spectrum was measured under 6-mW pump power and 13-mW Stokes power). It can be reasoned that only a very small portion of molecules in the solution can be pumped to electronic excited state by SREF (likely because of inhomogeneous broadening). Therefore, the 0-0 transition energy can be set as the "red" side limit for the total SREF excitation energy. This limit can become more apparent after considering the complete "sweep" of the cases described herein.

There are exemplary different cases in the second category in which the total SREF excitation energy slightly exceeds that of the 0-0 transition line and lies in the vicinity of the dye absorption peak ($\lambda_{abs}$). Robust SREF peaks can be observed against the anti-stokes fluorescence background in all eight cases (see e.g., FIGS. 18A to 18H). As depicted in FIGS. 18A to 18H, the respective left columns show the SREF excitation and signal collection diagrams for Alexa 633 (Carboxy) in PBS (pH=7.4), ATTO 610 (NHS ester) in DMSO, ATTO Rho14 (NHS ester) in PBS (pH=7.4), Nile Blue A in ethanol, ATTO 633 (NHS ester) in PBS (pH=7.4), ATTO Rho14 (NHS ester) in DMSO, Alexa 633 (Carboxy) in DMSO, ATTO 633 (NHS ester) in DMSO. In such shown panels of FIGS. 18A to 18H, similar to the exemplary panels of FIGS. 17A to 17C, curves 1701 and 1702 show the absorption and emission spectra in corresponding solvents, respectively; lines 1703, 1704, and 1705 show the corresponding wavelength positions of Stokes beam ($\omega_s$), pump beam ($\omega_p$) and total excitation energy $((\omega_p-\omega_s)+\omega_p)$, respectively; and the bands 1706 show the fluorescence collection band of filter set (FF01-661/20, Semrock). Further, all laser lines and CARS lines $((\omega_p-\omega_s)+\omega_p)$ can be avoided. Further, the center columns show the SRS spectra of corresponding dyes, which are measured under 2.5-mW pump power and 13-mW Stokes power. The right column graphs of FIGS. 18A to 18H show the SREF spectra of corresponding dyes, which were measured under 6-mW pump power and 13-mW Stokes power. Concentrations and solvents are marked in corresponding panels, respectively.

For several of these dyes, such as ATTO Rho14 and Alexa 633 (see e.g., FIGS. 18F and 18G), high quality SREF spectra can be recorded with solution even below 50 nM (which corresponds to only a few molecules on average within a tight laser focal volume). This superb sensitivity can be attributed to the nearly perfect match between $((\omega_p-\omega_s)+\omega_p)$ and $\lambda_{abs}$. Moreover, SREF spectra containing double vibrational peaks were recorded for ATTO Rho14 in both PBS and DMSO solutions (see e.g., FIGS. 18C and 18F), which illustrate the exemplary accurate reflection of SREF on the vibrational dimension. This is an important technical advance and generalization.

In the third and final category, there are two more exemplary cases in which the total SREF excitation energy exceeds that of the 0-0 transition line by 20 nm (approximately exceeding the dye absorption peak by 10-nm). As shown in FIGS. 19A to 19F, although the SRS spectra, which are measured under 6-mW pump power and 13-mW Stokes power, display the Raman peaks around 1600 cm$^{-1}$ from C=C skeletal mode for Alexa 647 in PBS (see e.g., FIG. 19B) and JF646 in 0.1% TFA ethanol (see e.g., FIG. 19E), their vibrational features are largely buried by the anti-Stokes fluorescence background in the corresponding SREF spectra. Under this condition, the molecules are said to be over electronic pre-resonance and the SREF strategy for vibrational detection fails, which sets the "blue" side limit for the total SREF excitation energy. FIGS. 19A and 19D show the SREF excitation and signal collection diagrams for Alexa 647 (NHS ester) and JF646 (NHS ester), respectively. In these exemplary panels/graphs, curves 1701 and 1702 show the exemplary absorption and emission spectra in corresponding solvents, respectively; lines 1703, 1704, and 1705 show the corresponding exemplary wavelength positions of Stokes beam ($\omega_s$), pump beam ($\omega_p$) and total excitation energy (($\omega_p - \omega_s$)+$\omega_p$), respectively; and the bands 1706 show the fluorescence collection band of filter set (FF01-661/20, Semrock). Further, the laser lines and CARS lines (($\omega_p - \omega_s$)+$\omega_p$) can be avoided. Further, FIGS. 19C and 19F show the SREF spectra of corresponding dyes, which can be measured under 6-mW pump power and 13-mW Stokes power. Further, the concentrations and solvents are marked in corresponding panels, respectively.

This exemplary systematic SREF spectroscopy review on the C≡C skeletal mode of a total of 11 cases distributed in three different categories facilitates a quantitative insight to be gained into the generality and extendibility of SREF. For example, an exemplary conclusion can be drawn that the "proper electronic pre-resonance" condition for successful SREF is within ~20-nm range between the absorption peak of fluorescence dye and the total SREF excitation energy: 0-0 transition energy sets the "red" limit for the total SREF excitation energy, and the 20-nm above the 0-0 transition energy sets the "blue" limit. This provides strong experimental data to show that, when under such electronic pre-resonance condition, SREF would be a general phenomenon for a large class of fluorophores with high sensitivity, as supported by all the eight cases shown in Figure. Once outside this range, SREF signal could be either too weak or be buried in anti-Stokes fluorescence background, as shown in FIGS. 17A to 17C and FIGS. 19A to 19F.

To further test if the exemplary insight obtained above is extendable to other electronic coupled Raman modes, synthesized two new fluorophores, e.g., fluorophores A and B, with nitrile group installed on their conjugation systems. The synthesis of fluorophores A and B is provided below.

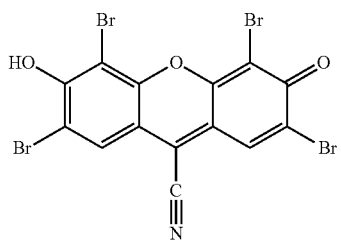

2,4,5,7-tetrabromo-6-hydroxy-3-oxo-3H-xanthene-9-carbonitrile (Fluorophore A)

Fluorophore A was synthesized according a reported protocol.

Scheme S1 Synthetic route of Fluorophore B.

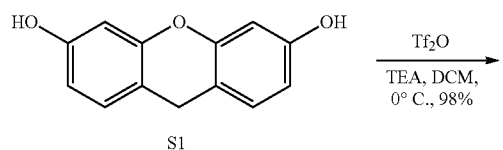

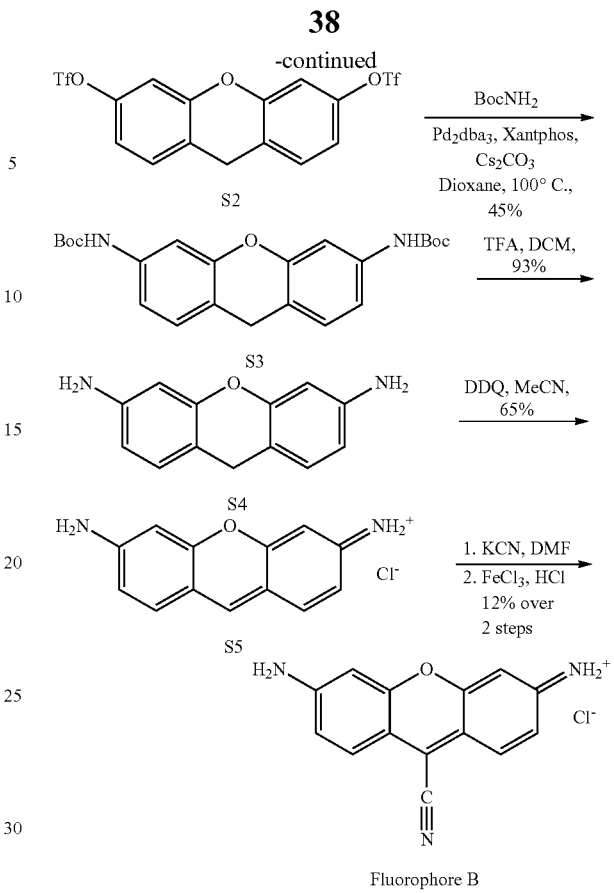

Fluorophore B

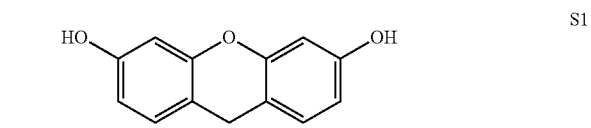 [SMILES: Oc1ccc2c(c1)Oc1cc(O)ccc1C2]

9H-xanthene-3,6-diol (S1): Compound S1 was synthesized according to previously reported procedure.

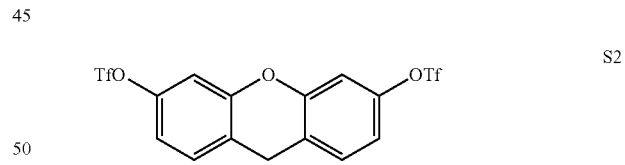

9H-xanthene-3,6-diyl bis(trifluoromethanesulfonate) (S2): A flame-dried round-bottom flask was charged with a solution of S1 (642 mg, 3 mmol, 1 eq) in anhydrous $CH_2Cl_2$ (10 mL) followed by the addition of triethylamine (1.67 mL, 12 mmol, 4 eq). After cooled to 0° C., trifluoromethanesulfonic anhydride in $CH_2Cl_2$ (1 M solution, 7.0 mL, 7 mmol, 2.3 eq) was added dropwise to the flask. The reaction was warmed up to room temperature and further stirred for 2 h until quenched by addition of 20 mL 1 N HCl. The aqueous phase was extracted with $CH_2Cl_2$ (30 mL×3). The combined organic layers were washed with brine, dried over sodium sulfate and the solvent was removed upon evaporation. The residue was purified with flash chromatography (ethyl acetate:hexane, from 1:10 to 1:2, v/v) to afford S2 (1.36 g, 95%) as yellowish oil, which slowly concreted to an off-white solid. $^1$H NMR (400 MHz, CDCl$_3$) δ 7.25 (d, J=6.9 Hz, 2H), 6.99-7.03 (m, 4H), 4.09 (s, 2H). $^{13}$C NMR (126 MHz, CDCl$_3$) δ 151.88, 148.65, 130.35, 120.32, 118.8 (q, J=321 Hz, CF$_3$), 116.73, 110.30, 27.18. HRMS (ASAP) calcd for C$_{15}$H$_8$F$_6$O$_7$S$_2$ [M]$^+$ 477.9116, found 477.9613.

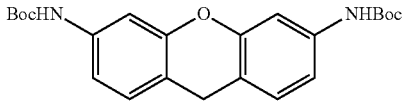

S3 di-tert-butyl (9H-xanthene-3,6-diyl)dicarbamate (S3): A round bottom flask was charged with S2 (900 mg, 1.89 mmol, 1 eq), tert-butyl carbamate (1.06 g, 4.54 mmol, 2.4 eq), Pd$_2$dba$_3$ (171 mg, 0.189 mmol, 0.1 eq), Xantphos (324 mg, 0.567 mmol, 0.3 eq), Cs$_2$CO$_3$ (1.72 g, 5.2 mmol, 2.8 eq). Dioxane (9 mL) was then added under Ar protection. The reaction was stirred at 100° C. for 24 h. After cooled to room temperature, the mixture was filtered through celite and washed with CH$_2$Cl$_2$. The filtrate was concentrated and purified by silica gel chromatography (5%-20% Acetone/Hexane first followed by 15% EtOAc/Hexane) to afford S3 (365.1 mg, 46%) as colorless oil. $^1$H NMR (400 MHz, CDCl$_3$) δ 7.09-6.99 (m, 6H), 6.42 (s, 2H), 3.92 (s, 2H), 1.55 (s, 18H). $^{13}$C NMR (100 MHz, CDCl$_3$) δ 152.8, 152.1, 138.0, 129.3, 115.2, 113.4, 106.8, 80.8, 28.5, 26.9. HRMS (ESI) calcd for C$_{23}$H$_{28}$N$_2$O$_5$ [M+Na]$^+$ 435.1896, found 435.1906.

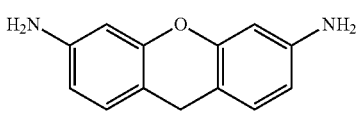

S4

9H-xanthene-3,6-diamine (S4): S3 (200 mg, 0.48 mmol) was dissolved in CH$_2$Cl$_2$ (10 mL) followed by the addition of trifluoroacetic acid (2.5 mL). The reaction was stirred at room temperature for 2 h. The mixture was evaporated to dryness and dissolved in ethyl acetate. The solution was washed with saturated NaHCO$_3$ and brine. The organic layer was dried over Na$_2$SO$_4$ before the solvent was removed in vacuo and S4 (95.6 mg, 93%) was obtained as colorless oil. $^1$H NMR (400 MHz, MeOD) δ 6.89 (d, J=8.0 Hz, 2H), 6.42 (dd, J=8.0, 4.0 Hz, 2H), 6.38 (d, J=4.0 Hz, 2H), 3.75 (s, 2H). $^{13}$C NMR (126 MHz, MeOD) δ 153.8, 148.2, 130.4, 112.0, 111.8, 104.0, 27.2. HRMS (ASAP) calcd for C$_{13}$H$_{12}$N$_2$O$_1$ [M+H]$^+$ 213.1028, found 213.1024.

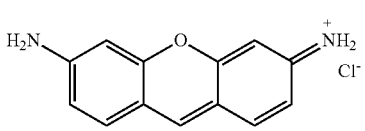

S5

6-amino-3H-xanthen-3-iminium chloride (S5): S4 (94 mg, 0.44 mmol) was dissolved in 12 mL acetonitrile before 2,3-dichloro-5,6-dicyano-1,4-benzoquinone (DDQ, 150 mg, 0.66 mmol) was added. The reaction was stirred at room temperature for 1 h and then filtrated. The precipitate was washed with alcohol and then dissolved in DMF followed by addition of brine and silica gel to exchange the counterion. The mixture was concentrated in vacuo until dryness and purified by silica gel flash chromatography (5%-30% MeOH/CH$_2$Cl$_2$) to yield S5 (71.8 mg, 66%) as deep red solid. $^1$H NMR (400 MHz, DMF-d7) δ 8.77 (s, 1H), 8.63 (s, 4H), 7.85 (d, J=8.0 Hz, 2H), 7.21 (d, J=8.0 Hz, 2H). $^{13}$C NMR (100 MHz, DMF-d7) δ 162.0, 159.3, 147.5, 135.1, 118.0, 115.2, 98.4. HRMS (ESI) calcd for C$_{13}$H$_{11}$N$_2$O$_1^+$ [M]$^+$ 211.0871, found 211.0899.

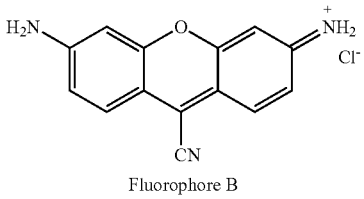 [SMILES: N#Cc1c2ccc(=N)cc-2oc2cc(N)ccc12 ; [Cl-]]

Fluorophore B 6-amino-9-cyano-3H-xanthen-3-iminium chloride (Fluorophore B): To a solution of S5 (14.7 mg, 0.06 mmol) of DMF (3 mL) was added KCN solution in H$_2$O (0.1 M, 1.8 mL, 0.18 mmol, 3 eq) and reaction was stirred at room temperature for 15 minutes. FeCl$_3$ solution in HCl/H$_2$O (0.5 M in 1 N HCl, 1.8 mL, 0.9 mmol, 15 eq) was added and the reaction was then stirred for additional 2 hours. The product was purified by HPLC to obtain Fluorophore B (2 mg, 12%) as purple solid. $^1$H NMR (500 MHz, MeOD) δ 7.88 (d, J=9.1 Hz, 2H), 7.09 (dd, J=9.1, 1.9 Hz, 2H), 6.80 (d, J=1.9 Hz, 2H). $^{13}$C NMR (125 MHz, MeOD) δ 162.5, 159.3, 132.0, 125.3, 119.9, 115.5, 113.2, 99.1. HRMS calcd for C$_{14}$H$_{10}$N$_3$O$_1^+$ [M]$^+$ 236.0824, found 236.0851.

For fluorophores A and B, strong electronic coupled nitrile modes are observed with Raman resonance around 2200 cm$^{-1}$ (see e.g., FIGS. 20C and 20G). For fluorophore A, which is configured with $\lambda_{abs}$=635-nm in PBS (pH=7.4) (FIG. 20A), the total SREF excitation energy for nitrile mode reaches 600.4-nm, meaning the SREF excitation is far beyond the blue side limit of proper electronic pre-resonance (see e.g., FIG. 20B). Consistent with the insight obtained above, an overwhelming anti-Stokes fluorescence background can be observed, and no sharp vibrational feature can be found on the fluorescence excitation spectrum (see e.g., FIGS. 20C and 20D). In contrast, for fluorophore B, which is designed with $\lambda_{abs}$=595-nm (see e.g., FIG. 20E), the total SREF excitation energy of nitrile mode (resonance at 2250 cm$^{-1}$) reaches 599.6-nm, which makes it well within the proper electronic pre-resonance (see, e.g., FIG. 20F). Indeed, an obvious SREF peak can be detected above the anti-Stokes fluorescence background at the exact Raman resonance of the nitrile mode (see e.g., FIGS. 20G and 20H). Therefore, the newly synthesized dyes on different Raman modes also support the obtained insights. Note that the fluorophore A experiences a strong quenching effect in many solvents (including in PBS, pH=7.4), mainly due to the ionization dynamics that led to the failure of the push-pull electronic conjugation system. Together with the low fluorescence collection efficiency of the emission filter (FIG. 5 f, blue band), only a moderate detection sensitivity of ~700-nM can be achieved. Further engineering of less-quenchable fluorophores can significantly improve the sensitivity up to single molecule level. Further, with regard to FIGS. 20B and 20F, curves 1701 and 1702 show the absorption and emission spectra in corresponding solvents, respectively; lines 1703, 1704, and 1705 show the corresponding wavelength positions of Stokes beam ($\omega_s$), pump beam ($\omega_p$) and total excitation energy (($\omega_p$−$\omega_s$)+$\omega_p$), respectively; and the bands 1706 show the fluorescence collection band of filter set (FF01-661/20, Semrock). Further, all laser lines and CARS lines $((\omega_p-\omega_s)+\omega p)$ can be avoided. Further, the SRS spectra in FIGS. 20C and 20G can be measured under 2.5-mW pump power and 13-mW Stokes power. The SREF spectra in FIGS. 20D and 20H can be measured under 6-mW pump power and 13-mW Stokes power. Concentrations and solvents are marked in corresponding panels, respectively.

Figure 21:
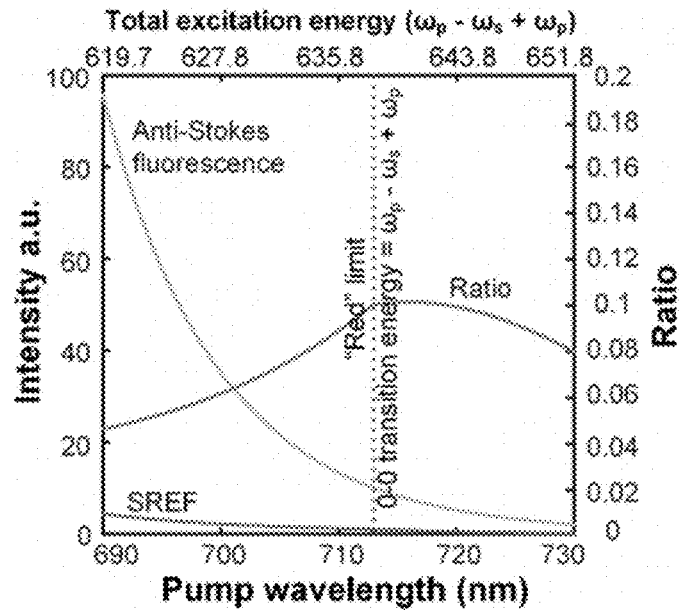
FIG. 21 is an exemplary graph illustrating a theoretical modeling of the stimulated Raman excited fluorescence signal and anti-Stokes fluorescence background according to an exemplary embodiment of the present disclosure.

An explanation for the experimental insight above can be obtained by modeling the detuning trend of SREF signal and anti-Stokes fluorescence background (see e.g., FIGS. 8A and 21-23). In some embodiments, the anti-Stokes fluorescence background can be modeled by Boltzmann statistics as a function of pump beam detuning (see e.g., FIG. 23). On the other hand, the modeling of SREF signal can depend on whether the total excitation energy $((\omega_p-\omega_s)+\omega_p)$ is above the 0-0 transition line. If so, the SREF signal is mainly determined by the SRS pumping rate which can be modeled by the Albrecht A-term, as the pump pulse can easily saturate the transitions from ground-state vibrational-excited states to the first electronic excited state. If not, SREF transition rate can be further modulated by the profile of the absorption tail (FIGS. 22A and 22B). FIG. 21 shows the evolving trend of the ratio between the SREF signal and anti-Stokes fluorescence background, if the competition between different processes can be ignored. In some embodiments, when the total excitation energy $((\omega_p-\omega_s)+\omega_p)$ is above 0-0 transition line, the anti-Stokes fluorescence increases much faster than SREF. As a result, when the total excitation energy is above 0-0 transition line by ~20-nm, the ratio between SREF and anti-Stokes fluorescence decreases by more than two times. Note that this ratio can be further decreased due to competition between different processes, such as ground state depletion, etc. Hence this trend can explain the observed "blue" limit (see e.g., FIGS. 19A to 19F). When the total excitation energy $((\omega_p-\omega_s)+\omega_p)$ is below 0-0 transition line, the absolute SREF signal drops very fast (see e.g., FIG. 22B), which can explain the observed "red" limit for successful SREF detection. Besides offering theoretical support to the blue and red limits for the resonance condition of the total excitation energy, this model also suggests that SREF to anti-Stokes fluorescence ratio would reach the maximum near the 0-0 transition line, which is indeed observed in the SREF spectra of ATTO 633 and ATTO Rho14 in PBS and DMSO (see e.g., FIGS. 18C, 18F, 18E, and 18H).

Figure 22A:
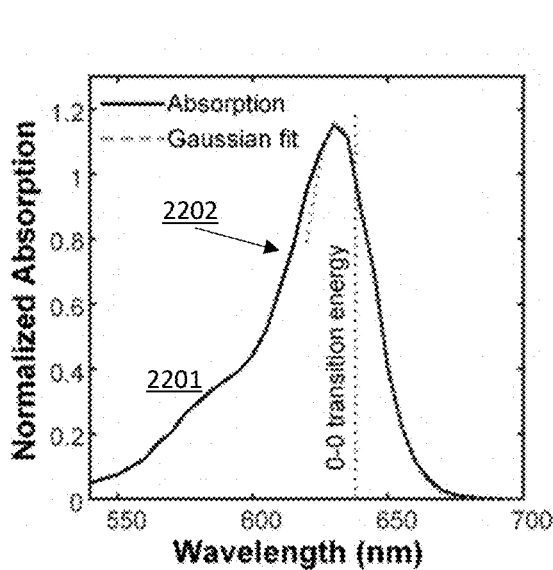
FIG. 22A is an exemplary graph illustrating a model for the stimulated Raman excited fluorescence transition rate according to an exemplary embodiment of the present disclosure.
Figure 22B:
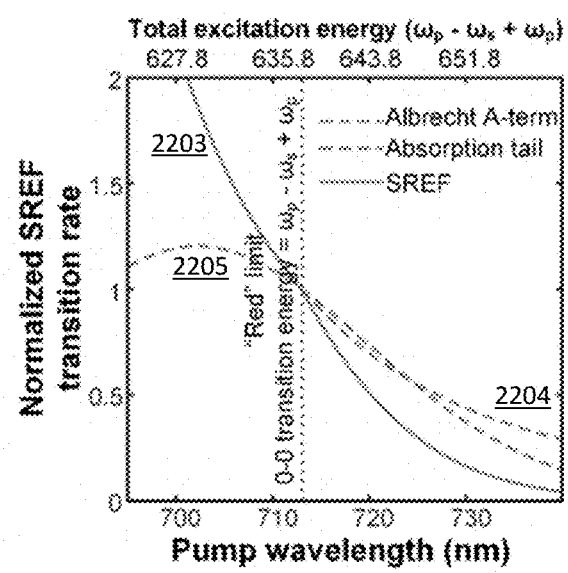
FIG. 22B is an exemplary graph illustrating a model for the stimulated Raman excited fluorescence transition rate as a function of pump detuning according to an exemplary embodiment of the present disclosure.

FIG. 22A depicts the Gaussian fit of the absorption tail, according to an exemplary embodiment of the present disclosure. For example, curve 2201 depicts the absorption spectrum of Atto 610 in DMSO, whose total excitation energy equals the ensemble 0-0 transition line; dash curve 2202 depicts the Gaussian fit of the absorption tail. The Gaussian fit can only describe the absorption accurately near the 0-0 transition line. When the wavelength is very far away from the 0-0 transition line, the absorption obeys exponential decay, which should be modeled by Boltzmann distribution, as was done for the modeling of anti-Stokes fluorescence background. FIG. 22B depicts the model of the SREF transition rate as a function of pump detuning (curve 2203). The dash curve 2204 corresponds to the Albrecht A-term, while the dash curve 2205 is the Gaussian fit of absorption tail shown in FIG. 22A. In some embodiments, when above the 0-0 transition line, the SREF transition rate follows the trend of Albrecht A-term; when below the 0-0 transition line, the SREF transition rate is determined by the product of Albrecht A-term and the absorption tail.

In summary, with the use of an exemplary excitation source and the exploration of a large palette of popular dyes, the generality of SREF spectroscopy on a wide variety of visible dyes with nanomolar-level sensitivity can be established. Moreover, by systematically analyzing how the SREF performance depends on the electronic resonance, the experimental rule for the critical electronic pre-resonance condition can be revealed. For example, the total excitation energy $((\omega_p-\omega_s)-\omega_p)$ should lie within the 20-nm range around the absorption peak $\lambda_{abs}$ of fluorophores above the 0-0 transition energy. Exemplary modeling (see e.g., FIG. 21) also supports such determination. As such, the successful SREF detection of all 8 cases falling within the proper electronic pre-resonance window strongly supports the generality and robustness of SREF spectroscopy (see e.g., Table 2). Furthermore, as described herein for the exemplary nitrile-containing fluorophores (see e.g., FIGS. 20A to 20H), this can be used as a valuable guide to design SREF-optimized dyes for advanced application such as super-multiplexed biomedical imaging.

Further Exemplary Method

Figure 16B:
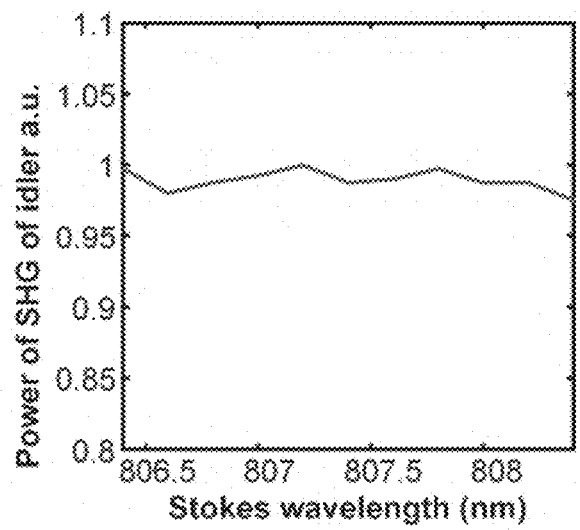
FIG. 16B is an exemplary graph of a power output of a second harmonic generation of an optical parametric oscillator idler according to an exemplary embodiment of the present disclosure.

In certain exemplary embodiments of the present disclosure, an OPO system (e.g., APE picoEmerald S) can include an idler beam output 1520 up to 350-mW, signal beam output 1521 up to 800-mW, both with 0.6-nm HWFM bandwidth, 80-MHz repetition rate, and ~2-ps pulse width. The idler beam 1521 (~1-mm beam diameter) can be weakly focused (focus length f=75-mm) into a 5-mm PPLN 1501 crystal (e.g., Covesion, MSHG1420-0.5-5) for SHG generation. Further, computer software based on LabVIEW can be used, e.g., via a processor 1530, to synchronize the OPO tuning and the temperature of the oven (Covesion, PV10 and OC2) that hosts the crystal. A power up to 120-mW can be achieved across the whole tuning range of the crystal. The benefit of using PPLN 1501 for frequency doubling is that the output beam shares exactly the same polarization and propagation direction as the input idler beam 1520, which ensures the spatial overlap between pump beam and Stokes beam during laser tuning process. A feedback power control loop based on a photodiode 1511 (e.g., Thorlabs, PDA36A) and a halfwave plate (HWP) mount on a motorized rotation stage 1526 (e.g., Thorlabs, PRM IZ8) has been built to precisely adjust the power within 2% fluctuation range during laser tuning for high accurate excitation spectrum recording (see e.g., FIGS. 15C, 16A, and 16B). Then, the SHG of the idler 1520 can be set as the pump beam, and the OPO signal 1521 can be set as the Stokes beam. These beams can be expanded, collimated, and transmitted to a galvanometer-based (e.g., GVSM002, Thorlabs) two-dimension laser scanning microscopy, e.g., 2D galvo-scan unit 1523. The scan lens (e.g., Thorlabs, SL50-CLS2) and tube lens (e.g., Thorlabs, TL200-CLS2), which can be contained in the 2D galvo-scan unit 1523, facilitate an additional 4× beam expansion (detail alignment of the scan lens and the tube lens can be found in FIG. 24). Then, the back pupil of the objective 1524 (e.g., UPLSAPO, 1.2 N.A., Olympus) can be overfilled by both of the two beams to approach diffraction limited focus. A delay line 1525 on SHG of the idler can be used to control the delay between pump beam and Stokes beam. An electro-optic modulator 1509 (e.g., Thorlabs, EO-PM-R-20-C1) can be used on the Stokes beam for all SRL measurements. The laser itself can provide a 20-MHz driving signal, it can be amplified by a power amplifier (e.g., Mini-Circuits, ZHL-1-2W+) before being sent to the modulator to achieve a modulation depth of more than 90%. For all SREF measurements, a short pass dichroic mirror 1503 (e.g., Chroma, T690spxxr) can be used to reflect the pump and Stokes beam but pass the backward fluorescence, and two bandpass filters 1527 (e.g., FF01-661/20, Semrock) can be used to totally block pump and Stokes laser lines and CARS lines. A 75-mm doublet 1528 can be used to relay the fluorescence emitted in the objective focus to a 100-μm diameter small area avalanched photodiode 1510 (e.g., SPCM-NIR-14-FC, 70-cps dark counts, Excelitas) worked at single-photon-counting mode to form serious confocal detection. For all the SRL and SREF signal acquisition, samples can prepared by sandwich solutions with standard 1-mm thick glass slide and 0.17-mm coverslip, separated by 0.12-mm thick imaging spacers (e.g., 20-mm diameter, Sigma, GBL654006). For nanomolar-concentration solutions, to avoid dye absorption on glass interface, both slides and coverslips can be cleaned in Piranha solution41 (e.g., H2SO4:H2O2 solution=3:1 v/v) at 90 degrees Celsius overnight, and further rinsed by 30-min ultrasonic cleaning in deionized water for more than 4 times. Data points can be collected with 1-ms dwell time while laser focus can be driven to scan in the solution to avoid obvious photo-bleaching at a single point, where each data point on the spectra represents the mean value of 200 independent measurements, and the corresponding error bar represents 95% confidence intervals of the mean values. All data collection and laser-scan control can be achieved by a NI card (e.g., PCI-6259, NI) driven by the computer software (e.g., LabVIEW program) via the processor 1530.

Theoretical Modeling of SREF and Anti-Stoke Fluorescence Background

Because both the electronic and vibration coherence will die out with less than 1-ps, under a 2-ps laser source excitation, a simple model based on three-level rate equation is proper to describe the SREF process (see e.g., FIG. 8A). As shown in FIG. 8A, because the pump pulse easily saturates the transitions from vibrational-excited states of ground state to the first electronic excited state ($W_{21}\tau_{pulse} > 10$), the SREF signal ($\propto N_3$) is mainly determined by the SRS pumping rate when the total excitation energy $((\omega_p - \omega_s) + \omega_p)$ is above the ensemble 0-0 transition line (e.g. the cross point between the absorption spectrum and corresponding emission spectrum). The pre-resonance stimulated Raman cross section as a function of pump detuning can be well-modeled by the Albrecht A-term, so the SREF transition rate is $$W_{SREF} \propto \omega_{pump}(\omega_{pump} - \omega_{vib})^3 \left[ \frac{(\omega_{pump}^2 + \omega_0^2)}{(\omega_0^2 - \omega_{pump}^2)^2} \right]^2$$

in this region. Here $\omega_{vib}$ is the vibrational transition energy of the corresponding mode, $\omega_{pump}$ is the pump photon energy, and $\omega_0$ represents the electronic transition energy. When the total excitation energy $((\omega_p - \omega_s) + \omega_p)$ is below the ensemble 0-0 transition line, only a portion of molecules can be excited to the electronic excited state due to inhomogeneous broadening. Therefore, SREF transition rate can also be modulated by the absorption tail (normalized to the ensemble 0-0 transition line). The absorption tail can be easily fit by the inhomogeneous line shape, which is Gaussian, as illustrated in FIG. 22A. In summary, when the total excitation energy $((\omega_p - \omega_s) + \omega_p)$ is above the ensemble 0-0 transition line, the SREF transition rate as a function of pump detuning can be modeled by Albrecht A-term; when the total excitation energy $((\omega_p - \omega_s) + \omega_p)$ is below the ensemble 0-0 transition line, it can be modeled by the product of Albrecht A-term and the absorption tail. FIG. 22B shows the overall result with SREF signal normalized to 0-0 transition wavelength.

Further, because there are always thermal populations residing in different vibrational excited states of the electronic ground state, the pump beam can always excite a portion of molecules to electronic excited state through those thermal populations, causing anti-Stokes fluorescence background (which is the main SREF background detected by the exemplary microscope; note that the CARS wavelength is blocked by high O.D. filters). Because the thermal populations obey the Boltzmann distribution, anti-Stokes naturally follows the Boltzmann statistics, which has been intensively reported in previous research on anti-Stokes fluorescence induced cooling of dye solutions. Based on previous experiments and derivations, the anti-Stokes background as a function of pump detuning can be modeled by a simple exponential decay.

$$I(\omega_p) = e^{-\frac{\hbar\omega_1}{kT} - c}$$

Here k is Boltzmann constant; T is the temperature in Kelvin; ℏ is Planck constant; C is a constant determined by dye energy structure, dye concentration and excitation geometry. Therefore, the ratio of anti-Stokes fluorescence between two different pump wavelengths ($\omega_1$ and $\omega_2$) can be represented as:

$$\frac{I(\omega_1)}{I(\omega_2)} = e^{-\frac{\hbar(\omega_1 - \omega_2)}{kT}}$$

Figure 23:
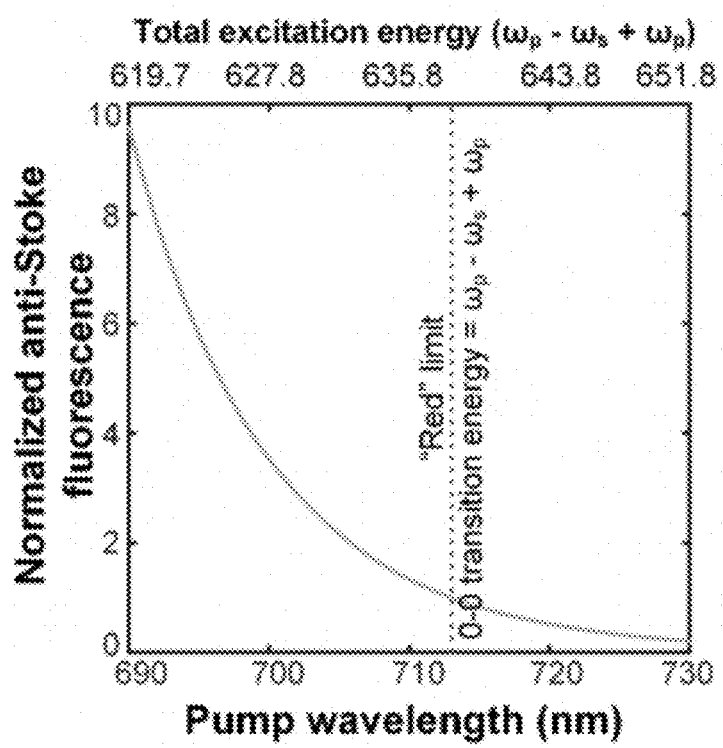
FIG. 23 is an exemplary graph illustrating a model the anti-Stokes fluorescence background as a function of pump beam detuning according to an exemplary embodiment of the present disclosure.

In SREF excitation, the energy of Stokes beam is generally much smaller than that of the pump beam. Therefore, the anti-Stoke fluorescence background excited by stokes beam is neglectable. But the Stokes beam induced stimulated emission shows quenching effect on pump-beam excited anti-Stoke fluorescence, which however does not change the exponential trend to pump detuning. The tilted SREF spectra of FIG. 2-5 demonstrated this exponential trend. FIG. 23 illustrates the result of this equation with the intensity normalized to the point where the 0-0 transition wavelength equals the SREF total excitation energy.

Instead of determining the absolute values, both models for SREF transition rate and anti-Stokes fluorescence only predict the relative signal size as a function pump detuning. From the measurements it can be known that the SREF signal is about 10% of the anti-Stokes fluorescence background when the SREF total excitation energy $((\omega_p - \omega_s) + \omega_p)$ equals the 0-0 transition wavelength (FIG. 3 *a-c*). With this knowledge from the exemplary measurement, the ratio between SREF signal and the anti-Stokes fluorescence background (see e.g., FIG. 21) can be predicted, which can then help to explain the red and blue limits of critical electronic resonance for SREF experiment.

Figure 24:
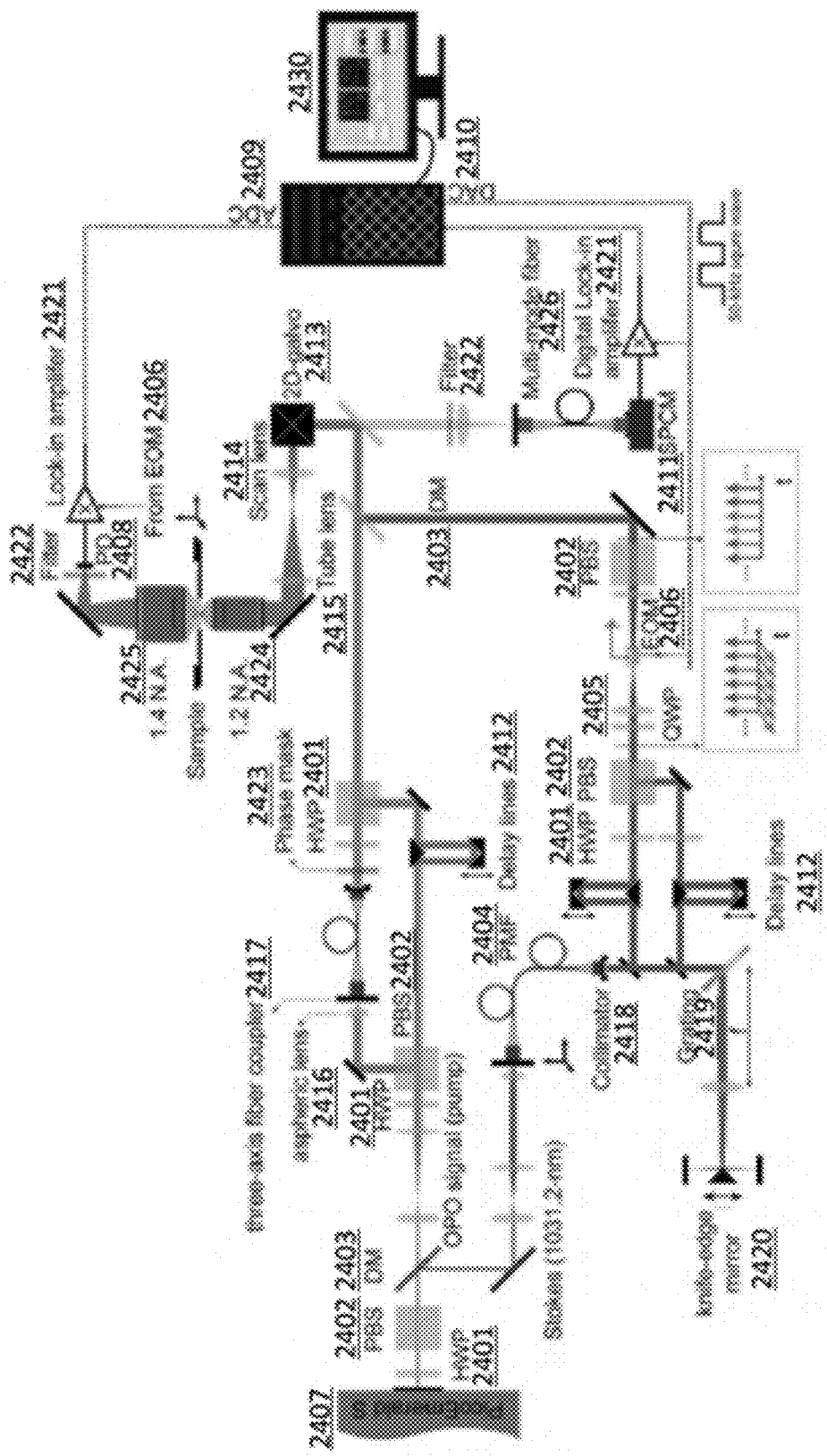
FIG. 24 is an exemplary diagram of a laser microscopy system for single molecule stimulated Raman excited fluorescence and stimulated emission depletion according to an exemplary embodiment of the present disclosure.

FIG. 24 shows an exemplary laser and microscope system 2400 for stimulated Raman excited fluorescence and stimulated emission depletion (STED-SREF) microscopy. In some exemplary embodiments, the system 2400 can include half-wave plates (HWP) 2401; polarized beam splitters (PBS) 2402; dichroic mirrors (DM) 2403; polarization-maintained single mode fiber (PMF) 2404; quarter-wave plates (QWP) 2405; electro-optic modulator (EOM) 2406;

optical parametric oscillator (OPO) 2407; photodiode (PD) 2408; analog-to-digital converter (ADC) 2409; digital-to-analogue converter (DAC) 2410; single photon counting module (SPCM) 2411; delay lines 2412; 2D galvo-scan unit 2413; scan lens 2414; tube lens 2415; aspheric lens 2416; three-axis fiber coupler 2417; collimator 2418; grating 2419; knife-edge mirror 2420; lock-in amplifier 2421; filters 2422; phase mask 2423; numerical aperture (N.A.) objectives 2424 (i.e. 1.2 N.A.) and 2425 (i.e., 1.4 N.A.); multi-mode fiber 2426; and a processor 2430. In system 2400, there are two Stokes beams generated from a 1031.2-nm output (IR beam) of the OPO/laser 2407. The IR beam first passes through the PMF 2404, which expands and split the spectral of the IR beam into two sidebands, with the spectral difference between the two sidebands being about 1 nm. These two sidebands are then separated by the grating 2419 and the knife-edge mirror 2420 into two separated Stokes beams. Then, through the two HWP 2401 and the PBS 2402, the two beams are combined with the corresponding polarizations perpendicular to each other. Then, after passing the combined two Stokes beams through the QWP 2405, the EOM 2406, and the PBS 2402, the two Stokes beams are modulated with a π phase difference. Further, SREF signal excitation with these two Stokes beams can be background-free after being demodulated by the modulation signal of the EOM 2406. In some exemplary embodiments, the OPO signal of the laser 2407 is split into two beams: one is used as the pump beam, while the other is filtered to have perfect zero-order fiber mode by the PMF 2404. This beam can then be transformed into a donut shape by a vortex phase mask 2423 for STED excitation. Further, the donut beam and the pump beam can be combined with the HWP 2401 and the PBS 2402. Further, using the DM 2403, the donut beam, pump beam, and the two modulated Stokes beams can also be combined. The combined four beams are then sent to a standard laser scanning microscope comprised of the 2D-galvanometer 2413 and the scan lens 2414 and tube lens 2415 pair for laser scanning imaging. The excited fluorescence is then filtered by the filter set 2422 and coupled into a SPCM 2411, which is equipped with the multi-mode fiber 2426, for confocal detection. The signal output of the SPCM 2411 is then sent to the lock-in amplifier 2421 for background-free signal demodulation. The delay lines 2412 can be used to keep the four beams temporally overlapped. Further, the power of the four beams can be precisely controlled by the HWP 2401. All signal collection and scanning driving are controlled by the processor/computer 2430.

Figure 25A:
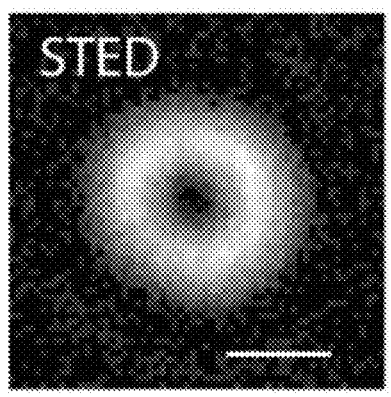
FIGS. 25A to 25C are a set of exemplary images illustrating an alignment of a donut beam of a simulated emission depletion beam according to an exemplary embodiment of the present disclosure.
Figure 25B:
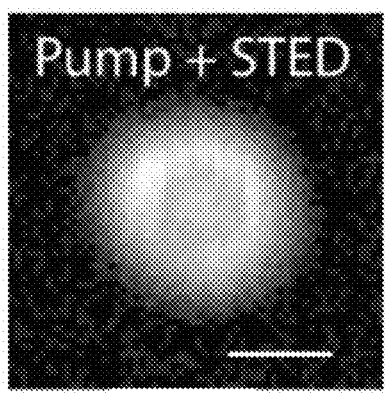
Figure 25C:
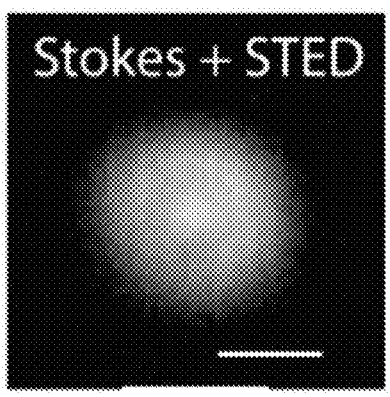

Further, FIG. 25A shows the profile of a donut beam. FIG. 25B shows the overlap between the donut beam and a pump beam. FIG. 25C shows the overlap between the donut beam and a Stokes beam. These figures show that the donut beam, pump beam, and Stokes beam are well-overlapped, and, therefore, can be used for STED-SREF imaging.

Figure 26:
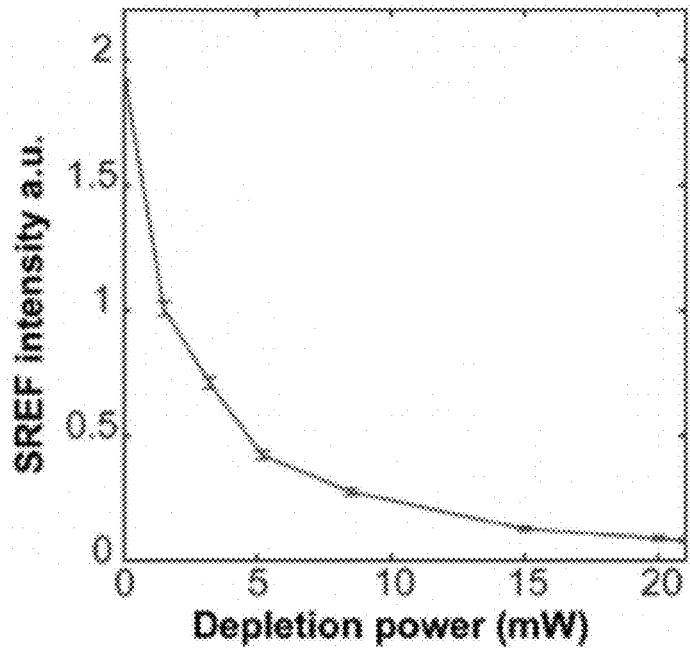
FIG. 26 is an exemplary graph illustrating a depletion/saturation curve of a stimulated Raman excited fluorescence signal according to an exemplary embodiment of the present disclosure.

Further, as depicted in FIG. 26, a pure SREF signal can be efficiently depleted by the depletion beam to less than 10% with 15-mW depletion power. This can be achieved by adding the donut-shape STED beam.

Figure 27A:
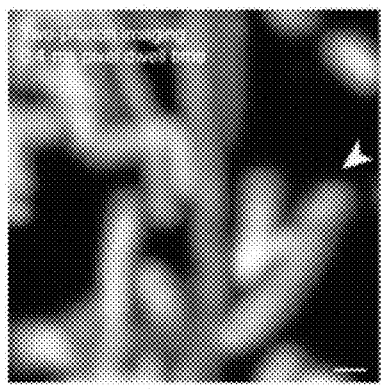
FIGS. 27A to 27C are a set of exemplary images illustrating the combined stimulated Raman excited fluorescence and stimulated emission depletion imaging on Rh800 stained *E. coli* cells according to an exemplary embodiment of the present disclosure.
Figure 27B:
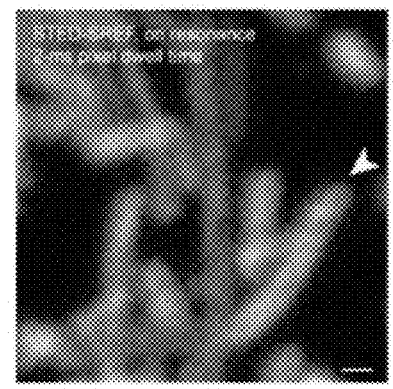
Figure 27C:
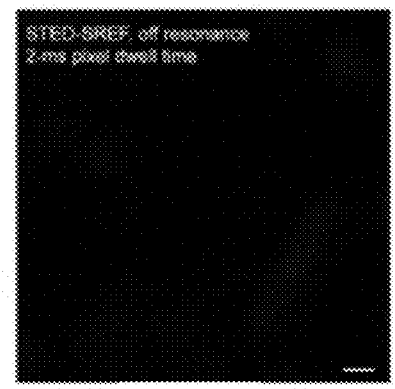

FIG. 27A shows the standard two-photon fluorescence imaging of Rh800 stained *E. coli* cells. FIG. 27B shows the vibrational on-resonance excitation of the stimulated Raman excited fluorescence and stimulated emission depletion imaging of the same sample, on which more details inside the *E. coli* cell can be observed (such as the white arrow indicated region), demonstrating an observed resolution improvement. FIG. 27C shows the vibrational off-resonance excitation of the same sample, which shows no fluorescence signal, demonstrating the high chemical specification of the super-resolution imaging.

Exemplary Fluorescent Compounds

The fluorescent compounds described herein can be used, by themselves, or conjugated to particles, antibodies, and the like, in super-multiplexed imaging and analysis. These compounds extend the current limit of optical super-multiplexing techniques and provide new opportunities in life science, medical diagnostics, and drug discovery.

Exemplary Conjugation to Antibodies and Other Binding Members

Various binding members are suitable for binding to the fluorescent compounds described herein, which can allow the fluorescent compounds to be used in various detections methods described herein.

In some exemplary embodiments, the binding members are selected for their ability to specifically bind to a target of interest, and also to be capable of being attached to a fluorescent compound. Suitable binding members include, for example, an antigen, an antibody, biotin, avidin, streptavidin, anti-biotin, folate, folate-binding protein, IgG, Protein A, Protein G, Protein L, a carbohydrate, lectin, lipid, and a nucleic acid. The binding members also include nucleic acids, including DNA, including genomic DNA and cDNA, RNA, such as siRNA, mRNA, tRNA, tmRNA, ncRNA, rRNA, shRNA ribozymes, and the like, riboswitches, aptamers, primers, probes, and artificial nucleic acid analogues, such as peptide nucleic acids, morpholino- and locked nucleic acids, glycol nucleic acids, and threose nucleic acids.

The fluorescent compounds can be bonded to the binding members, for example, by reacting functional groups on the fluorescent compounds and binding members. Those of skill in the art can readily appreciate how to attach a binding member to a functional group present on the fluorescent compounds.

For example, carbamate moieties on a fluorescent compound can be used to conjugate antibodies or peptides. Terminal alkyne groups in the fluorescent compounds can be bonded to aryl/heteroaryl halides, for example, using palladium coupling reactions. Where a halogen is present on a base which is part of a primer or probe, this type of coupling reaction can be used to attach primers or probes directly to a fluorescent compounds. Similarly, this type of chemistry can be used to attach other nucleic acids to the fluorescent compounds. For example, amine, carboxyl, and thiol based crosslinking chemistry, such as using NHS ester and maleimide groups, or click chemistry can be used to conjugate peptides, proteins and nucleic acids to fluorescent compounds.

Exemplary Conjugation to Moieties which Target Organelles

The fluorescent compounds can be functionalized into live-cell, organelle-specific imaging probes. An appropriate linker or functional group can be used to attach different targeting groups to the fluorescent compounds.

The following are non-limiting examples of moieties which target organelles. Triphenylphosphonium ("TPP+") is a motif with high affinity to mitochondrial matrix due to the positive charge. Other positively charged motifs can be used, which can also target the mitochondrial matrix.

The lysosome lumen is acidic, and basic motifs can be protonated and trapped inside lysosomes. Mono and dialkylamines are representative motifs which can be used. Examples include, but are not limited to, dimethylamine, diethylamine, dipropylamine, di-isopropylamine, dibutylamine, and morpholine groups.

The plasma membrane includes anionic phosphate headgroups. Cationic diammonium groups can be used to stain the plasma membrane through interaction with these anionic phosphate headgroups.

An ethylene glycol chain with different terminal groups, such as a pentafluorobenzamide group, or a glibenclamide group can be used to target the endoplasmic reticulum.

Lipid droplets are known to interact with fatty acids, so carboxylic acid and/or carboxylate-terminated fatty acid chains (e.g., typically between 8 and 21 carbons in length) can be attached either directly to the end of the fluorescent compounds, or to an aryl end cap. These fatty acid chains mimic fatty acids, allowing fluorescent compounds with this functionality to function as probes which can be efficiently incorporated into lipid droplets.

Exemplary Polymers/Dendrimers Grafted with Fluorescent Compounds

To further enhance the signal intensity, next-generation fluorescent compound probes for super-multiplexed detection can be developed through multiple nanoscale signal amplification approaches.

Dendrimers and polymeric nanostructures such as bottle-brush and star-shaped nanomaterials can be grafted with multiple fluorescent compounds for topological signal amplification. For example, dendrimers are prepared in step-wise fashion, using divergent methods, convergent methods, and click methods. In divergent synthesis, the dendrimer is assembled from a multifunctional core, which is extended outward by a series of reactions, commonly a Michael reaction. In convergent synthesis, dendrimers are built from small molecules that end up at the surface of a sphere, and reactions proceed inward, building inward, and are eventually attached to a core. This method tends to provide dendrimers which are more monodisperse than when divergent synthesis is used, but the dendrimers also tend to be smaller. Click chemistry uses, for example, Diels-Alder reactions, thiol-ene and thiol-yne reactions, and azide-alkyne reactions.

Exemplary Attachment to Microparticles/Nanoparticles

In some exemplary embodiments of the present disclosure, fluorescent compounds can be conjugated to nanoparticles and/or microparticles (e.g., such as nanoparticles, polystyrene beads, gold particles, and the like).

Where the nano or microparticles include reactive functional groups, fluorescent compounds can be prepared which include functional groups which react with the functional groups on the nano or microparticles, and a covalent attachment between the nano or microparticles and the fluorescent compounds can be formed. However, one limitation of this approach is that the amount of fluorescent compounds attached to the particles can vary depending on the number of groups on each particle, which itself can vary, for example, depending on the particle size, and the percentage of such groups which is successfully coupled with the fluorescent compounds.

In some exemplary embodiments of the present disclosure, it can be desired to provide particles with a relatively consistent amount of the fluorescent compounds labels. One way to produce particles with a relatively constant particle size, and with a relatively consistent amount of fluorescent compounds conjugated to the particles, is to use dendrimers. The dendrimers can include a known quantity of the fluorescent compounds, by virtue of the active functional groups at the terminus on the dendrimers.

The fluorescent compounds can be conjugated to nanoparticles/microparticles by chemical means. A range of functionalized groups can be present on the fluorescent compounds, and used to attach them to the nanoparticles/microparticles, including low molecular weight ligands (Chen et al., Ligand conjugated low-density lipoprotein nanoparticles for enhanced optical cancer imaging in vivo, J. Am. Chem. Soc., 129 (18) (2007), pp. 5798-5799), peptides (Mu, et al., Anti-HER2/neu peptide-conjugated iron oxide nanoparticles for targeted delivery of paclitaxel to breast cancer cells, Nanoscale (2015), proteins (Meziani, and Sun, Protein-conjugated nanoparticles from rapid expansion of supercritical fluid solution into aqueous solution, J. Am. Chem. Soc., 125 (26) (2003), pp. 8015-8018, polysaccharides (Lemarchand, et al., Polysaccharide-decorated nanoparticles, Eur. J. Pharm. Biopharm., 58 (2) (2004), pp. 327-341), polyunsaturated and saturated fatty acids (Fahmy, et al., Surface modification of biodegradable polyesters with fatty acid conjugates for improved drug targeting, Biomaterials, 26 (28) (2005), pp. 5727-5736) DNA (Csáki, et al., The optical detection of individual DNA-conjugated gold nanoparticle labels after metal enhancement, Nanotechnology, 14 (12) (2003), p. 1262), antibodies (Arruebo, ET AL., Antibody-conjugated nanoparticles for biomedical applications, J. Nanomater., 2009 (2009), p. 37), plasmids, and siRNA.

The two main strategies for conjugating proteins/peptides/antibodies to gold nanoparticles are classic passive adsorption, and covalent conjugation.

Exemplary Libraries of Fluorescent Compounds

In an exemplary embodiment, the fluorescent compounds described herein are present in libraries, for example, libraries with between 2 and 50,000 members, more typically, between 2 and about 200 members, still more typically, between 2 and about 100 members, and even more typically, between about 4 and about 50 members.

In some aspects of such exemplary embodiment, the libraries of fluorescent compounds comprise a plurality of fluorescent compounds linked to antibodies, which antibodies are specific for different types of cells, including stem cells, cancer cells, bacteria, viruses, or fungi.

In other aspects of such exemplary embodiment, the libraries comprise a plurality of fluorescent compounds linked to nucleic acids, which are specific for different types of cells, including stem cells, cancer cells, bacteria, viruses, or fungi.

In still other aspects of such exemplary embodiment, the libraries comprise a plurality of fluorescent compounds linked to primers, which primers can be used in genetic screening applications to identify the presence of single nucleotide polymorphisms, such as cytochrome P450 mutations, to identify types of mutations present in viruses, such as HIV, which can be indicative of drug resistance, or in cancer cells, such as HER2 and other mutations, which can be useful in determining an appropriate course of treatment for a patient. In this aspect, the use of fluorescent labels replaces the use of fluorescent labels in PCR techniques, and the use of Raman spectroscopy replaces the detection of fluorescence. Because multiple "barcoded" primers can be screened for at once, all with distinguishable signals, this allows for the simultaneous detection of multiple mutations in a single scan.

In various aspects of such exemplary embodiments of the present disclosure, the individual fluorescent compounds can include structural differences, such as isotopic labeling and functionalization, so as to provide a plurality of fluorescent compounds, which provide signals in Raman spectroscopy with minimal "crosstalk" with respect to each other.

The fluorescent compounds described herein can optionally include isotopically-labeled compounds, which are identical to those recited in the various formulae and structures presented herein, but for the fact that one or more atoms are replaced by an atom having an atomic mass or mass number different from the atomic mass or mass number usually found in nature.

In other embodiments are examples of isotopes that are incorporated into the present compounds including isotopes of hydrogen, carbon, nitrogen, oxygen, fluorine and chlorine, such as, for example, $^2H$, $^3H$, $^{11}C$, $^{13}C$, $^{14}C$, $^{15}N$, $^{18}O$, $^{17}O$, $^{35}S$, $^{18}F$, $^{36}Cl$, respectively.

Isotopically-labeled compounds, for example those into which isotopes such as $^{13}C$ or $^2H$ are incorporated, are useful in drug and/or substrate tissue distribution assays.

When such is desired, a $^{13}C$, $^2H$ or $^3H$ label can be present on one or more individual fluorescent compounds. In some exemplary embodiments, substitution with isotopes such as deuterium, i.e., $^2H$, can afford certain advantages, resulting from greater metabolic stability, such as, for example, increased in vivo half-life.

It is expected that single or multiple replacement of hydrogen with deuterium (e.g., carbon-hydrogen bonds to carbon-deuterium bond) at site(s) of metabolism will slow down the rate of metabolism. This can provide the compounds a relatively longer half-life, and slower clearance from the body. Methods for incorporating deuterium into organic derivatives are well known to those of skill in the art. Representative methods are disclosed in *Angew. Chem. In. Ed. Engl.* 2007, 46, 7744-7765. Accordingly, using these techniques, one can provide one or more deuterium atoms in the fluorescent compounds.

Where it is desirable to provide substitution on aryl rings present in the fluorescent compounds, electrophilic aromatic substitution can be used to provide certain desired functionality. For example, alkyl, aryl, heteroaryl, alkaryl, arylalkyl, alkenyl, alkynyl, and acyl groups can be added using Friedel-Crafts alkylation/arylation/acylation reactions. Other electrophilic aromatic substitution reactions can be used, for example, to provide halogens, such as by forming chloronium or bromonium ions in situ and reacting them with the aromatic ring, or by forming sulfonium or nitronium ions to provide sulfonyl or nitro groups.

Friedel Crafts alkylation is conducted using an appropriate halo-alkyl moiety, and a Lewis acid. The alkyl moiety forms a carbocation, and electrons from the aryl ring form a bond with the carbocation, placing a positive charge on the aryl ring. The aryl ring then loses a proton. Alkyl and alkaryl moieties (e.g., benzyl moieties) can be added in this fashion.

Friedel Crafts acylation is similar, but uses an acid halide, such as an acid chloride, to place a ketone moiety on the ring. The acid halide can be an alkyl acid, such as acetic acid, propionic acid, butyric acid, and the like, or can be an aromatic acid, such as benzoic acid, p-toluic acid, and the like.

Friedel Crafts arylation (e.g., also known as the Scholl reaction) is a coupling reaction with two aryl rings, catalyzed by a Lewis acid. The proton lost during the coupling reaction serves as an additional catalyst. Typical Reagents are iron(III) chloride in dichloromethane, copper(II) chloride, PIFA and boron trifluoride etherate in dichloromethane, Molybdenum(V) chloride and lead tetraacetate with BF3 in acetonitrile.

Electrophilic aromatic substitution can also be carried out on certain 5-membered heteroaryl rings. Unsubstituted pyrrole, furan, and thiophene can be converted into substituted aromatic heterocycles through electrophilic substitution. In this respect, furan, thiophene, pyrrole and their derivatives are all highly activated compared to benzene. These compounds all contain an atom with an unshared pair of electrons (e.g., oxygen, sulphur, or nitrogen) as a member of the aromatic ring, which substantially increases the stability of the cationic intermediate. As with benzene rings, these substitutions take place by an initial electrophile addition, followed by a proton loss from the "onium" intermediate to regenerate the aromatic ring. The aromatic five-membered heterocycles all undergo electrophilic substitution, with a general reactivity order: pyrrole>>furan>thiophene>benzene. Substitution is typically at the 2-position. Examples of electrophilic substitutions to pyrrole are the Pictet-Spengler reaction and the Bischler-Napieralski reaction.

Additionally, substituted five-membered-ring heteroaryls can also be synthesized through the cyclization of 1,4-diketones in combination with ammonia, amines, phosphorus pentoxide, or phosphorus pentasulfide. The ring-closure is preceded by dehydration (e.g., condensation), which then yields the two double bonds and, thus, the aromatic pi system. The formation of the energetically favored aromatic system is one of the driving forces of the reaction. Functional groups present on the 1,4-diketones or amines are then incorporated into the heteroaryl rings.

The scattering wavelength (e.g., Raman frequencies) of the fluorescent compounds can vary depending on a number of factors, including the presence or absence of deuterium or $^{13}C$ labeling and the presence of, type of, and substitution present on the aromatic rings, and the like. For example, electron donating and electron withdrawing groups on aryl/heteroaryl rings can alter the Raman frequencies of the fluorescent compounds relative to unsubstituted aryl/heteroaryl rings.

Those of skill in the art understand what functional groups is electron donating and electron withdrawing. Representative electron donating groups include, but are not limited to, phenol/phenoxide, tertiary amines, secondary amines, primary amine, ethers, alkyl groups, aryl groups, and vinyl groups. Representative electron withdrawing groups include, but are not limited to, triflates, nosylates, brosylates, tosylates, trihalides, such as —CF3 and —CCl3, nitriles, sulfonates, nitro groups, ammonium salts, quaternary ammonium salts, aldehydes, ketones, carboxylic acids, acyl halides, such as acyl chlorides, esters, amides, and halides.

Methods of Identifying Biological Particles of Interest

In some exemplary embodiments, antibodies, peptides, nucleic acids, and other materials which bind to biological particles of interest (e.g., binding members) can be labeled with one or more fluorescent compounds as described herein, and used to determine the presence or absence of a biological particle of interest.

In some aspects of such exemplary embodiment, the methods are used to determine whether or not a biological particle of interest, such as a cancer cell, stem cell, immune cell, neuron, glia, bacteria, virus, or fungi is present or absent in a biological sample taken from a patient.

Representative biological samples include, but are not limited to, whole blood, blood products, such as plasma or serum, cerebral spinal fluid, urine, seminal fluid, saliva, nipple aspirate, lymph, fine needle aspirate, water, cerebrospinal fluid, ascites, pleural fluid, and synovial fluid.

Representative biological particles include, but are not limited to, stem cells, cancer cells, red blood cells, white blood cells, granulocytes, platelets, monocytes, neutrophils, lymphocytes, bacteria, viruses, and fungi.

In an exemplary embodiment, antibodies, nucleic acids or other materials which bind to biological particles of interest (e.g., binding particles) are conjugated to one or more fluorescent compounds as described herein to form fluorescent compound-labeled antibodies, nucleic acids and the like.

A biological sample from a patient can then be incubated with the fluorescent compound-labeled antibodies, nucleic acids, and the like. If the biological sample includes a biological particle of interest, it will form a conjugate with the fluorescent compound-labeled antibody, nucleic acid, and the like.

Conjugate formation (and, thus, the presence of the biological particle of interest) can be confirmed by identifying the presence of a fluorescent compound-labeled antibody, nucleic acid, and the like, on the biological particle.

This detection can be accomplished using techniques known to those of skill in the art. For example, fluorescent compound-conjugated antibodies, oligonucleotides, and the like can be subjected to super-multiplexed imaging of antigen proteins and nucleic acids in fixed cells and tissues through immunohistochemistry, immunocytometry in situ hybridization, and the like. These techniques can optionally be further combined with sequential immunolabeling and imaging for a higher level of multiplexing, as well as specimen expansion and clearing techniques for super-resolution and deep-tissue super-multiplexed imaging and detection.

Similarly, if labeled with different antibodies, nucleic acids and the like, fluorescent compounds can be used in cell sorting applications, particularly when combined with flow cytometry or other related techniques. For example, normal cells and cancer cells can be easily separated due to the presence of distinct protein types on their respective surfaces. One of ordinary skill will understand how to conjugate antibodies, nucleic acids and the like with the fluorescent compounds described herein, as well as how to label live cells extracted from a patient with antibody-fluorescent compound conjugates, and how to conduct flow cytometry of the labeled sample.

In such exemplary embodiment, the cell sorting technique is similar to fluorescence-activated cell sorting ("FACS"), which is a specialized type of flow cytometry, but rather than using fluorescence, the technique uses Raman spectroscopy, in particular, SREF and/or SRAF, to identify cells with fluorescent labels.

Similarly, bacteria, viruses, and fungi are known to have various targets, such as receptors, on their respective surfaces. These targets can be conjugated with various antibodies, nucleic acids, and like binding members.

In an exemplary embodiment, a biological sample is incubated with one or more fluorescent compound-labeled antibodies, nucleic acids, and the like, which specifically bind to cancer cells, stem cells, bacteria, fungi, or viruses, and if the biological sample includes a cancer cell, stem cell, bacteria, fungi, or virus which binds to the labeled antibodies, nucleic acids and the like, a conjugate will form. This conjugate will have an identifiable fluorescent label, which can be detected, for example, using SREF and/or SRAF.

Using flow cytometry, or similar techniques where biological particles flow past a light source, one can determine the presence of absence of conjugates between the biological particles of interest and the fluorescent compound-labeled antibodies, nucleic acids, and the like, by detecting the presence of a specific fluorescent compound.

That is, if a biological sample is subjected to flow cytometry, the particles will flow through a tube and can pass by a source of radiation. Where the particles are conjugated with a particular antibody/nucleic acid, which in turn is conjugated to a particular fluorescent compound, the presence of the fluorescent compound (e.g., as detected using the source of radiation) in the conjugate means that the biological particle associated with this antibody/nucleic acid is present in the biological sample. When a particular fluorescent compound is not detected, this means that the biological particle associated with this antibody/nucleic acid is not present in the biological sample.

Exemplary libraries of fluorescent compound-labeled antibodies, nucleic acids and the like can be prepared, for example, containing a plurality of different antibodies, nucleic acids, and the like, which can bind specifically to a number of biological particles if such are present in the biological sample. By using a variety of fluorescent compounds, each of which is bound to a different antibody/nucleic acid, one can identify the presence or absence of specific types of biological particles in a biological sample.

This exemplary technique can facilitate a rapid detection not only of a bacterial, viral, or fungal infection, but can also allow for the rapid determination of the specific type of bacteria, virus, or fungi.

This exemplary technique can also be used to rapidly detect the presence or absence of cancer cells. In an exemplary embodiment, following surgical removal of a tumor, samples of tissues, for example, tissues taken from near the surgical site, can be evaluated for the presence or absence of cancer, to ensure that wide enough margins can be taken to ensure the entire tumor can be removed.

In some exemplary embodiments, the fluorescent compounds can be used to image cultured live cells. The methods involve culturing live cells, which can be derived from an in vitro tissue cell culture of interest, extracted from an in vivo subject of interest, seeding the cultured live cells in wells, and labeling each well with a single color of fluorescent compounds in culture media, wherein the fluorescent compounds comprise one or more colors. The labeled cultured live cells are then added to an imaging chamber for SREF and/or SRAF analysis, and the cells are imaged, wherein each cell is maintained with a single color during the imaging period.

In other exemplary embodiments of the present disclosure, the fluorescent compounds are used to image organelles in cultured live cells. The methods involve culturing live cells, which can be derived from an in vitro tissue cell culture of interest or extracted from an in vivo subject of interest, incubating the cultured live cells with fluorescent compounds in culture media, wherein the fluorescent compounds each comprise a specific organelle-targeted probe, labeling the cultured live cells with the fluorescent compounds, and imaging the cells using stimulated Raman microscopy. In one aspect of such exemplary embodiment, the cultured live cells are seeded in a well before they are incubated and labeled with the fluorescent compounds, and then the cells are labeled with the fluorescent compounds, wherein the fluorescent compounds each comprise a specific organelle-targeted probe, which probes specifically target different organelles. Representative organelle-targeted probes include probes which target the plasma membrane, endoplasmic reticulum ("ER"), Golgi, mitochondria, lipid droplets, lysosome, nucleus, and tubulin in the cultured live cells.

In still other exemplary embodiment of the present disclosure, the fluorescent compounds can be used in methods of live-cell tagging using spectral barcoded beads. The methods involve mixing polymeric microbeads, such as polystyrene beads, with spectral barcoded fluorescent compounds, binding the beads with the spectral barcoded fluorescent compounds to form barcoded beads, and culturing live cells, which can be derived from in vitro tissue cell culture of interest, or extracted from an in vivo subject of interest. The barcoded beads are incubated with the cultured live cells in culture media, which labels the cultured live cells with the barcoded beads. The cultured live cells can then be imaged using stimulated Raman microscopy, and the spectral barcodes of the barcoded beads in the whole field of view can be decoded based on hyperspectral SRS images.

In another exemplary embodiment of the present disclosure, the fluorescent compounds can be used to identify a population of cancer cells using flow cytometry, or other methods for sorting/counting cells. The methods involve associating one or more fluorescent compounds with live cells of a subject of interest, wherein the fluorescent compounds are conjugated with antibodies that detect, and bind to, specific cell surface markers of the live cells, and further wherein the antibodies bind to cell surface markers of the live cells. The live cells are positioned in a focused flow stream of a flow cytometer; and subjected to SREF and/or SRAF analysis. Cells that are not cancer cells are not linked to the fluorescent compound-conjugated antibodies, whereas cancer cells are linked to the antibodies. The cancer cells are detected based on the SREF and/or SRAF spectra produced by the fluorescent compounds conjugated with antibodies.

In another exemplary embodiment, the fluorescent compounds are used in methods of flow cytometry-based high throughput medical diagnosis. The methods involve associating one or more fluorescent compounds, in some aspects, conjugated to a solid support, such as a nano- or microparticle, and which may be conjugated to one or more antibodies, nucleic acids or other binding molecules which form a complex with specific biological markers on specific subpopulations of cells which are indicative of a particular disease state, with live cells of a subject of interest, wherein specific subpopulations of the live cells are specifically associated with distinct sets of fluorescent compounds. The live cells are positioned in a flow cytometer, and the live cells are illuminated within the focused flow stream of the flow cytometer, wherein the fluorescent compounds are exposed to the illumination. Scattered light from the live cells is detected using SREF and/or SRAF, and analyzed to identify individual groups of live cells. An analysis of the SREF and/or SRAF spectra can provide a diagnosis of a specific disease, based on the binding of the fluorescent compounds to specific subpopulations of cells, if present in the cell population. When bound to the fluorescent compounds, the members of the specific subpopulations of cells will scatter light at specific wavelengths that unbound cells will not scatter. Thus, the presence of cells within one or more sub-populations can be detected, and correlated with a particular disease state.

For example, where it is unclear whether a patient has a bacterial or viral infection, fluorescent compounds can be selected which bind to bacteria, preferably to one or more specific bacteria, and if a bacteria, ideally a specific type of bacteria, is detected, appropriate antibiotics can be administered, and if a bacteria is not detected, antibiotic administration can be avoided. This can be particularly advantageous where a patient has sepsis or bacterial meningitis, and real-time assays can be particularly preferred over typical cell culture-based approaches, which often cause delays in patients receiving appropriate care. Another exemplary embodiment involves methods of cell sorting. The methods involve associating fluorescent compounds with live cells of a subject of interest, wherein specific subpopulations of the live cells are specifically associated with distinct sets of fluorescent compounds. The specific subpopulations of live cells are sorted using spectroscopy, based on the specific association of the subpopulation of cells with a distinct set of fluorescent compounds. Rather than just using fluorescence to identify the cells, SREF and/or SRAF can be used. When libraries of fluorescent compounds are used, each of which binds to a different subpopulation of cells, and each of which has a different "spectral barcode," a single biological sample can be screened for multiple subpopulations of cell types.

In another exemplary embodiment of the present disclosure, the fluorescent compounds can be used to produce a cell atlas in vivo. The exemplary methods involve associating fluorescent compounds with live cells of a subject of interest, wherein specific subpopulations of the live cells are specifically associated with distinct sets of fluorescent compounds; mapping relationships between the specific subpopulations of live cells, wherein the specific subpopulations of live cells are distinguishable by their specific association with a distinct set of fluorescent compounds.

One example of how this exemplary technique can be used is in the screening for meningitis, primarily to determine whether the meningitis is bacterial or viral, and where it is bacterial, which bacteria is present. A sample of cerebrospinal fluid ("CSF") can be obtained from a patient, and incubated with fluorescent compound-labeled antibodies/nucleic acids which bind to those bacteria or viruses responsible for meningitis. The sample can then be subjected to flow cytometry or other techniques where biological particles flow past a source of radiation. Where SREF and/or SRAF indicates that a biological particle is present or absent (e.g., by virtue of the biological particle being bound to a fluorescent compound-labeled antibody/nucleic acid), appropriate therapy can be prescribed. Where the meningitis is viral, administration of antibiotics can be avoided. Where the meningitis is bacterial, an appropriate antibiotic can be administered. This technique can also be used to rapidly diagnose sepsis. The large library of fluorescent compounds can be used for parallel detection of different targets, such as different types of meningitis, allowing fast screening with reduced wait time over typical ELISA assays requiring secondary enzymatic reactions.

In some exemplary embodiments of the present disclosure, the fluorescent compounds can be conjugated not only to binding materials such as antibodies, nucleic acids and the like, but also to nanoparticle or microparticles, such as gold particles, polystyrene beads, and the like. In other embodiments, the fluorescent compounds are conjugated to metal nanowires. In still other embodiments, the fluorescent compounds are not conjugated to any nanoparticles or microparticles. By conjugating to micro/nanoparticles, higher detection sensitivity and more spectral barcodes can be achieved with enriched fluorescent compounds and combinatory labeling in micro/nanoparticles.

In some aspects of these exemplary embodiments of the present disclosure, polymers which bind to a binding agent, including proteins and peptides, such as antibodies and antibody fragments, nucleic acids, including primers and probes, and other binding agents as described herein, are also linked, whether through binding or physical entrapment, to a plurality of fluorescent compounds as described herein. In addition to binding to the binding agent, the polymers can also be covalently linked to a plurality of fluorescent compounds as described herein, or the polymers can be formed into nanoparticles or microparticles, and fluorescent compounds are physically entrapped into the nanoparticles or microparticles during their formation.

Representative ways to covalently attach a plurality of fluorescent compounds to a polymer, which can be a graft, comb, or other suitable polymer, include providing a polymer with a plurality of reactive groups, and a plurality of fluorescent compounds with a plurality of functional groups capable of participating in coupling reactions with the reactive groups on the polymer, and performing a coupling reaction to couple the polymer to the plurality of fluorescent compounds. It can be difficult to control the amount of fluorescent compounds which are added to a particular polymer, particularly if the polymer is a polydisperse polymer. In those embodiments where control of the amount of compound attached to a polymer, it can be preferred to use a dendrimer, or a monomer with a low degree of polydispersity.

Representative ways to physically entrap the fluorescent compounds into nano- and/or microparticles include, but are not limited to, having the fluorescent compounds present during a polymerization reaction which convert monomers to polymer particles; spray drying conditions which convert polymer solutions to polymer nano- or microparticles; and precipitation-based approaches, where a polymer and one or more fluorescent compounds as described herein are dissolved in a solution. The polymer and fluorescent compounds are precipitated from solution, ideally while the solution is rapidly stirred, and the precipitation can be accomplished, for example, by removing a solvent or co-solvent, adding a non-solvent, adjusting the pH, adjusting the ionic strength of the solution, and the like. This causes the polymer and the one or more fluorescent compounds to precipitate out of solution and form nano- or microparticles. These techniques for forming nano- and microparticles are well known to those of skill in the art.

In still other exemplary embodiments, the fluorescent compounds are not conjugated to nanoparticles or microparticles, but the signal is amplified using various biological techniques, such as polymerase amplification when a target being screened is genetic material, and Hybridization Chain Reaction ("HCR") when the target is a peptide or protein. In some aspects of these exemplary embodiments, the screens can be conducted in a high-throughput manner by using chip-based screening methods and/or multiplexed polymerase amplification or HCR techniques. These exemplary embodiments are discussed in more detail below.

Exemplary Hybridization/Amplification Procedures

In some exemplary cases, a target, such as a target nucleic acid, a protein, or a peptide, is present in a sample at a low enough concentration that there may be insufficient binding of the fluorescent compounds to enable facile detection. Representative target nucleic acids include nucleic acid sequences, epigenetic modifications, single nucleotide polymorphisms, deletions, and additions, and representative proteins and/or peptides include antigens, proteins with post-translational modifications, as well as primary antibodies which bind to antigens.

In such exemplary cases, it may be useful to amplify the signal. There are a variety of biological techniques useful for signal amplification. Some biological techniques, such as polymerase amplification, are specific for amplification related to nucleic acid targets. Other biological techniques, such as hybridization chain reaction, are specific for amplification related to protein and peptide targets.

In molecular biology, hybridization, where single-stranded deoxyribonucleic acid ("DNA") or ribonucleic acid ("RNA") molecules anneal to complementary DNA or RNA, can be used to amplify signals obtained from genetic screening assays. Though a double-stranded DNA sequence is generally stable under physiological conditions, changing these conditions in the laboratory (e.g., generally by raising the surrounding temperature) will cause the molecules to separate into single strands. These strands are complementary to each other but may also be complementary to other sequences present in their surroundings. Lowering the surrounding temperature allows the single-stranded molecules to anneal or "hybridize" to each other.

Hybridization, as used herein, can include molecular biology techniques such as Southern blots, Northern blots, the polymerase chain reaction ("PCR"), and other conventional approaches to DNA sequencing.

A real-time polymerase chain reaction (e.g., Real-Time PCR), also known as quantitative polymerase chain reaction ("qPCR"), monitors the amplification of a targeted DNA molecule during a PCR in real-time, and not at its end, as in conventional PCR. In some aspects of this exemplary embodiment, real-time PCR can be used quantitatively (e.g., quantitative real-time PCR), and in others, semi-quantitatively, i.e. above/below a certain amount of DNA molecules (e.g., semi quantitative real-time PCR).

Representative common methods for detecting PCR products in real-time PCR include, but are not limited to: (i) non-specific fluorescent dyes that intercalate with any double-stranded DNA, and (ii) sequence-specific DNA probes consisting of oligonucleotides that are labeled with a fluorescent reporter which permits detection only after hybridization of the probe with its complementary sequence.

Conventional multiplex polymerase chain reaction (e.g., Multiplex PCR) involves using the polymerase chain reaction to amplify several different DNA sequences simultaneously (e.g., as if performing many separate PCR reactions all together in one reaction). This process amplifies DNA in samples using multiple primers, and a temperature-mediated DNA polymerase, in a thermal cycler. In some aspects of this exemplary embodiment, the sequencing is performed in a multiplexed manner.

Multiplex-PCR can use multiple primer sets within a single PCR mixture to produce amplicons of varying sizes, which are specific to different DNA sequences. By targeting multiple sequences at once, additional information may be gained from a single test run that otherwise would require several runs. Annealing temperatures for each of the primer sets must be optimized to work correctly within a single reaction. In some exemplary embodiments, particularly those where amplicon sizes overlap, different amplicons can be differentiated and visualized using labeled primers, each of which is labeled with a different fluorescent compound described herein. One difference between this approach and conventional multiplex-PCR is that conventional multiplex-PCR uses fluorescent dyes, but looks at fluorescence rather than a combination of fluorescence and Raman spectroscopy, as described herein. In this exemplary embodiment, one or more primers in a primer set are labeled with a fluorescent compound label. In contrast to fluorescent labels, where "cross-talk" between fluorescent labels minimizes the number of primers which can be used, there can be significantly less cross-talk using the fluorescent compound labels described herein when they are analyzed using SREF and/or SRAF, allowing a greater number of labeled primers to be used multiplex-PCR screens.

In another exemplary embodiment, kits for performing multiplex PCR using one or more primers labeled with a fluorescent compound as described herein are provided. The kits include between two and about fifty primers, such as between two and about twenty primers, one or more of which is labeled with a fluorescent compound as described herein, as well as a DNA polymerase, such as a Taq polymerase. The kits may also include appropriate buffers, which can optionally also include optimized salt concentrations for PCR amplification. Representative salts which can be used include magnesium salts, such as magnesium chloride, and potassium salts, such as potassium chloride, and/or ammonium salts, such as ammonium sulfate. PCR additives that facilitate amplification of difficult templates by modifying the melting behavior of DNA can also be present. DMSO is another commonly used additive in PCR kits. Such additives are well known to those of skill in the art.

Representative applications for performing multiplex PCR using the fluorescent compound-labeled primers, and multiplex PCR kits described herein, include detection of cancer, typing and analysis of transgenic organisms, amplification and analysis of microsatellites, typing and detection of bacteria and viruses, and amplification of multiple DNA regions for analyzing single nucleotide polymorphisms ("SNPs"), deletions, such as single feature polymorphisms (e.g., SFP-InDel (deletions), repeats, and epigenetic modifications. Multiplex PCR using the reagents described herein can be used to discover novel SNPs, and detect known SNPs.

In use, where a primer binds to a target nucleic acid of interest, for example, indicating that a SNP is present in a biological sample, the presence of the primer binding can be determined by the presence of a spectral peak associated with a specific fluorescent compound label, The absence of the primer binding can be determined by the absence of this Raman spectral peak. Thus, one can determine whether or not a target nucleic acid of interest is present by incubating the primer with the target nucleic acid, forming an amplicon if the primer binds to the target nucleic acid, and detecting the label on the amplicon, if present, using SREF and/or SRAF. Where multiple primers are used, this technique can be used to simultaneously determine the presence or absence of multiple target nucleic acids. In some aspects of this exemplary embodiment, the number of primers coupled to a fluorescent compound of Formula I is between 2 and 100.

Fluorescence in situ hybridization ("FISH") is a laboratory method used to detect and locate a DNA sequence, often on a particular chromosome. In one exemplary embodiment, detection of one or more of the fluorescent labels using fluorescence alone is replaced with detection using SREF and/or SRAF.

Where the target is a protein or peptide, one can use techniques such as Hybridization Chain Reaction ("HCR") amplification to amplify the signal.

Hybridization chain reaction amplifications can use metastable nucleic acid monomers which self-assemble upon exposure to an initiator, such as a target analyte, as a way to amplify a signal so as to detect an analyte in a sample. The sample can be contacted with a first metastable monomer comprising an initiator complement region and a second metastable monomer comprising a region that is complementary to a portion of the first monomer. Representative monomers include, for example, hairpin nucleic acid structures comprising a loop region and a duplex region.

The first and second monomers polymerize in the presence of an initiator. Preferably, hybridization of the initiator to the initiator complement region of the first monomer initiates polymerization. Polymerization continues until the supply of one of the monomers is exhausted. The identification of polymers comprising the first and second monomers is indicative of the presence of the analyte in the sample. While polymers may be identified, for example, by gel electrophoresis, the presence of the fluorescent compound dye enables one to detect the polymers using SREF and/or SRAF.

The initiator can be a nucleic acid. In some exemplary embodiments, the analyte comprises the initiator. In other embodiments the sample can additionally be contacted with an initiation trigger. The initiation trigger can include the initiator and a binding molecule, such as an aptamer, that is able to specifically recognize the analyte of interest. The initiator can hybridize to the first monomer and trigger polymerization when the binding molecule is bound by the analyte. In one embodiment the analyte is a nucleic acid that is associated with a pathogen, such as a bacteria, fungi, or a virus, such as HIV. The sample may be a biological sample from a patient.

In some aspects of this exemplary embodiment, an antigen of interest binds to a primary antibody, and the primary antibody binds to a DNA initiator-conjugated secondary antibody. The DNA initiator-conjugated secondary antibody only forms a complex with the primary antibody if the primary antibody has formed a complex with an antigen of interest. It does not form a complex with the primary antibody if it has not formed a complex with the antigen of interest.

Thus, in one exemplary embodiment, if one obtains a biological sample from a mammal, such as a human, and incubates this sample with a primary antibody which specifically binds to an antigen of interest if the antigen of interest is present in the biological sample, one can form a complex of the primary antibody and the antigen if the antigen is present in the biological sample, but will not form a complex if the antigen is not present in the biological sample. In this exemplary embodiment, the mammal has not developed a primary antibody to the antigen of interest. In other exemplary embodiments, the mammal has already developed a primary antibody to the antigen of interest, so there is no need to incubate the biological sample with a primary antibody.

Whether or not the biological sample included an antigen of interest, but no primary antibody, and the sample can be incubated with a primary antibody to form a complex, or the biological sample already included a complex between a primary antibody and an antigen of interest, one can then add a DNA initiator-conjugated secondary antibody. The DNA initiator-conjugated secondary antibody forms a complex with the primary antibody if the primary antibody has formed a complex with the antigen of interest.

When the secondary antibody forms a complex with a primary antibody, which is indicative of the presence of an antigen of interest in the biological sample, the DNA initiator in the DNA initiator-conjugated secondary antibody can cause polymerization of nucleic acid monomers. Representative nucleic acid monomers include hairpin structures, typically two hairpin structures, at least one of which is labeled with a fluorescent compound. By adding these two hairpin nucleic acid structures, if the DNA initiator-conjugated secondary antibody has formed a complex with the primary antibody, the initiator then starts a chain reaction in which the two hairpins assemble sequentially into a double-stranded amplification polymer, which double-stranded amplification polymer comprises at least one fluorescent compound.

The presence or absence of the double-stranded amplification polymer can then be detected using SREF and/or SRAF, by determining the presence or absence of the at least one fluorescent compound based on its/their known peak(s).

One can then determine the presence or absence of the antigen of interest based on the presence or absence of the known peak(s) associated with the at least one fluorescent compound. That is, the fluorescent compound will only be detected using SREF and/or SRAF if polymerization can be initiated; polymerization will only be initiated if the secondary antibody has bound to the primary antibody, and the secondary antibody will only bind to the primary antibody if the primary antibody is also bound to the antigen of interest. In some aspects of this exemplary embodiment, the HCR amplification reaction is carried out in a multiplex fashion. In some aspects of this exemplary embodiment, the number of nucleic acid monomers coupled to a fluorescent compound, and the number of secondary antibodies, is between 2 and 100.

As described elsewhere herein, suitable initiators can start a chain reaction in which two fluorescent compound-labeled hairpins assemble sequentially into a long double-stranded amplification polymer. Using SREF and/or SRAF to image the fluorescent compound-labeled monomers, such as fluorescent compound-labeled hairpin nucleic acid structures, one can achieve significantly higher signal to noise ratios relative to when fluorescence measurement alone is used.

In still other exemplary embodiments, the presence or absence of an antigen of interest in a biological sample can be determined without the need for amplification. For example, a primary antibody can be used to bind to an antigen in a biological sample, if the antigen is present. By conjugating one or more fluorescent compounds to the primary antibody, either directly, or by binding the antibody and one or more fluorescent compounds to a solid support, one can detect the presence of an antigen of interest by its binding to the (e.g., directly or indirectly) labeled primary antibody, using SREF and/or SRAF.

Similarly, a primary antibody which binds to an antigen, if present in a biological sample, can either be added to the biological sample, or can already be present, in the event the subject from which the biological sample has been derived had been exposed to the antigen, and already developed an antibody response. A secondary antibody, which binds to the primary antibody if the primary antibody has bound to an antigen of interest, can be added. This second antibody can be labeled with one or more fluorescent compounds, either directly, or by binding the antibody and the one or more fluorescent compounds to a solid support. The presence of the antigen can be determined by screening for the presence of the fluorescent compounds which are present on the secondary antibody, which binds to the first antibody, which binds to the antigen. If the antigen is not present, the primary antibody will not be bound to an antigen, so the secondary antibody will not bind to the primary antibody, so there will be no signal to detect that shows the presence of the antigen of interest.

Exemplary Applications Beyond Imaging

The ability to multiplex is beyond imaging. The imaging of fluorescent compounds using SREF and/or SRAF can be applied to informatics by super-multiplexed spectral barcoding, demonstrating optical data storage and identification. In the current era of personalized medicine, bead-based suspension assays hold great promise to achieve high-throughput multiplexed analysis, the core of which is the capacity of distinguishable barcodes for accurate detection.

Multiplexing can be useful in applications beyond imaging. Systems biology and personalized medicine benefit from high-throughput analysis of cells and biomolecules such as antigens and drugs, and the technology often requires distinguishable barcoding on micro-objects such as beads.

Figure 28:
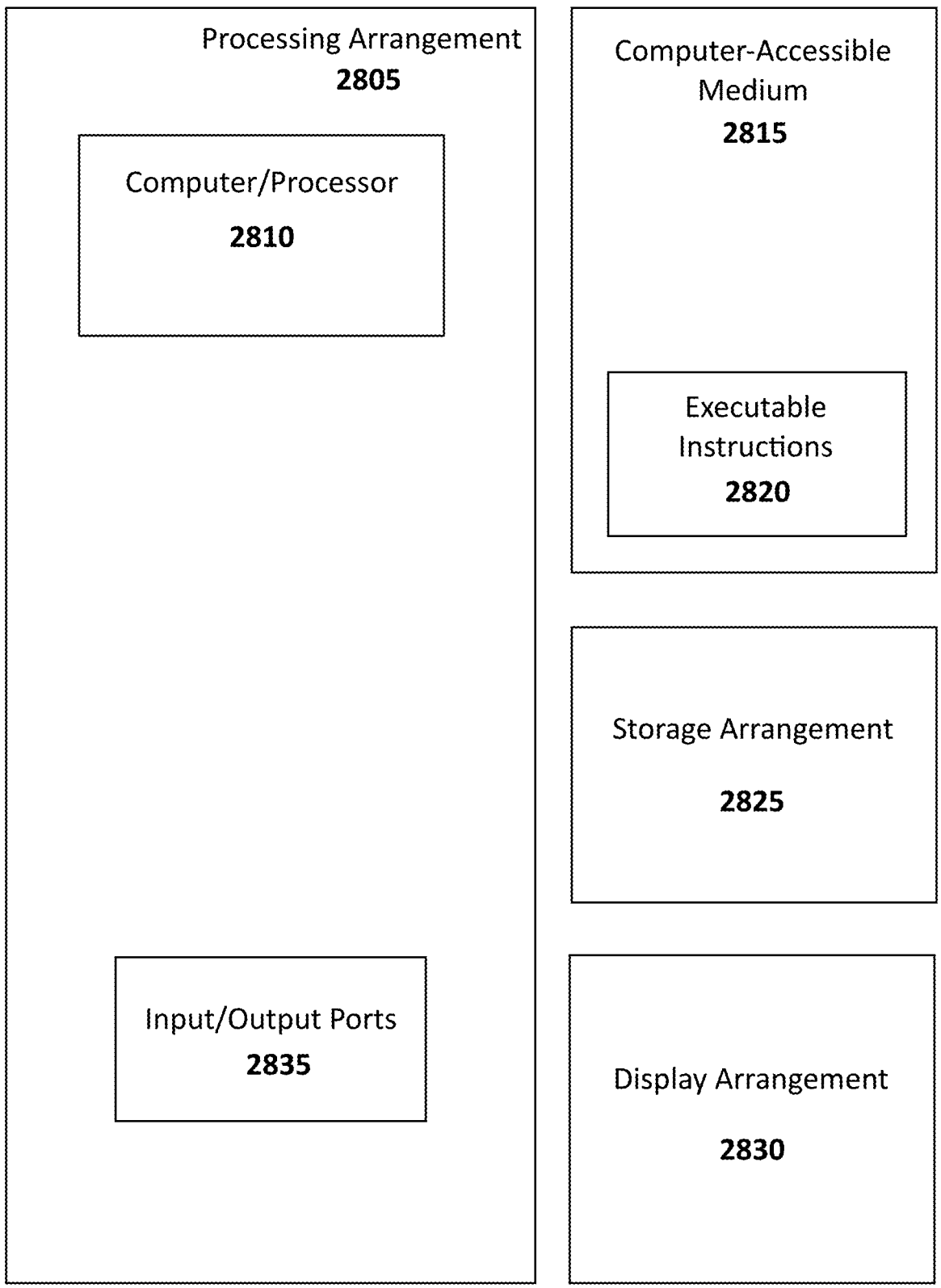
FIG. 28 is an illustration of an exemplary block diagram of an exemplary system in accordance with certain exemplary embodiments of the present disclosure.

FIG. 28 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 2805. Such processing/computing arrangement 2805 can be, for example entirely or a part of, or include, but not limited to, a computer/processor 2810 that can include, for example one or more microprocessors, and use instructions stored on a computer-accessible medium (e.g., RAM, ROM, hard drive, or other storage device).

As shown in FIG. 28, for example a computer-accessible medium 2815 (e.g., as described herein above, a storage device such as a hard disk, floppy disk, memory stick, CD-ROM, RAM, ROM, etc., or a collection thereof) can be provided (e.g., in communication with the processing arrangement 2805). The computer-accessible medium 2815 can contain executable instructions 2820 thereon. In addition or alternatively, a storage arrangement 2825 can be provided separately from the computer-accessible medium 2815, which can provide the instructions to the processing arrangement 2805 so as to configure the processing arrangement to execute certain exemplary procedures, processes, and methods, as described herein above, for example.

Further, the exemplary processing arrangement 2805 can be provided with or include an input/output ports 2835, which can include, for example a wired network, a wireless network, the internet, an intranet, a data collection probe, a sensor, etc. As shown in FIG. 28, the exemplary processing arrangement 2805 can be in communication with an exemplary display arrangement 2830, which, according to certain exemplary embodiments of the present disclosure, can be a touch-screen configured for inputting information to the processing arrangement in addition to outputting information from the processing arrangement, for example. Further, the exemplary display arrangement 2830 and/or a storage arrangement 2825 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties:
1. Lakowicz, J. R. Principles of Fluorescence Spectroscopy. 3 edn, (Springer US, New York, 2007).
2. Moerner, W. & Orrit, M. Illuminating single molecules in condensed matter. Science 283, 1670-1676 (1999).
3. Schatz, G. C. & Ratner, M. A. Quantum Mechanics in Chemistry. (Courier Corporation, New York, 1993).
4. Herzberg, G. Infrared and Raman Spectra of Polyatomic Molecules. Vol. 2 (D. Van Nostrand Company, New York, 1945).
5. Nie, S. & Emory, S. R. Probing single molecules and single nanoparticles by surface-enhanced Raman scattering. Science 275, 1102-1106 (1997).
6. Seilmeier, A., Kaiser, W., Laubereau, A. & Fischer, S. A novel spectroscopy using ultrafast two-pulse excitation of large polyatomic molecules. Chemical Physics Letters 58, 225-229 (1978).
7. Hübner, H.-J., Wörner, M., Kaiser, W. & Seilmeier, A. Subpicosecond vibrational relaxation of skeletal modes in polyatomic molecules. Chemical physics letters 182, 315-320 (1991).
8. Mastron, J. N. & Tokmakoff, A. Two-photon-excited fluorescence-encoded Infrared spectroscopy. The Journal of Physical Chemistry A 120, 9178-9187 (2016).
9. Cheng, J. & Xie, X. Coherent anti-Stokes Raman scattering microscopy: Instrumentation, theory, and applications. Journal of Physical Chemistry B 108, 827-840 (2004).
10. Min, W., Freudiger, C. W., Lu, S. & Xie, X. S. Coherent nonlinear optical imaging: beyond fluorescence microscopy. Annual review of physical chemistry 62, 507-530 (2011).
11. Lee, S., Nguyen, D. & Wright, J. Double resonance excitation of fluorescence by stimulated Raman scattering. Applied Spectroscopy 37, 472-474 (1983).
12. Shim, S., Stuart, C. M. & Mathies, R. A. Resonance Raman cross-sections and vibronic analysis of Rhodamine 6G from broadband stimulated Raman spectroscopy. ChemPhysChem 9, 697-699 (2008).
13. Wei, L. & Min, W. Electronic preresonance stimulated Raman scattering microscopy. The Journal of Physical Chemistry Letters 9, 4294-4301, doi:10.1021/acs.jpclett.8b00204 (2018).
14. Etchegoin, P. G., Le Ru, E. C. & Meyer, M. Evidence of natural isotopic distribution from single-molecule SERS. Journal of the american chemical society 131, 2713-2716 (2009).
15. Min, W. et al. Imaging chromophores with undetectable fluorescence by stimulated emission microscopy. Nature 461, 1105-1109 (2009).
16. Sperber, P., Spangler, W., Meier, B. & Penzkofer, A. Experimental and theoretical investigation of tunable picosecond pulse generation in longitudinally pumped dye laser generators and amplifiers. Optical and quantum electronics 20, 395-431 (1988).
17. Wei, L. et al. Super-multiplex vibrational imaging. Nature 544, 465-470 (2017).
18. Dean, K. M. & Palmer, A. E. Advances in fluorescence labeling strategies for dynamic cellular imaging. Nature chemical biology 10, 512-523 (2014).
19. Kneipp, K. et al. Single molecule detection using surface-enhanced Raman scattering (SERS). Physical review letters 78, 1667-1670 (1997).
20. Sonntag, M. D. et al. Single-molecule tip-enhanced Raman spectroscopy. The Journal of Physical Chemistry C 116, 478-483 (2011).
21. Yampolsky, S. et al. Seeing a single molecule vibrate through time-resolved coherent anti-Stokes Raman scattering. Nature Photonics 8, 650-656 (2014).
22. Zhang, Y. et al. Coherent anti-Stokes Raman scattering with single-molecule sensitivity using a plasmonic Fano resonance. Nature communications 5, 4424 (2014).
23. Mahmoudi, M. et al. Protein-nanoparticle interactions: opportunities and challenges. Chemical reviews 111, 5610-5637 (2011).
24. Macklin, J., Trautman, J., Harris, T. & Brus, L. Imaging and time-resolved spectroscopy of single molecules at an interface. Science 272, 255-258 (1996).
25. Nie, S., Chiu, D. T. & Zare, R. N. Probing individual molecules with confocal fluorescence microscopy. Science 266, 1018-1021 (1994).
26. Kukura, P., Celebrano, M., Renn, A. & Sandoghdar, V. Single-molecule sensitivity in optical absorption at room temperature. The Journal of Physical Chemistry Letters 1, 3323-3327 (2010).
27. Chong, S., Min, W. & Xie, X. S. Ground-state depletion microscopy: detection sensitivity of single-molecule optical absorption at room temperature. The Journal of Physical Chemistry Letters 1, 3316-3322 (2010).
28. Gaiduk, A., Yorulmaz, M., Ruijgrok, P. & Orrit, M. Room-temperature detection of a single molecule's absorption by photothermal contrast. Science 330, 353-356 (2010).
29. Zrimsek, A. et al. Single-molecule chemistry with surface- and tip-enhanced Raman spectroscopy. Chemical reviews 117, 7583-7613 (2017).
30. Winterhalder, M., Zumbusch, A., Lippitz, M. & Orrit, M. Toward far-field vibrational spectroscopy of single molecules at room temperature. The Journal of Physical Chemistry B 115, 5425-5430 (2011).
31. Wei, L. et al. Super-multiplex vibrational imaging. Nature 544, 465-470 (2017).
32. Schatz, G. C. & Ratner, M. A. Quantum Mechanics in Chemistry. (Courier Corporation, New York, 1993).
33. Meath, W. J. & Power, E. On the importance of permanent moments in multiphoton absorption using perturbation theory. Journal of Physics B: Atomic and Molecular Physics 17, 763-781 (1984).
34. Carey, P., *Biochemical applications of Raman and resonance Raman spectroscopes*. Elsevier: 2012.
35. Kukura, P.; McCamant, D. W.: Mathies, R. A., Femtosecond stimulated Raman spectroscopy. *Annu. Rev. Phys. Chem.* 2007, 58, 461-488.
36. Spiro, T. G.; Strekas, T. C., Resonance Raman spectra of hemoglobin and cytochrome c: inverse polarization and vibronic scattering. *Proceedings of the National Academy of Sciences* 1972, 69, 2622-2626.
37. Johnson, B. B.; Peticolas, W. L., The resonant Raman effect. *Annual Review of Physical Chemistry* 1976, 27, 465-521.
38. Asher, S. A., UV resonance Raman studies of molecular structure and dynamics: applications in physical and biophysical chemistry. *Annual review of physical chemistry* 1988, 39, 537-588.
39. Efremov, E. V.; Ariese, F.; Gooijer, C., Achievements in resonance Raman spectroscopy: Review of a technique with a distinct analytical chemistry potential. *Analytica chimica acta* 2008, 606, 119-134.
40. Prince, R. C.; Frontiera, R. R.; Potma, E. O., Stimulated Raman scattering: from bulk to nano. *Chemical reviews* 2016, 117, 5070-5094.
41. Zhang, W.; Yeo, B. S.; Schmid, T.; Zenobi, R., Single molecule tip-enhanced Raman spectroscopy with silver tips. *The Journal of Physical Chemistry C* 2007, 111, 1733-1738.
42. Le Ru, E. C.; Etchegoin, P. G., Single-molecule surface-enhanced Raman spectroscopy. *Annual review of physical chemistry* 2012, 63, 65-87.
43. Laubereau, A.; Seilmeier, A.; Kaiser, W., A new technique to measure ultrashort vibrational relaxation times in liquid systems. *Chemical Physics Letters* 1975, 36, 232-237.
44. Whaley-Mayda, L.; Penwell, S. B.; Tokmakoff, A., Fluorescence encoded infrared spectroscopy: ultrafast vibrational spectroscopy on small ensembles of molecules in solution. *The journal of physical chemistry letters* 2019.
45. Wright, J. C., Double resonance excitation of fluorescence in the condensed phase—an alternative to infrared, Raman, and fluorescence spectroscopy. *Applied Spectroscopy* 1980, 34, 151-157.
46. Min, W.; Lu, S.; Holtom, G. R.; Xie, X. S., Triple-resonance coherent anti-Stokes Raman scattering microspectroscopy. *ChemPhysChem* 2009, 10, 344-347.
47. Orrit, M.; Bernard, J., Single pentacene molecules detected by fluorescence excitation in a p-terphenyl crystal. *Physical review letters* 1990, 65, 2716.
48. Xiong, H.; Shi, L.; Wei, L.; Shen, Y.; Long, R.; Zhao, Z.; Min, W., Stimulated Raman excited fluorescence spectroscopy and imaging. *Nature Photonics* 2019, 13, 412-417.
49. Reichardt, C., Solvatochromic dyes as solvent polarity indicators. *Chemical Reviews* 1994, 94, 2319-2358.
50. Shi, J.; Zhang, X.; Neckers, D. C., Xanthenes: fluorone derivatives. 1. *The Journal of Organic Chemistry* 1992, 57, 4418-4421.
51. Shi, J.; Zhang, X.-P.; Neckers, D. C., Xanthenes: flourone derivatives II. *Tetrahedron letters* 1993, 34, 6013-6016.
52. Erickson, L., On anti-Stokes luminescence from Rhodamine 6G in ethanol solutions. *Journal of Luminescence* 1972, 5, 1-13.
53. Zander, C.; Drexhage, K. H., Cooling of a dye solution by anti-Stokes fluorescence. *Advances in photochemistry* 1995, 20, 59-78.
54. Albrecht, A.; Hutley, M., On the dependence of vibrational Raman intensity on the wavelength of incident light. *The Journal of Chemical Physics* 1971, 55, 4438-4443.
55. Shi, L.; Xiong, H.; Shen, Y.; Long, R.; Wei, L.; Min, W., Electronic resonant stimulated raman scattering microspectroscopy. *The Journal of Physical Chemistry B* 2018, 122, 9218-9224.
56. Hu, F.; Zeng, C.; Long, R.; Miao, Y.; Wei, L.; Xu, Q.; Min, W., Supermultiplexed optical imaging and barcoding with engineered polyynes. *Nature methods* 2018, 15, 194.
57. Hu, F.; Brucks, S. D.; Lambert, T. H.; Campos, L. M.; Min, W., Stimulated Raman scattering of polymer nanoparticles for multiplexed live-cell imaging. *Chemical Communications* 2017, 53, 6187-6190.
58. Liu, X.; Wu, Z.; Nie, H.; Liu, Z.; He, Y.; Yeung, E., Single DNA molecules as probes for interrogating silica surfaces after various chemical treatments. *Analytica chimica acta* 2007, 602, 229-235.
59. Shi, J. M.; Zhang, X. P.; Neckers, D. C., Xanthenes—fluorone derivatives .2. *Tetrahedron Letters* 1993, 34, 6013-6016.
60. Shi, J. M.; Zhang, X. P.; Neckers, D. C., Xanthenes—fluorone derivatives .1. *J Org Chem* 1992, 57, 4418-4421.
61. Brinks, D.; Hildner, R.; Van Dijk, E. M.; Stefani, F. D.; Nieder, J. B.; Hernando, J.; Van Hulst, N. F., Ultrafast dynamics of single molecules. *Chemical Society Reviews* 2014, 43, 2476-2491.
62. Allen, L.; Eberly, J. H., *Optical resonance and two-level atoms*; Courier Corporation: MA, 1987; Vol. 28.
63. Siegman, A. E., *Lasers*; University Science Books: CA, 1986.

What is claimed is:

1. A method for providing an excited fluorescence radiation, comprising:
with a beam of a probe, exciting a fluorescent compound to an excited state for a fluorescence emission to effectuate the excited fluorescence radiation comprising exciting the fluorescent compound to an intermediate vibrational state by electronic pre-resonance stimulated Raman scattering ("epr-SRS"), and then exciting the fluorescent compound in the intermediate vibrational state to the excited state; and coupling a Raman transition thereof to electronic excited-state population for subsequent fluorescence detection via stimulated Raman excited fluorescence or via stimulated Raman attenuated fluorescence,
detecting the fluorescent compound molecule-based on the fluorescence emission.

2. The method of claim 1, wherein the beam of the probe is in one of the near-infrared or visible light spectrum.

3. The method of claim 1, wherein the fluorescent compound is one of a fluorescein, a rhodamine, a coumarin, a pyrene, or a cyanine.

4. The method of claim 1, wherein one or more aromatic rings of the fluorescent compound is functionalized with one of a nitrile group, an amine group, a ketone group, an aldehyde group, a hydroxyl group, a thiol group, an ether group, a thiolether group, a carboxylic acid group, an ester group, a thiolester group, an amide group, a carbamate group, a urea group, a thiourea group, a phosphoric acid group, or a sulfonic acid group.

5. The method of claim 1, wherein the fluorescent compound is conjugated with one of a nanoparticle or a microparticle.

6. The method of claim 5, wherein the nanoparticle is one of a nanobead, a nanorod, a nanostar, or a nanowire.

7. The method of claim 6, wherein the nanowire is one of a metallic nanostructure or a carbon nanotube.

8. The method of claim 5, wherein the microparticle is one of a polystyrene microbead, nanobody, antibody mimetics, and antibodies which bind to one of stem cells, cancer cells, immune cells, neurons, glia, bacteria, fungi, viruses, nucleic acids, or artificial nucleic acid analogues.

9. The method of claim 1, further comprising:
imaging organelles in cultured live cells based on the fluorescent compound.

10. The method of claim 9, wherein the cultured live cells are seeded in a well before being incubated and labeled with the fluorescent compound, and wherein the fluorescent compound comprises a specific organelle-targeted probe.

11. The method of claim 10, wherein the organelle-target probe targets one of a plasma membrane, an endoplasmic reticulum (ER), a Golgi, a mitochondria, lipid droplets, a lysosome, a nucleus, or a tubulin in the cultured live cells.

12. The method of claim 1, further comprising:
identifying a population of cancer cells using flow cytometry based on the fluorescent compound.

13. A system for providing an excited fluorescence radiation, the system comprising:
a hardware computing arrangement, a laser and
a sensor for detecting fluorescence emission, configured to:
with a beam of a probe, excite a fluorescent compound to an excited state for a fluorescence emission to effectuate the excited fluorescence radiation comprising exciting a fluorescent compound to an intermediate vibrational state by electronic pre-resonance stimulated Raman scattering ("epr-SRS"), and then excite the fluorescent compound in the intermediate vibrational state to the excited state; and
couple a Raman transition thereof to electronic excited-state population for subsequent fluorescence detection via stimulated Raman excited fluorescence or via stimulated Raman attenuated fluorescence, and
detect the fluorescent compound based on the fluorescence emission.

14. A non-transitory computer-accessible medium having stored thereon computer-executable instructions for providing an excited fluorescence radiation, wherein, when a computing arrangement coupled to a laser and a sensor executes the instructions, the computing arrangement is configured to perform procedures comprising:
with a beam of a probe, excite a fluorescent compound to an excited state for a fluorescence emission to effectuate the excited fluorescence radiation comprising exciting a fluorescent compound to an intermediate vibrational state by electronic pre-resonance stimulated Raman scattering ("epr-SRS"), and then excite the fluorescent compound in the intermediate vibrational state to the excited state; and
couple a Raman transition thereof to electronic excited-state population for subsequent fluorescence detection via stimulated Raman excited fluorescence or via stimulated Raman attenuated fluorescence, and
detect the fluorescent compound based on the fluorescence emission.

* * * * *